United States Patent
Okamura

(10) Patent No.: US 6,714,520 B1
(45) Date of Patent: Mar. 30, 2004

(54) SYSTEM, APPARATUS METHOD FOR MULTI-CARRIER TRANSMISSION

(75) Inventor: Yusaku Okamura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/306,734

(22) Filed: May 7, 1999

(30) Foreign Application Priority Data

May 8, 1998 (JP) .......................................... 10-126522
Mar. 17, 1999 (JP) .......................................... 11-072768

(51) Int. Cl.$^7$ ................................................ H04B 3/30
(52) U.S. Cl. ...................................... 370/286; 375/296
(58) Field of Search ................................ 370/276, 201, 370/286, 289, 290, 291; 375/254, 278, 284, 285, 346, 296; 379/406.01, 406.05, 406.08

(56) References Cited

U.S. PATENT DOCUMENTS

| | | | |
|---|---|---|---|
| 4,641,318 A | 2/1987 | Addeo | |
| 5,313,467 A | 5/1994 | Varghese et al. | |
| 5,479,447 A | 12/1995 | Chow et al. | |
| 6,144,696 A | * 11/2000 | Shively et al. | 375/222 |
| 6,192,087 B1 | * 2/2001 | Olafsson et al. | 375/296 |
| 6,236,645 B1 | * 5/2001 | Agazzi | 370/286 |
| 6,246,716 B1 | * 6/2001 | Schneider | 375/220 |

FOREIGN PATENT DOCUMENTS

| | | |
|---|---|---|
| EP | 0753948 | 1/1997 |
| JP | 8-307385 | 11/1996 |
| JP | HEI 10-46534 | 2/1998 |
| JP | 10-303872 | 11/1998 |
| JP | 11-168515 | 6/1999 |
| KR | 97-4285 | 6/1995 |
| WO | WO 97/03506 | 1/1997 |

OTHER PUBLICATIONS

H. Okado, et al., "An Examination of ADSL Applied to Crosstalk From TCM–ISDN", Proceedings of the Annual Conference of the Institute of Electronics, Informaton and Communication Engineers 1998, Japan, Legally Incorporated Institute of Electronics, Information andCommunication Engineers, Mar. 6, 1998, Telecommunications 2, p. 403 International Publication No. 97/03506 Pamphlet.

(List continued on next page.)

Primary Examiner—Ajit Patel
(74) Attorney, Agent, or Firm—Scully, Scott, Murphy & Presser

(57) ABSTRACT

A system for multi-carrier transmission which can secure the transmission capacity under the noise environment whose noise changes cyclically is provided. A mapping section in an ATU-C (ADSL transceiver unit, central office end) memorizes the bit allocation allocating to each carrier and transmission power allocation using for each carrier at the period that the noise generated at the data transmission to a downstream direction is large and the bit allocation allocating to each carrier and transmission power allocation using for each carrier at the period that the noise generated at the data transmission to an upstream direction is large. And a demapping section in an ATU-R (ADSL transceiver unit, remote terminal end) also memorizes the memorized bit allocation and transmission power allocation. At the time of the data transmission to the downstream direction, the bit allocation and transmission power allocation is allocated to each carrier of the high frequency band, by making the bit rate at the period that the noise generated at the data transmission to the downstream direction is small higher than the bit rate at the period that the noise is large. With this, the transmission capacity to the downstream direction can be secured.

52 Claims, 32 Drawing Sheets

OTHER PUBLICATIONS

K. Narumiya, N. Kondo, "ASDL Trends and the Approach of NTT" Technology Channel, Japan, Legally Incorporat ed Electrical Telecommunications Assoc., Oct. 1, 1997, vol. 9, Sec. 10, pp. 28–29.

Y. Yaman, Application of ADSL Transmission Techniques in Crosst alk Designs and Subscriber Systems, Proceedings of the Autumn Conference of the Institute of Electronics, Information and Communication Engineers 1993, Japan, legally Incorporated Institute of Electronis, Information andCommunication Engineers, Aug. 15, 1993, 3 Telecommunications, p. 312.

"Spectral Compatibility of Asymmetrical Digital Subscriber Lines (ADSL) with Basic Rate DSLs, HDSLs, and T1 Lines", by Kamran Sistanizadeh, pp. 1969–1973.

"ADSL System for Time Periodic Noise Environments", by Yusaku Okamura, et al., NEC Research & Development, vol. 40, No. 1, Jan. 1999, pp. 64–69.

* cited by examiner

FIG. 6A
PRIOR ART
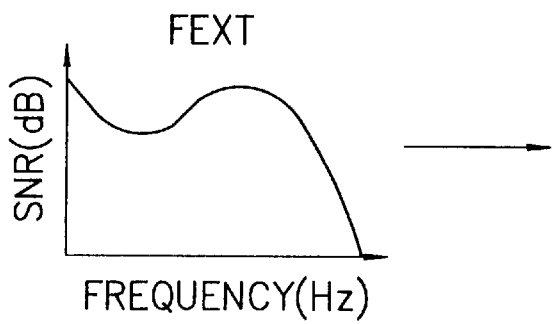
FIG. 6B
PRIOR ART
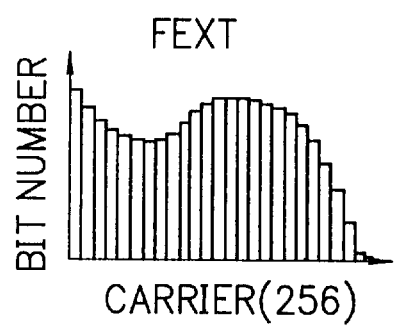
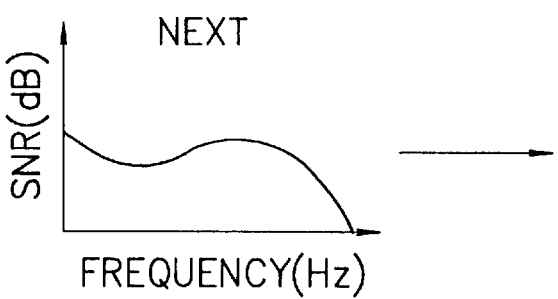
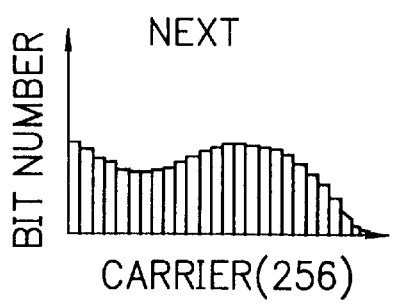

FIG. 7
PRIOR ART

BITMAP SWITCHING SYSTEM

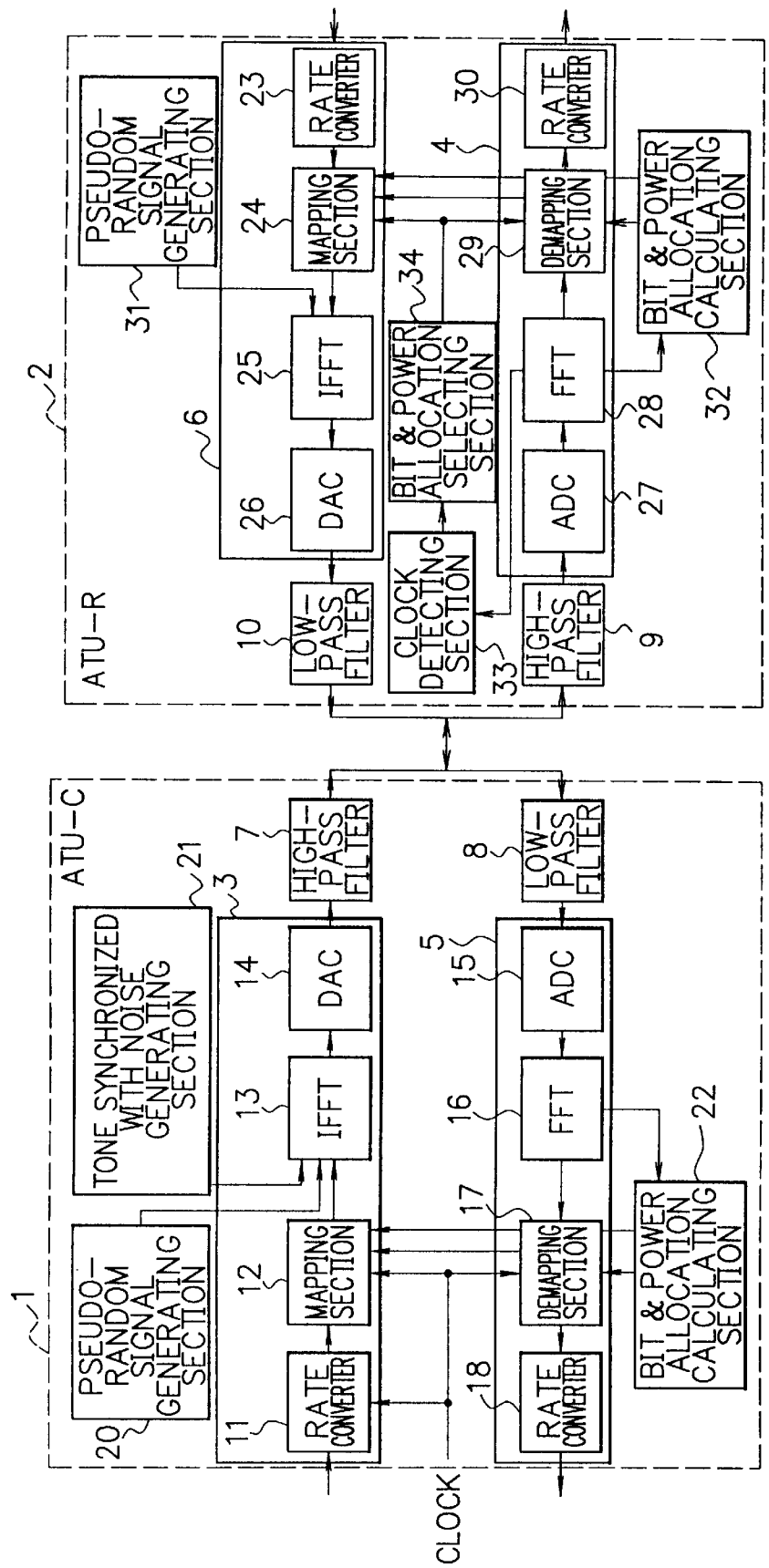
F I G. 10

FIG. 22
AT THE CASE OF 4 BITS
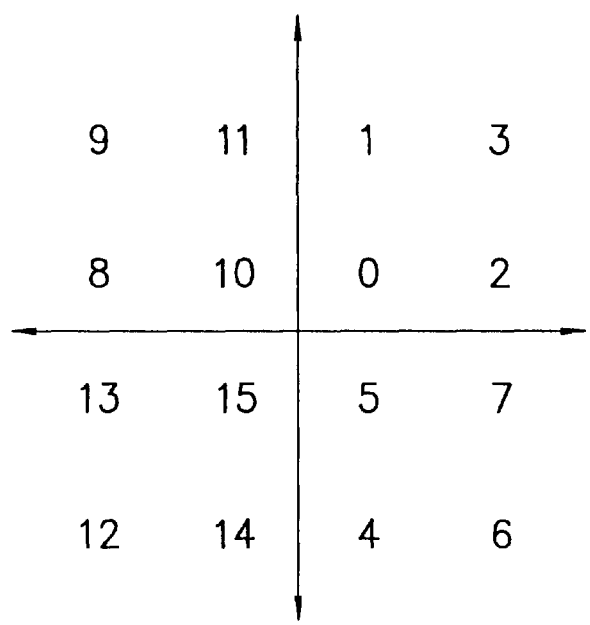
AT THE CASE OF 5 BITS
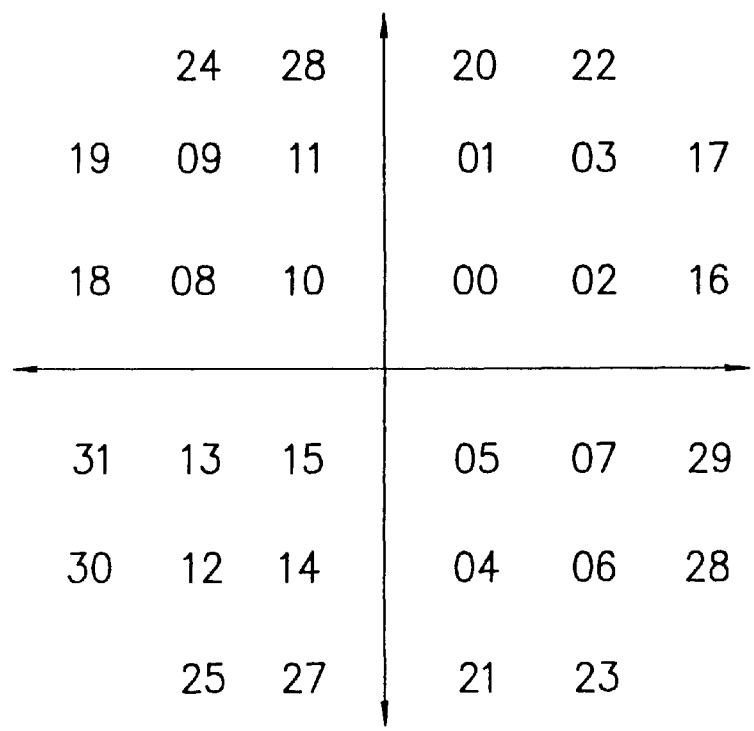

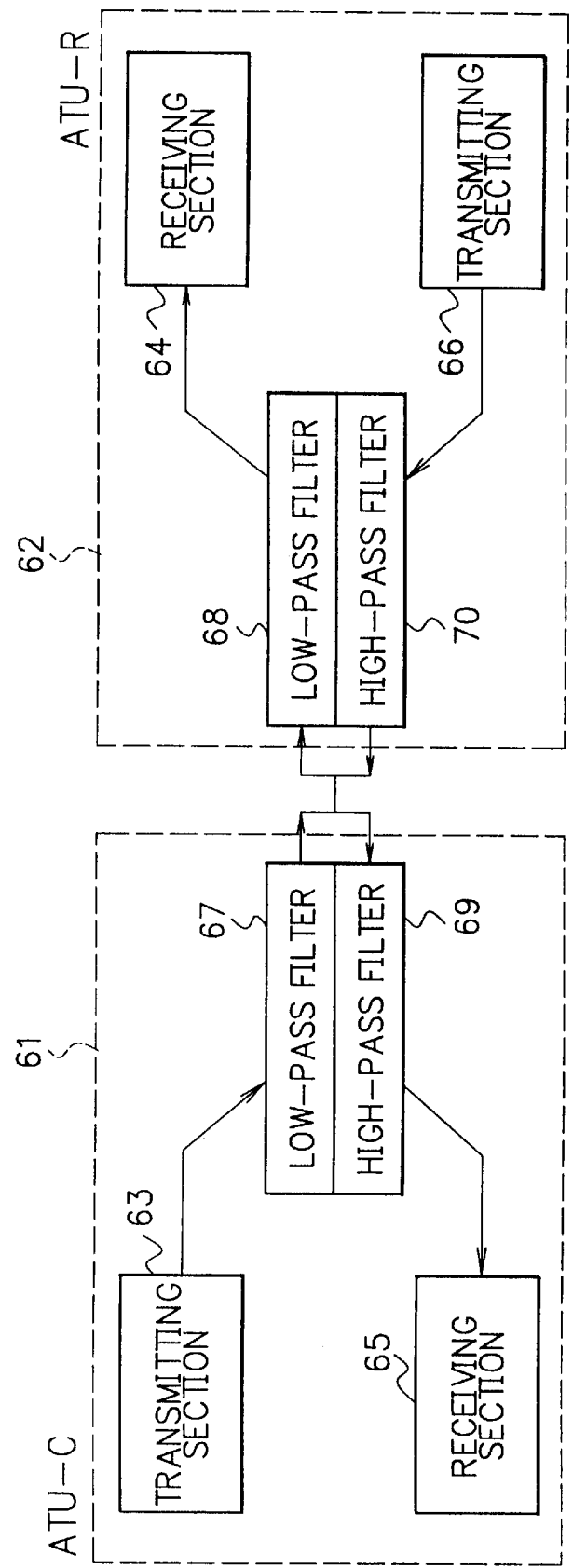
F I G. 29

AT THE TIME OF
UPSTREAM ISDN

AT THE TIME OF
DOWNSTREAM ISDN

AT THE TIME OF
UPSTREAM ISDN

AT THE TIME OF
DOWNSTREAM ISDN

SYSTEM, APPARATUS METHOD FOR MULTI-CARRIER TRANSMISSION

BACKGROUND OF THE INVENTION

The present invention relates to a system, an apparatus and a method for multi-carrier transmission which in particular use a bit allocation switching system and a FDM (frequency division multiplexing) system and implements the data transmission using multi-carrier under the noise environment that the changing timing of noise level is known.

DESCRIPTION OF THE RELATED ART

Recently, an xDSL (digital subscriber line) technology has been focused on, by which the high-speed transmission of a few megabits/second becomes possible using a metallic cable, such as a loop. In this, x of the xDSL means any of the various types of DSL and x has an alphabet such as A, S, V and H depending on its technology. In this technology, an ADSL (asymmetric digital subscriber line) technology has been highly focused on. This ADSL has different transmission speeds between upstream and downstream directions and this asymmetrical nature is suitable for the access for Internet.

This ADSI, apparatus uses a named DMT (discrete multitone) system as a MODEM (modulator-demodulator), and converts digital signals to analog signals and transmits the converted signals. The DMT system implements the modulation applying a QAM (quadrature amplitude modulation) for 256 carriers and the modulated carriers are multiplexed using an IFFT (inverse fast Fourier transform) and are transmitted. The receiving side extracts each carrier from the multiplexed signals using a FFT (fast Fourier transform) and implements the demodulation to signals modulated QAM, with this, the high-speed transmission becomes possible.

However, more over 4 million loops of an ISDN (integrated services digital network) being a TCM (time compression multiplexing) system have been installed in Japan. At the case that the loop for the ADSL is installed adjacent to the loop for the ISDN, a cross-talk noise making the communication speed of the ADSL loop lessen occurs effected by the ISDN loop. In this case, it is possible that the loop for ASDL is separately installed from the loop for ISDN, not to be installed in the same bundle of cable. However, it is too big for an operator to bear the cost. Therefore, it is desirable to establish a transmission method that can secure the transmission capacity not influenced by the cross-talk noise caused in the same batch of the loops for ISDN and the loops for ASDL.

FIG. 1 is a cross-talk noise diagram showing a cross-talk noise generated in the ADSL apparatus caused by the ISDN line. Referring to FIG. 1, the cross-talk noise generated in the ADSL apparatus which used the adjacent line to the ISDN line using the TCM system is explained. In FIG. 1, the cross-talk noise generated in an ATU-R (ADSL transceiver unit, remote terminal end) caused by the data transmission of the TCM-ISDN loop is shown, at the time when the downstream data transmission is implemented in the ADSL loop.

In the TCM-ISDN loop, the data transmission of upstream and downstream directions is implemented alternately every 1.25 milliseconds. At the time when the ADSL loop implements downstream data transmission and the TCM-ISDN loop implements upstream data transmission, a high power signal before attenuation of the TCM-ISDN influences an attenuated signal of the ADSL loop and a NEXT (near end cross-talk) is generated at the ATU-R. At the time when the ADSL loop implements downstream data transmission and the TCM-ISDN loop implements downstream data transmission, a signal of the TCM-ISDN influences an attenuated signal of the ADSL loop and a FEXT (far end cross-talk) is generated at the ATU-R. The same kind of influences is generated at an ATU-C (ADSL transceiver unit, central office end).

FIG. 2 is a noise amount diagram showing the amount of the cross-talk noise in FIG. 1. As shown in FIG. 2, the amount of noise generating at the NEXT is larger than that at the FEXT. The reason why this occurs is that the high power signal before attenuation of the TCM-ISDN influences the attenuated signal of the ADSL loop. Focusing on this difference of the amount of noise, a system is proposed, this system transmits data by switching the amount of data to be transmitted between at the time generated NEXT and the FEXT. This system is called a DBM (dual bit-map) and transmits large data at the time generated the FEXT that the amount of noise is small and transmits small data at the time generated the NEXT that the amount of noise is large, as shown in FIG. 2.

As mentioned above, at the ADSL apparatus whose loop is adjacent to the TCM-ISDN loop, the amount of noise changes cyclically, therefore SNR (signal to noise ratio) of each carrier is measured in each of upstream and downstream directions, and the bit allocation is obtained corresponding to this measured SNR.

FIG. 3 is a block diagram showing the structure of a conventional ADSL apparatus. Referring to FIG. 3, the structure of the conventional ADSL apparatus is explained.

The transmitting section of the ATU-C 300 includes a rate converter 301 in which data transmitted in a constant speed from the external equipment are temporarily stored, a mapping section 302 which switches the bit allocation and transmission power allocation of each carrier corresponding to the changing timing of noise level and implements the bit allocation and transmission power allocation to each carrier, an IFFT (inverse fast Fourier transform) 303 which implements the modulating and multiplexing in each carrier for multi-point QAM (quadrature amplitude modulation) signals being the output of this mapping, and a DAC (digital to analog converter) 304 which converts this digital mutiplexed output to a downstream analog signal and transmits the analog signal.

The receiving section of the ATU-C 300 includes an ADC (analog to digital converter) 305 which converts analog signals transmitted from an ATU-R 400 to digital signals, a FFT (fast Fourier transform) 306 which implements the fast Fourier transform for these digital signals, a demapping section 307 which switches the bit allocation and transmission power allocation of each carrier corresponding to the changing timing of noise level and demodulates the transmitted signals, and a rate converter 308 which adjusts the change of the amount of data transmission caused by the change of bit allocation and transfers the data to the external equipment in a constant speed.

The transmitting section of the ATU-R 400 includes a rate converter 401 in which data transmitted in a constant speed from the external equipment are temporarily stored, a mapping section 402 which switches the bit allocation and transmission power allocation of each carrier corresponding to the changing timing of noise level and implements the bit allocation and transmission power allocation to each carrier, an IFFT (inverse fast Fourier transform) 403 which implements the modulating and multiplexing in each carrier for multi-point QAM (quadrature amplitude modulation) signals being the output of this mapping, and a DAC (digital to analog converter) 404 which converts this digital multiplexed output to an upstream analog signal and transmits the analog signal.

The receiving section of the ATU-R 400 includes an ADC (analog to digital converter) 408 which converts analog signals transmitted from the ATU-C 400 to digital signals, a FFT (fast Fourier transform) 407 which implements the fast Fourier transform for these digital signals, a demapping section 406 which switches the bit allocation and transmission power allocation corresponding to the changing timing of noise level and demodulates the transmitted signals, and a rate converter 405 which adjusts the change of the amount of data transmission caused by the change of bit allocation and transfers the data to the external equipment in a constant speed.

The ATU-C 300 further includes a pseudo-random signal generating section 310 and a bit & power allocation calculating section 312 and the ATU-R 400 further includes a pseudo-random signal generating section 409 and a bit & power allocation calculating section 410. FIG. 4 is a block diagram showing the structure of a bit & power allocation calculating section 312 of the ATU-C 300. FIG. 5 is a block (diagram showing the structure of a bit & power allocation calculating section 410 of the ATU-R 400.

At the time when the ISDN implements downstream transmission, the NEXT is generated in the ATU-C 300 and the FEXT is generated in the ATU-R 400. And at the time when the ISDN implements upstream transmission, the FEXT is generated in the ATU-C 300 and the NEXT is generated in the ATU-R 400.

Under this noise environment, in order to secure the data transmission capacity, pseudo-random signal generating sections 310 and 409 generate the pseudo-random signals being the data which are composed of predetermined pseudo-random orders and are allocated in sequence, to each carrier using for data transmission. And the pseudo-random signal generating sections 310 and 409 output the generated pseudo-random signals to the IFFT 303 and 403 respectively and after this, the outputs from the IFFT are outputted to each counter remote terminal.

Bit & power allocation calculating sections 312 and 410 calculate the bit allocation allocating to each carrier for data transmission and the transmission power allocation using in each carrier by using the pseudo-random signals generated at the pseudo-random signal generating sections 409 and 310 of the counter remote terminals, for the time of the NEXT and FEXT.

The calculated bit allocation and transmission power allocation is memorized in the demapping section of the own end and is memorized in the demapping section of the counter remote terminal respectively.

A processing flow calculating the above mentioned bit allocation and transmission power allocation is explained in detail. The same processing is implemented for the ATU-C 300 and the ATU-R 400, therefore only the processing to calculate the downstream bit allocation and transmission power allocation is explained.

At the training period when the bit allocation allocating to carrier and the transmission power allocation using for each carrier is calculated, the pseudo-random signal generating section 310 modulates the amplitude of each carrier using for data transmission to the amplitude corresponding to the order of bits of prescribed data allocated by the predetermined pseudo-random order and outputs to the IFFT 303.

The IFFT 303 implements the inverse fast Fourier transform to each carrier modulated the amplitude and outputs the voltage value added each carrier and expressed in digital form. The DAC 304 converts the voltage value of the digital form to the analog signal being the actual value and outputs to the loop.

The ATU-R 400 converts the analog signals transmitted from the ATU-C 300 to the voltage value expressed in digital form at the ADC 408. After this, the voltage value in digital form is implemented the fast Fourier transform at the FFT 407 and each carrier modulated its amplitude is taken out.

Each carrier taken out at the FFT 407 is outputted to the bit & power allocation calculating section 410.

In the bit & power allocation calculating section 410, the plural SNR values of each carrier are calculated at the both time of the NEXT generated and the FEXT generated in a downstream SNR evaluating section 414 and the average value of SNR of each carrier is calculated. FIG. 6A is a diagram showing the average values of the SNR at the NEXT generated and the FEXT generated, which are evaluated at the downstream SNR evaluating section 414. The downstream SNR evaluating section 414 holds the calculated average value of SNR at the time of the NEXT generated in a NEXT SNR 415 and the calculated average value of SNR at the time of the FEXT generated in a FEXT SNR 415 respectively.

A bit & power allocation table calculating section 416 calculates the bit allocation and transmission power allocation of each carrier in every noise level by the measured average value of SNR of each carrier, and the calculated bit allocation and transmission power allocation is outputted to the demapping section 406 and is memorized in the demapping section 406 and is also outputted to the mapping section 402. FIG. 6B is a diagram showing the determining state of the bit allocation of each carrier corresponding to the average value of SNR evaluated at the downstream SNR evaluating section 414.

At the training period when the bit allocation allocating to the carrier used for data transmission and the transmission power allocation using for each carrier is calculated, the mapping section 402 allocates the information of the bit allocation and transmission power allocation calculated at the bit & power allocation calculating section 410 to the predetermined carrier in the predetermined number of bits, and outputs the allocated result to the IFFT 403.

The IFFT 403 implements the inverse fast Fourier transform to the predetermined carrier transmitted from the mapping section 402 and outputs the voltage value expressed in digital form. The DAC 404 generates the analog signal being an actual voltage value from the voltage value expressed in digital form and outputs the analog signal to the loop.

The ATU-C 300 converts the analog signal transmitted from the ATU-R 400 to the voltage value expressed in digital form at the ADC 305. The FFT 306 implements the fast Fourier transform for the voltage value in digital form and takes out each carrier modulated its amplitude.

The demapping section 307 takes out the information of the bit allocation and transmission power allocation from the predetermined carrier allocated the designated number of bits and outputs the taken out information of the bit allocation and transmission power allocation to the mapping section 302 and the information is memorized in the mapping section 302.

Using the two kinds of bit allocation and transmission power allocation calculated by the above mentioned processing, the mapping sections 302 and 402 select the bit allocation and transmission power allocation corresponding to the noise level generated at the time of data transmission and implements the bit allocation and transmission power allocation for each carrier. The demapping sections 307 and 406 take out the data allocated to the carrier by using the same bit allocation and transmission power allocation that the bit allocation and transmission power allocation is implemented at the counter remote terminal corresponding to the noise level.

Furthermore, the ATU-C 300 provides a tone synchronized with noise generating section 311 and the ATU-R 400 provides a clock detecting section 411 and a bit & power allocation selecting section 412.

The clock in the ATU-C 300 is a clock synchronizing with to the changing timing of noise level and, in this case, the changing timing of noise level is known. For example, at the case that the noise is a cross-talk noise from the TCM-ISDN, the NEXT and the FEXT are generated every 1.25 milliseconds, therefore the SNR of each carrier also changes every 1.25 milliseconds. Therefore, at the transmitting section of the ATU-C 300, by receiving the clock by which the amplitude of the predetermined carrier changes in a 1.25 milliseconds cycle synchronized with the changing timing of noise level, the clock must be transmitted to the receiving section of the ATU-R 400. Accordingly, the tone synchronized with noise generating section 311 generates a tone signal synchronized with noise made the signal level change by synchronizing with the clock and transmits the tone synchronized with noise to the ATU-R 400. In the more detailed explanation, the tone synchronized with noise generating section 311 makes the amplitude of the predetermined carrier change with the synchronization of the changing timing of noise level, using the clock synchronizing with the changing timing of noise level, and outputs to the IFFT 303.

A clock detecting section 411 detects the changing timing of noise level by the change of amplitude of the designated carrier, in this, the changing timing is taken out by a FFT 407. The detected changing timing of noise level is transmitted to the bit & power allocation selecting section 412.

The bit & power allocation selecting section 412 recognizes the changing timing of noise level by the information from the clock detecting section 411 and selects one from the memorized two kinds of bit allocation and transmission power allocation in the mapping section 402 and designates the bit allocation and transmission power allocation to use the implementation of data transmission corresponding to the noise level. And the bit & power allocation selecting section 412 also selects one from the memorized two kinds of bit allocation and transmission power allocation in the demapping section 406 and in order to use for demodulation, designates the same bit allocation and transmission power allocation used by corresponding to the noise level at the ATU-C 300.

Figure 7:
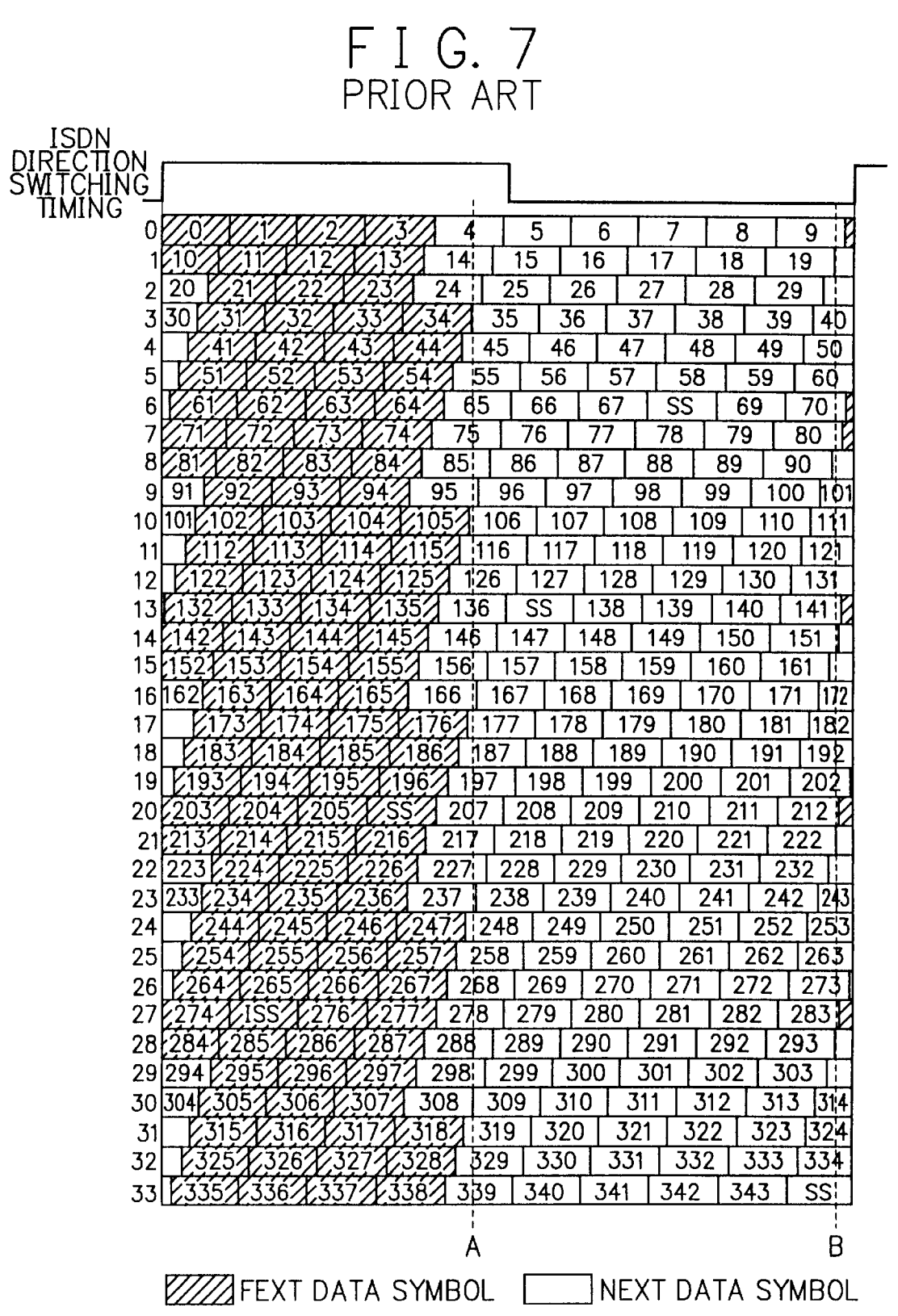

FIG. 7 is a hyperframe structure diagram composed of 345 symbols. The left side symbols from dotted line A shown in FIG. 7 have a low cross-talk noise from the ISDN loop (FEXT generated) and are able to allocate many bits to a carrier. The symbols between the dotted lines A and B shown in FIG. 7 have a high cross-talk noise from the ISDN loop (NEXT generated) and are able to allocate only a few bits to a carrier. The transmission is started from the symbol 0 (zero) synchronizing with the FEXT generating timing from the ISDN, as shown in FIG. 7, according to this, the receiving timing of the $345^{th}$ symbol and the switching timing of cross-talk noise from the ISDN are synchronized. Therefore, from the next $346^{th}$ symbol, the transmission of symbols is able to be implemented by synchronizing with the FEXT generating timing from ISDN. The bit & power allocation selecting section 412 memorizes which bit allocation and transmission power allocation should be used every transmission order of symbols, from the two kinds of bit allocation and transmission power allocation.

The ATU-C 300 provides an echo canceler 313 and the ATU-R 400 provide an echo canceler 413. FIG. 8 is a frequency band diagram using for data transmission by an echo canceler system. As shown in FIG. 8, in order to increase the transmission capacity, a part of the frequency band using for upstream and downstream data transmission is overlapped. Therefore, the echo canceler is provided to cancel the influence from reflection.

The operation of the IFFT is explained in more detail. The signals from the pseudo-random signal generating section, the tone synchronized with noise generating section and the mapping section are outputted to the IFFT. However these signals are not inputted at the same time. That is, the IFFT implements the inverse fast Fourier transform for signal inputted in different time and outputs to the DAC.

The mentioned above each equipment is controlled by a sequencer which is not described in diagrams. By the control of this sequencer, at the predetermined signal outputting timing, the pseudo-random signal generating section and the tone synchronized with noise generating section output signals to the IFFT. The IFFT recognizes that from which equipment next signal is inputted, by the operation of sequencer.

However, there is a problem that using an echo canceler makes the structure of apparatus complex and makes the apparatus high cost.

Therefore, utilizing the characteristics of bitmap system and securing the capacity of data transmission, a simply structured transmission system is desirable.

SUMMARY OF THE INVENTION

It is therefore an object of the present invention to provide a system, an apparatus and a method for multi-carrier transmission which secure the transmission capacity and can also have simple structure under the noise environment that the changing timing of noise level is known.

According to a first aspect of the present invention, for achieving the above mentioned objects, the present invention is a system for multi-carrier transmission which implements data transmission using the multi-carrier between a first communication equipment and a second communication equipment interactively under the noise environment that the changing timing of noise level is known.

Said first communication equipment switches bit rates of the data transmission using a first frequency band corresponding to the changing timing of noise level and comprises a first transmitting means for transmitting the data to said second communication equipment.

Said second communication equipment switches bit rates of the data transmission using a second frequency band corresponding to the changing timing of noise level and comprises a second transmitting means for transmitting the data to said first communication equipment.

Said system for multi-carrier transmission makes the bit rate with which said second transmitting means implements the data transmission of a second direction from said second communication equipment to said first communication equipment using said second frequency band higher than the bit rate with which said first transmitting means implements the data transmission of the first direction from said first communication equipment to said second communication equipment using said first frequency band, during the period that the noise generated at the data transmission of said first direction from said first communication equipment to said second communication equipment is large.

According to a second aspect of the present invention, in the first aspect, said system for multi-carrier transmission makes the bit rate with which said first transmitting means implements the data transmission of said first direction using said first frequency band higher than the bit rate with which said second transmitting means implements the data transmission of said second direction using said second frequency band, during the period that the noise generated at the data transmission to said second direction is large.

According to a third aspect of the present invention, in the first aspect, said first transmitting means implements the data transmission using the carrier of said first frequency band, by making the bit rate of the data transmission implementing during the period that the noise generated at the data transmission to said second direction is large higher than the bit rate of the data transmission implementing during the period that the noise generated at the data transmission to said first direction is large.

According to a fourth aspect of the present invention, in the first aspect, said second transmitting means implements the data transmission using the carrier of said second frequency band, by making the bit rate of the data transmission implementing during the period that the noise generated at the data transmission to said first direction is large higher than the bit rate of the data transmission implementing during the period that the noise generated at the data transmission to said second direction is large.

According to a fifth aspect of the present invention, in the first aspect, said first transmitting means provides a first memorizing means which memorizes the bit allocation allocating to each carrier of said first frequency band and the transmission power allocation using for each carrier of said first frequency band which transmit the data to said first direction during the period that the noise generated at the data transmission to said first direction is large and memorizes the bit allocation allocating to each carrier of said first frequency band and the transmission power allocation using for each carrier of said first frequency band which transmit the data to said first direction during the period that the noise generated at the data transmission to said second direction is large and a first modulating means which reads out the two kinds of bit allocation and transmission power allocation from said first memorizing means and allocates the bit allocation and transmission power allocation to each carrier of said first frequency band, by making the bit rate during the period that the noise generated at the data transmission to said second direction is large higher than the bit rate during the period that the noise generated at the data transmission to said first direction is large, corresponding to the changing timing of noise level.

According to a sixth aspect of the present invention, in the first aspect, said second transmitting means provides a second memorizing means which memorizes the bit allocation allocating to each carrier of said second frequency band and the transmission power allocation using for each carrier of said second frequency band which transmit the data to said second direction during the period that the noise generated at the data transmission to said first direction is large and memorizes the bit allocation allocating to each carrier of said second frequency band and the transmission power allocation using for each carrier of said second frequency band which transmit the data to said second direction during the period that the noise generated at the data transmission to said second direction is large, and a second modulating means which reads out the two kinds of bit allocation and transmission power allocation from said second memorizing section and allocates the bit allocation and transmission power allocation to each carrier of said second frequency band, by making the bit rate during the period that the noise generated at the data transmission to said first direction is large higher than the bit rate during the period that the noise generated at the data transmission to said second direction is large, corresponding to the changing timing of noise level.

According to a seventh aspect of the present invention, in the first aspect, said first communication equipment provides a third memorizing means which memorizes the bit allocation allocating to each carrier of said second frequency band and transmission power allocation using for each carrier of said second frequency band transmitted from said second communication equipment during the period the noise generated at the data transmission to said first direction and memorizes the bit allocation allocating to each carrier of said second frequency band and transmission power allocation using for each carrier of said second frequency band transmitted from said second communication equipment during the period the noise generated at the data transmission to said second direction, and a first receiving means which includes a first demodulating means that reads out the two kinds of bit allocation and transmission power allocation from said third memorizing section and demodulates the data transmitted from said second communication equipment, by using the same bit allocation and transmission power allocation as the bit allocation and transmission power allocation allocated at said second communication equipment corresponding to the changing timing of noise level.

According to an eighth aspect of the present invention, in the first aspect, said second communication equipment provides a fourth memorizing means which memorizes the bit allocation allocating to each carrier of said first frequency band and transmission power allocation using for each carrier of said first frequency band transmitted from said first communication equipment during the period the noise generated at the data transmission to said first direction and memorizes the bit allocation allocating to each carrier of said first frequency band and transmission power allocation using for each carrier of said first frequency band transmitted from said first communication equipment during the period the noise generated at the data transmission to said second direction, and a second receiving means which includes a second demodulating means that reads out the two kinds of bit allocation and transmission power allocation from said fourth memorizing means and demodulates the data transmitted from said first communication equipment, by using the same bit allocation and transmission power allocation as the bit allocation and transmission power allocation allocated at said first communication equipment corresponding to the changing timing of noise level.

According to a ninth aspect of the present invention, in the seventh aspect, said second communication equipment provides a second pseudo-random signal generating means which generates pseudo-random signals allocated in sequence the data being predetermined pseudo-random order to each carrier of said second frequency band using for the data transmission to said second direction and outputs to said second transmitting means. And said first communication equipment provides a first SNR (signal to noise ratio) calculating means which calculates the two kinds of average SNR value of each carrier of said second frequency band using for the data transmission of said second direction used the pseudo-random signals received at said first receiving means, at the period that the noise generated at the data transmission to said second direction is large and at the period that the noise generated at the data transmission to said first direction is large, and a first bit and power allocation calculating means which calculates the two kinds of the bit allocation allocating to each carrier and transmission power allocation using for each carrier of said second frequency band, by using said average SNR value of each carrier calculated at said first SNR calculating means, at the period that the noise generated at the data transmission to said second direction is large and at the period that the noise generated at the data transmission to said first direction is large. And said third memorizing means memorizes the information of the two kinds of bit allocation and transmission power allocation calculated at said first bit and power allocation calculating means and also outputs them to said first modulating means, and said first transmitting means outputs them to said second communication equipment. And said first modulating means, at the training period that evaluates the bit allocation and transmission power allocation allocating to each carrier, allocates the information of the two kinds of the bit allocation and transmission power allocation calculated at said first bit and power allocation calculating means to the designated carrier in designated number of bits each. And said second communication equipment receives said designated carrier from said first communication equipment at said second receiving means and also takes out the information of said two kinds of bit allocation and transmission power allocation from said designated carrier at said second demodulating means and memorizes the information of the taken out two kinds of bit allocation and transmission power allocation at said second memorizing means.

According to a tenth aspect of the present invention, in the eighth aspect, said first communication equipment provides a first pseudo-random signal generating means which generates pseudo-random signals allocated in sequence the data being predetermined pseudo-random order to each carrier of said first frequency band using for the data transmission to said first direction and outputs to said first transmitting means. And said second communication equipment provides a second SNR (signal to noise ratio) calculating means which calculates the two kinds of average SNR value of each carrier of said first frequency band using for the data transmission of said first direction used the pseudo-random signals received at said second receiving means, at the period that the noise generated at the data transmission to said first direction is large and at the period that the noise generated at the data transmission to said second direction is large, and a second bit and power allocation calculating means which calculates the two kinds of the bit allocation allocating to each carrier and transmission power allocation using for each carrier of said first frequency band, by using said average SNR value of each carrier calculated at said second SNR calculating means, at the period that the noise generated at the data transmission to said first direction is large and at the period that the noise generated at the data transmission to said second direction is large. And said fourth memorizing means memorizes the information of the two kinds of bit allocation and transmission power allocation calculated at said second bit and power allocation calculating means and also outputs them to said second modulating means, and said second transmitting means outputs them to said first communication equipment. And said second modulating means, at the training period that evaluates the bit allocation and transmission power allocation allocating to each carrier, allocates the information of the two kinds of the bit allocation and transmission power allocation calculated at said second bit and power allocation calculating means to the designated carrier in designated number of bits each. And said first communication equipment receives said designated carrier from said second communication equipment at said first receiving means and also takes out the information of said two kinds of bit allocation and transmission power allocation from said designated carrier at said first demodulating means and memorizes the information of the taken out the two kinds of bit allocation and transmission power allocation at said first memorizing means.

According to an eleventh aspect of the present invention, in the ninth aspect, said first communication equipment provides a first filter means which removes side lobes generated at said second frequency band from the carrier of said first frequency band having the data, at the back position of said first transmitting means, and a second filter means which removes side lobes generated at said first frequency band from the carrier of said second frequency band transmitted from said second communication equipment, at the front position of said first receiving means.

According to a twelfth aspect of the present invention, in the ninth aspect, said second communication equipment provides a third filter means which removes side lobes generated at said first frequency band from the carrier of said second frequency band having the data, at the front position of said second transmitting means, and a fourth filter means which removes side lobes generated at said second frequency band from the carrier of said first frequency band transmitted from said first communication equipment, at the back position of said second receiving means.

According to a thirteenth aspect of the present invention, in the eighth aspect, said first communication equipment provides a clock signal generating means which generates the clock signal changed the amplitude of the designated carrier, by synchronizing with the changing timing of noise level and transmits said clock signal from said clock signal generating means to said second communication equipment using said first transmitting means, said second communication equipment comprises a clock detecting means which detects the changing timing of noise level from the change of the amplitude of said clock signal received from said second receiving means, transmitted from said first communication equipment, said second communication equipment designates the bit allocation and transmission power allocation using for the implementation of the data transmission corresponding to the noise level, from the two kinds of bit allocation and transmission power allocation memorized at said second memorizing means, to said second modulating means by the changing timing of noise level detected by said clock detecting means, and provides a bit allocation and transmission power allocation selecting means which designates the same bit allocation and transmission power allocation as the bit allocation and transmission power allocation used corresponding to the noise level at said first communication equipment using for the demodulation of the data, from the two kinds of bit allocation and transmission power allocation memorized at said fourth memorizing means, to said second demodulating means.

According to a fourteenth aspect of the present invention, in a system for multi-carrier transmission which implements the data transmission using the multi-carrier between the first communication equipment and the second communication equipment interactively under the noise environment that the changing timing of noise level is known, said first communication equipment provides a first temporarily memorizing means for memorizing the data transmitted from external equipment temporarily, a first memorizing means which memorizes the two kinds of the bit allocation allocating to each carrier and transmission power allocation using for each carrier of the first frequency band transmitting the data, at the period that the noise generated at the data transmission to the first direction being from said first communication equipment to said second communication equipment is large and at the period that the noise generated at the data transmission to the second direction being from said second communication equipment to said first communication equipment is large, a first modulating means which reads out the two kinds of bit allocation and transmission power allocation memorized in said first memorizing means and also reads out the data memorized in said first temporarily memorizing means, and selects the bit allocation allocating to each carrier and transmission power allocation using for each carrier of said first frequency band corresponding to the noise level at the data transmission, and modulates the amplitude of said each carrier to the amplitude corresponding to the selected bit allocation and transmission power allocation and the order of bits of the data allocating to said each carrier, a first IFFT (inverse fast Fourier transform) means which adds up each carrier of said first frequency band modulated the amplitude at said first modulating means and outputs the voltage value expressed in digital form, a transmitting means providing a first DAC (digital to analog converter) means which converts the voltage value expressed in digital form outputted from said first IFFT means to analog signals and outputs to a loop, and a first filter means which removes side lobes generated at said second frequency band by the carrier of said first frequency band outputted to the loop by said first DAC means, and allocates the bit allocation and transmission power allocation to each carrier of said first frequency band, by making the bit rate during the period that the noise generated at the data transmission to said second direction is large higher than the bit rate during the period that the noise generated at the data transmission to said first direction is large, by said first modulating means.

According to a fifteenth aspect of the present invention, in the fourteenth aspect, said second communication equipment provides a second temporarily memorizing means for memorizing the data transmitted from external equipment temporarily, a second memorizing means which memorizes the two kinds of the bit allocation allocating to each carrier and transmission power allocation using for each carrier of the second frequency band transmitting the data, at the period that the noise generated at the data transmission to the first direction is large and at the period that the noise generated at the data transmission to the second direction is large, a second modulating means which reads out the two kinds of bit allocation and transmission power allocation memorized in said second memorizing means and also reads out the data memorized in said second temporarily memorizing means, and selects the bit allocation allocating to each carrier and transmission power allocation using for each carrier of said second frequency band corresponding to the noise level at the data transmission, and demodulates said amplitude of each carrier to the amplitude corresponding to the selected bit allocation and transmission power allocation and said order of bits allocating to each carrier, a second IFFT (inverse fast Fourier transform) means which adds tip each carrier of said second frequency band modulated the amplitude at said second modulating means and outputs the voltage value expressed in digital form, a transmitting means providing a second DAC (digital to analog converter) means which converts the voltage value expressed in digital form outputted from said second IFFT means to analog signals and outputs to a loop, and a third filter means which removes side lobes generated at said first frequency band by the carrier of said second frequency band outputted to the loop by said second DAC means, and allocates the bit allocation and transmission power allocation to each carrier of said second frequency band, by making the bit rate during the period that the noise generated at the data transmission to said first direction is large higher than the bit rate during the period that the noise generated at the data transmission to said second direction is large, by said second modulating means.

According to a sixteenth aspect of the present invention, in the fourteenth aspect, said first communication equipment provides a first ADC (analog to digital converter) means which converts analog signals transmitted from said second communication equipment using the carrier of said second frequency band to the voltage value expressed in digital form, a first FFT (fast Fourier transform) means which implements the fast Fourier transform to said voltage value expressed in digital form from said first ADC means and takes out each carrier whose amplitude is modulated of said second frequency band, a third memorizing means which memorizes the two kinds of the bit allocation allocated to each carrier and transmission power allocation used for each carrier of said second frequency band transmitting from said second communication equipment, at the period that the noise generated at the data transmission to said first direction is large and at the period that the noise generated at the data transmission to said second direction is large, a first demodulating means which reads out the two kinds of the bit allocation and transmission power allocation from said third memorizing means and takes out the data allocated to each carrier of said second frequency band from said first FFT means, by using the same bit allocation and transmission power allocation as the bit allocation and transmission power allocation allocated corresponding to the changing timing of noise level at said second communication equipment, a receiving means providing a third temporarily memorizing means which temporarily memorizes the data taken out by said first demodulating means, in order to make the output amount of data a constant value, and a second filter means which removes side lobes generated at said first frequency band by each carrier of said second frequency band transmitted from said second communication equipment, at the front position of said receiving means.

According to a seventeenth aspect of the present invention, in the fifteenth aspect, said second communication equipment provides a second ADC (analog to digital converter) means which converts analog signals transmitted from said first communication equipment using the carrier of said first frequency band to the voltage value expressed in digital form, a second FFT (fast Fourier transform) means which implements the fast Fourier transform to said voltage value expressed in digital form from said second ADC means and takes out each carrier whose amplitude is modulated of said first frequency band, a fourth memorizing means which memorizes the two kinds of the bit allocation allocated to each carrier and transmission power allocation used for each carrier of said first frequency band transmitting from said first communication equipment, at the period that the noise generated at the data transmission to said first direction is large and at the period that the noise generated at the data transmission to said second direction is large, a second demodulating means which reads out the two kinds of the bit allocation and transmission power allocation from said fourth memorizing means and takes out the data allocated to each carrier of said first frequency band from said second FFT means, by using the same bit allocation and transmission power allocation as the bit allocation and transmission power allocation allocated corresponding to the changing timing of noise level at said first communication equipment, a receiving means providing a fourth temporarily memorizing means which temporarily memorizes the data taken out by said second demodulating means, in order to make the output amount of data a constant value, and a fourth filter means which removes side lobes generated at said second frequency band by each carrier of said first frequency band transmitted from said first communication equipment, at the front position of said receiving means.

According to an eighteenth aspect of the present invention, in the seventeenth aspect, said second communication equipment provides a second pseudo-random signal generating means which modulates the amplitude of each carrier of said second frequency band using for the data transmission of said second direction to the amplitude corresponding to the order of bits of the designated data allocating by the predetermined pseudo-random order, and outputs the result to said second IFFT, and said first communication equipment provides a first SNR calculating means which calculates the two kinds of average value of SNR of each carrier of said second frequency band using for the data transmission to said second direction, by using each carrier whose amplitude is modulated of said second frequency band, taken out by said first FFT means, at the period that the noise generated at the data transmission to said second direction is large and at the period that the noise generated at the data transmission to said first direction is large, and a first bit and power allocation calculating means which calculates the two kinds of the bit allocation allocating to each carrier and transmission power allocation using for each carrier of said second frequency band, by using the average value of SNR of said each carrier calculated at said first SNR calculating means, at the period that the noise generated at the data transmission to said second direction is large and at the period that the noise generated at the data transmission to said first direction is large, and the information of the two kinds of bit allocation and transmission power allocation calculated at said first bit and power allocation calculating means is memorized in said third memorizing means and is also outputted to said first modulating means, and is outputted to said second communication equipment, and said first modulating means, at the training period that the bit allocation and transmission power allocation allocating to said each carrier is evaluated, modulates the amplitude of the designated carrier to the amplitude corresponding to the order of bits of the data allocating to each carrier, with this, allocates the information of the two kinds of bit allocation and transmission power allocation calculated at said first bit and power allocation calculating means to said designated carrier in the designated number of bits each and outputs the result to said first IFFT means, and said second communication equipment takes out the information of said two kinds of bit allocation and transmission power allocation from said designated carrier whose amplitude is modulated which is taken out from said second FFT means at said second demodulating means and memorizes the information of the taken out two kinds of bit allocation and transmission power allocation in said second memorizing means.

According to a nineteenth aspect of the present invention, in the seventeenth aspect, said first communication equipment provides a first pseudo-random signal generating means which modulates the amplitude of each carrier of said first frequency band using for the data transmission of said first direction to the amplitude corresponding to the order of bits of the designated data allocating by the predetermined pseudo-random order, and outputs the result to said first IFFT, and said second communication equipment provides a second SNR calculating means which calculates the two kinds of average value of SNR of each carrier of said first frequency band using for the data transmission to said first direction, by using each carrier whose amplitude is modulated of said first frequency band, taken out by said second FFT means, at the period that the noise generated at the data transmission to said first direction is large and at the period that the noise generated at the data transmission to said second direction is large, and a second bit and power allocation calculating means which calculates the two kinds of the bit allocation allocating to each carrier and transmission power allocation using for each carrier of said first frequency band, by using the average value of SNR of said each carrier calculated at said second SNR calculating means, at the period that the noise generated at the data transmission to said first direction is large and at the period that the noise generated at the data transmission to said second direction is large, and the information of the two kinds of bit allocation and transmission power allocation calculated at said second bit and power allocation calculating means is memorized in said fourth memorizing means and is also outputted to said second modulating means, and is outputted to said first communication equipment, and said second modulating means, at the training period that the bit allocation and transmission power allocation allocating to said each carrier is evaluated, modulates the amplitude of the designated carrier to the amplitude corresponding to the order of bits of the data allocating to each carrier, with this, allocates the information of the two kinds of bit allocation and transmission power allocation calculated at said second bit and power allocation calculating means to said designated carrier in the designated number of bits each and outputs the result to said second IFFT means, and said first communication equipment takes out the information of said two kinds of bit allocation and transmission power allocation from said designated carrier whose amplitude is modulated which is taken out from said first FFT means at said first demodulating means and memorizes the information of the taken out two kinds of bit allocation and transmission power allocation in said first memorizing means.

According to a twentieth aspect of the present invention, in the seventeenth aspect, said first communication equipment provides a signal synchronized with noise generating means which generates a signal synchronized with noise which makes the amplitude of the designated carrier change, by synchronizing with the changing timing of noise level, and outputs the result to said first IFFT means, and said second communication equipment provides a timing detecting means which detects the changing timing of noise level by the change of the amplitude of said designated carrier taking out from said second FFT means, and a bit and power allocation selecting means which implements the designation of the bit allocation and transmission power allocation using for the data transmission corresponding to the noise level, from the two kinds of bit allocation and transmission power allocation memorized in said second memorizing means, to said second modulating means, by the changing timing of noise level detected by said timing detecting means, and designates the same bit allocation and transmission power allocation as the bit allocation and transmission power allocation used corresponding to the noise level at said first communication equipment from the two kinds of bit allocation and transmission power allocation memorized in said fourth memorizing means, to said second demodulating means using for the demodulation of the data.

According to a twenty first aspect of the present invention, in the first aspect, said first frequency band is a high frequency band and said second frequency band is a low frequency band.

According to a twenty second aspect of the present invention, in the first aspect, said first frequency band is a low frequency band and said second frequency band is a high frequency band.

A system for multi-carrier transmission of the present invention separates the frequency band using for the data transmission to the first direction and the frequency band using for the data transmission to the second direction. During the period that the noise generated at the data transmission to the first direction is large, the bit rate of the transmission to the second direction using the second frequency band is made higher than the bit rate of the transmission to the first direction using the first frequency band. During the period that the noise generated at the data transmission to the second direction is large, the bit rate of the transmission to the first direction using the first frequency band is made higher than the bit rate of the transmission to the second direction using the second frequency band. With this, the present invention can improve the communication performance largely under the noise environment of the changing noise level, securing the compatibility with the existing communication systems using the frequency division system. The frequency bands used for the data transmission to the first direction and the second direction are separated, therefore the mutual cross-talk noise does not exist and a complex apparatus such as an echo canceler is not needed to be installed.

At the first communication equipment, the bit allocation allocating to each carrier of the first frequency band and transmission power allocation using for each carrier of the first frequency band which transmits the data to the first direction, at the period that the noise generated at the data transmission to the first direction is large and the bit allocation allocating to each carrier of the first frequency band and transmission power allocation using for each carrier of the first frequency band which transmits the data to the first direction, at the period that the noise generated at the data transmission to the second direction is large are memorized. The bit allocation to the carrier of the first frequency band is allocated, by making the bit rate at the period that the noise generated at the data transmission to the second direction is large higher than the bit rate at the period that the noise generated at the data transmission to the first direction is large. With this, the transmission capacity to the first direction is secured under the noise environment of the changing noise level.

At the second communication equipment, the bit allocation allocating to each carrier of the second frequency band and transmission power allocation using for each carrier of the second frequency band which transmits the data to the second direction, at the period that the noise generated at the data transmission to the first direction is large and the bit allocation allocating to each carrier of the second frequency band and transmission power allocation using for each carrier of the second frequency band which transmits the data to the second direction, at the period that the noise generated at the data transmission to the second direction is large are memorized. The bit allocation to the carrier of the second frequency band is allocated, by making the bit rate at the period that the noise generated at the data transmission to the first direction higher than the bit rate at the period that the noise generated at the data transmission to the second direction. With this, the transmission capacity to the second direction is secured under the noise environment of the changing noise level.

At the first communication equipment, the bit allocation allocating to each carrier of the second frequency band and transmission power allocation using for each carrier of the second frequency band transmitting from the second communication equipment, at the period that the noise generated at the data transmission to the second direction is large, and the bit allocation allocating to each carrier of the second frequency band and transmission power allocation using for each carrier of the second frequency band transmitting from the second communication equipment, at the period that the noise generated at the data transmission to the first direction is large are memorized. The data transmitted from the second communication equipment are demodulated using the same bit allocation and transmission power allocation as the bit allocation and transmission power allocation allocated corresponding to the changing timing of noise level at the second communication equipment from the memorized two kinds of bit allocation and transmission power allocation. With this, even the transmission capacity of the data transmitting from the second communication equipment is changed by the change of noise level, the data can be demodulated at the first communication equipment.

At the second communication equipment, the bit allocation allocating to each carrier of the first frequency band and transmission power allocation using for each carrier of the first frequency band transmitting from the first communication equipment, at the period that the noise generated at the data transmission to the second direction is large, and the bit allocation allocating to each carrier of the first frequency band and transmission power allocation using for each carrier of the first frequency band transmitting from the first communication equipment, at the period that the noise generated at the data transmission to the first direction is large are memorized. The data transmitted from the first communication equipment are demodulated using the same bit allocation and transmission power allocation as the bit allocation and transmission power allocation allocated corresponding to the noise cycle changing cyclically at the first communication equipment from the memorized two kinds of bit allocation and transmission power allocation. With this, even the transmission capacity of the data transmitting from the second communication equipment is changed by the change of noise level, the data can be demodulated at the second communication equipment.

At the second communication equipment, the pseudo-random signal allocated in sequence data being the predetermined pseudo-random order is generated to each carrier of the second frequency band using for the data transmission of the second direction and is transmitted to the first communication equipment. At the first communication equipment, the bit allocation allocating to each carrier and transmission power allocation using for each carrier of the second frequency band is calculated by using this pseudo-random signal. With this, the bit allocation and transmission power allocation corresponding to the noise level can be calculated.

At the first communication equipment, the pseudo-random signal allocated in sequence data being the predetermined pseudo-random order is generated to each carrier of the first frequency band using for the data transmission of the first direction and is transmitted to the second communication equipment. At the second communication equipment, the bit allocation allocating to each carrier and transmission power allocation using for each carrier of the first frequency band is calculated by using this pseudo-random signal. With this, the bit allocation and transmission power allocation corresponding to the noise level can be calculated.

According to a twenty third aspect of the present invention, at an apparatus for multi-carrier transmission which implements the data transmission using the multi-carrier under the noise environment that the changing timing of noise level is known, the apparatus for multi-carrier transmission provides a transmitting means which implements the data transmission using each carrier of a first frequency band, by making the bit rate of the data transmission implementing during the period that the noise becomes large at the counter communication equipment higher than the bit rate of the data transmission implementing during the period that the noise becomes large at the apparatus for multi-carrier transmission.

According to a twenty fourth aspect of the present invention, in the twenty third aspect, said first transmitting means provides a first memorizing means which memorizes the bit allocation allocating to each carrier of said first frequency band and the transmission power allocation using for each carrier of said first frequency band which transmit the data during the period that said noise is large at said apparatus for multi-carrier transmission and memorizes the bit allocation allocating to each carrier of said first frequency band and the transmission power allocation using for each carrier of said first frequency band which transmit the data during the period that said noise is large at said counter communication equipment, a first modulating means which reads out the two kinds of bit allocation and transmission power allocation memorized at said first memorizing means and allocates the bit allocation and transmission power allocation to each carrier of said first frequency band, by making the bit rate of the data transmission implementing during the period that said noise becomes large at said counter communication equipment higher than the bit rate of the data transmission implementing during the period that said noise becomes large at said apparatus for multi-carrier transmission.

According to a twenty fifth aspect of the peresent invention, in the twenty third aspect, said apparatus for multi-carrier transmission provides a second memorizing means which memorizes the bit allocation allocating to each carrier of said second frequency band and transmission power allocation using for each carrier of said second frequency band transmitted from said counter communication equipment during the period that said noise is large at said apparatus for multi-carrier transmission and memorizes the bit allocation allocating to each carrier of said second frequency band and transmission power allocation using for each carrier of said second frequency band during the period that said noise is large at said counter communication equipment, and a receiving means which includes a demodulating means that reads out the two kinds of bit allocation and transmission power allocation from said second memorizing means and demodulates the data transmitted from said counter communication equipment, by using the same bit allocation and transmission power allocation as the bit allocation and transmission power allocation allocated at said counter communication equipment corresponding to the changing timing of noise level.

According to a twenty sixth aspect of the present invention, in the twenty fifth aspect, said apparatus for multi-carrier transmission provides a first filter means which removes side lobes generated at said second frequency band from the carrier of said first frequency band having the data, at the back position of said transmitting means, and a second filter means which removes side lobes generated at said first frequency band from the carrier of said second frequency band transmitted from said counter communication equipment, at the front position of said receiving means.

According to a twenty seventh aspect of the present invention, at an apparatus for multi-carrier transmission which implements the data transmission using the multi-carrier under the noise environment that the changing timing of noise level is known, said apparatus for multi-carrier transmission provides a first temporarily memorizing means for memorizing the data transmitted from external equipment temporarily a first memorizing means which memorizes the two kinds of the bit allocation allocating to each carrier and transmission power allocation using for each carrier of the first frequency band transmitting the data, at the period that said noise is large at said apparatus for multi-carrier transmission and at the period that said noise is large at said counter communication equipment, a first modulating means which reads out the two kinds of bit allocation and transmission power allocation memorized in said first memorizing means and also reads out the data memorized in said first temporarily memorizing means, and selects the bit allocation allocating to said each carrier and transmission power allocation using for said each carrier of said first frequency band corresponding to the noise level at the data transmission, and modulates the amplitude of said each carrier to the amplitude corresponding to the selected bit allocation and transmission power allocation and the order of bits of the data allocating to said each carrier, an IFFT (inverse fast Fourier transform) means which adds tip each carrier of said first frequency band modulated the amplitude at said first modulating means and outputs the voltage value expressed in digital form, a transmitting means providing a DAC (digital to analog converter) means which converts the voltage value expressed in digital form outputted from said IFFT means to analog signals and outputs to a loop, and a first filter means which removes side lobes generated at said second frequency band by the carrier of said first frequency band outputted to the loop by said DAC means, and allocates the bit allocation and transmission power allocation to each carrier of said first frequency band, by making the bit rate during the period that said noise is large at said counter communication equipment higher than the bit rate during the period that said noise is large at said apparatus for multi-carrier transmission, by said modulating means.

According to a twenty eighth aspect of the present invention, in the twenty seventh aspect, said apparatus for multi-carrier transmission provides an ADC (analog to digital converter) means which converts analog signals transmitted from said counter communication equipment using the carrier of said second frequency band to the voltage value expressed in digital form, a FFT (fast Fourier transform) means which implements the fast Fourier transform to said voltage value expressed in digital form from said ADC means and takes out each carrier whose amplitude is modulated of said second frequency band, a second memorizing means which memorizes the two kinds of bit allocation allocated to each carrier and transmission power allocation used for each carrier of said second frequency band transmitting from said counter communication equipment, at the period that said noise is large at said apparatus for multi-carrier transmission and at the period that said noise is large at said counter communication equipment, a demodulating means which reads out the two kinds of the bit allocation and transmission power allocation from said second memorizing means and takes out the data allocated to each carrier of said second frequency band from said FFT means, by using the same bit allocation and transmission power allocation as the bit allocation and transmission power allocation allocated corresponding to the changing timing of noise level at said counter communication equipment, a receiving means providing a second temporarily memorizing means which temporarily memorizes the data taken out by said demodulating means, in order to make the output amount of data a constant value, and a second filter means which removes side lobes generated at said first frequency band by each carrier of said second frequency band transmitted from said counter communication equipment, at the front position of said receiving means.

According to a twenty ninth aspect of the present invention, in the twenty third aspect, said first frequency band is a high frequency band and said second frequency band is a low frequency band.

According to a thirtieth of the present invention, in the twenty third aspect, said first frequency band is a low frequency band and said second frequency band is a high frequency band.

An apparatus for multi-carrier transmission of the present invention implements the data transmission from the apparatus for multi-carrier transmission to the counter communication equipment using the first frequency band and implements the data transmission from the counter communication equipment to the apparatus for multi-carrier transmission using the second frequency band. The bit allocation is allocated to each carrier of the first frequency band, by making the bit rate of the data transmission implementing during the period that the noise becomes large at the counter communication equipment higher than bit rate of the data transmission implementing during the period that the noise becomes large at the apparatus for multi-carrier transmission. With this, the present invention can improve the communication performance largely under the noise environment of the changing noise level, securing the compatibility with the existing communication systems using the frequency division. The frequency division system is used for the data transmission, therefore the mutual cross-talk noise does not exist and a complex apparatus such as an echo canceler is not needed to be installed.

The bit allocation allocating to each carrier of the first frequency band and transmission power allocation using for each carrier of the first frequency band which transmits the data during the period that the noise is large at the apparatus for multi-carrier transmission and the bit allocation allocating to each carrier of the first frequency band and transmission power allocation using for each carrier of the first frequency band which transmits the data during the period that the noise is large a the counter communication equipment are memorized. The bit allocation to the carrier of the first frequency band is allocated, by making the bit rate of the data transmission at the period that the noise becomes large at the counter communication equipment higher than the bit rate of the data transmission at the period that the noise becomes large at the apparatus for multi-carrier transmission. With this, the data transmission corresponding to the noise level can be implemented.

The bit allocation allocating to each carrier of the second frequency band and transmission power allocation using for each carrier of the second frequency band transmitted from the counter communication equipment during the period that the noise is large at the apparatus for multi-carrier transmission and the bit allocation allocating to each carrier of the second frequency band and transmission power allocation using for each carrier of the second frequency band transmitted from the counter communication equipment during the period that the noise is large at the counter communication equipment are memorized. The signal transmitted from the counter communication equipment is demodulated by using the same bit allocation and transmission power allocation as the bit allocation and transmission power allocation used corresponding to the changing timing of noise level at the counter communication equipment. With this, even the amount of data transmission from the counter communication equipment is changed by the change of noise level, the transmitted data can be demodulated corresponding to the change.

According to a thirty first aspect of the present invention, at a method for multi-carrier transmission at a system for multi-carrier transmission which implements data transmission using the multi-carrier between a first communication equipment and a second communication equipment interactively under the noise environment that the changing timing of noise level is known, said first communication equipment provides a switching process which switches the bit allocation allocating to each carrier of a first frequency band which transmits the data corresponding to the changing timing of noise level, an allocating process which allocates the data to each carrier of said first frequency band corresponding to the switched bits allocation, and a first data transmitting process including a transmitting process which transmits each carrier allocated data of said first frequency band to said second communication equipment. And said second communication equipment, provides a switching process which switches the bit allocation allocating to each carrier of a second frequency band which transmits the data corresponding to the changing timing of noise level, an allocating process which allocates the data to each carrier of said second frequency band corresponding to the switched bits allocation, and a second data transmitting process including a transmitting process which transmits each carrier allocated data of said second frequency band to said first communication equipment. And said method for multi-carrier transmission, at the period that the noise is large at the data transmission of a first direction from said first communication equipment to said second communication equipment, makes the bit rate of the data transmission of said second direction from said second communication equipment to said first communication equipment using said second frequency band higher than the bit rate of the data transmission of said first direction from said first communication equipment to said second communication equipment using said first frequency band.

According to a thirty second aspect of the present invention, in the thirty first aspect, said method for multi-carrier transmission, at the period that the noise generated at the data transmission to the second direction is large, makes the bit rate of the data transmission to said first direction using said first frequency band higher than the bit rate of the data transmission to said second direction using said second frequency band.

According to a thirty third aspect of the present invention, in the thirty first aspect, said first data transmitting process allocates the data to each carrier of said first frequency band, by making the bit rate during the period that the noise generated at the data transmission to said second direction is large higher than the bit rate during the period that the noise generated at the data transmission to said first direction is large and implements the data transmission.

According to a thirty fourth aspect of the present invention, in the thirty first aspect, said second data transmitting process allocates the data to each carrier of said second frequency band, by making the bit rate during the period that the noise generated at the data transmission to said first direction is large higher than the bit rate during the period that the noise generated at the data transmission to said second direction is large and implements the data transmission.

According to a thirty fifth aspect of the present invention, in the thirty first aspect, said first communication equipment provides a first pseudo-random signal generating process which generates pseudo-random signals allocated in sequence the data being predetermined pseudo-random order to each carrier of said first frequency band using for the data transmission to said first direction, and a first transmitting process which transmits said pseudo-random signals generated at said first pseudo-random signal generating process to said second communication equipment. And said second communication equipment, provides a first receiving process which receives said pseudo-random signals transmitted from said first communication equipment, a first SNR (signal to noise ratio) calculating process which calculates the SNR value of each carrier of said first frequency band using for the data transmission to said first direction, used said pseudo-random signals received at said first receiving process, at the period that the noise generated at the data transmission to said first direction is large and at the period that the noise generated at the data transmission to said second direction is large, a first bit and power allocation calculating process which calculates the bit allocation allocating to each carrier and transmission power allocation using for each carrier of said first frequency band, by using said SNR value of each carrier calculated at said first SNR calculating process, at the period that the noise generated at the data transmission to said first direction is large and at the period that the noise generated at the data transmission to said second direction is large, a first memorizing process which memorizes the two kinds of bit allocation and transmission power allocation calculated at said first bit and power allocation calculating process, and a second transmitting process which transmits the two kinds of bit allocation and transmission power allocation calculated at said first bit and power allocation calculating process to said first communication equipment. And said first communication equipment provides a second receiving process which receives the two kinds of bit allocation and transmission power allocation transmitted form said second communication equipment, and a second memorizing process which memorizes said two kinds of bit allocation and transmission allocation received by said second receiving process, said first data transmitting process includes a first modulating process which allocates the bit allocation and transmission power allocation to each carrier of said first frequency band, by making the bit rate at the period that the noise generated at the data transmission to said second direction is large higher than the bit rate at the period that the noise generated at the data transmission to said first direction is large corresponding to the changing timing of noise level, using the two kinds of bit allocation and transmission power allocation memorized by said second memorizing process.

According to a thirty sixth aspect of the present invention, in the thirty first aspect, said second communication equipment provides a second pseudo-random signal generating process which generates pseudo-random signals allocated in sequence the data being predetermined pseudo-random order to each carrier of said second frequency band using for the data transmission to said second direction, and a third transmitting process which transmits said pseudo-random signals generated at said second pseudo-random signal generating process to said first communication equipment. And said first communication equipment provides a third receiving process which receives said pseudo-random signals transmitted from said second communication equipment, a second SNR (signal to noise ratio) calculating process which calculates the SNR value of each carrier of said second frequency band using for the data transmission to said second direction, used said pseudo-random signals received at said third receiving process, at the period that the noise generated at the data transmission to said first direction is large and at the period that the noise generated at the data transmission to said second direction is large, a second bit and power allocation calculating process which calculates the bit allocation allocating to each carrier and transmission power allocation using for each carrier of said second frequency band, by using said SNR value of each carrier calculated at said second SNR calculating process, at the period that the noise generated at the data transmission to said first direction is large and at the period that the noise generated at the data transmission to said second direction is large, a third memorizing process which memorizes the two kinds of bit allocation and transmission power allocation calculated at said second bit and power allocation calculating process, and a fourth transmitting process which transmits the two kinds of bit allocation and transmission power allocation calculated at said second bit and power allocation calculating process to said second communication equipment. And said second communication equipment, provides a fourth receiving process which receives the two kinds of bit allocation and transmission power allocation transmitted form said first communication equipment, and a fourth memorizing process which memorizes said two kinds of bit allocation and transmission power allocation received by said fourth receiving process. And said second data transmitting process includes a second modulating process which allocates the bit allocation and transmission power allocation to each carrier of said second frequency band, by making the bit rate at the period that the noise generated at the data transmission to said first direction is large higher than the bit rate at the period that the noise generated at the data transmission to said second direction is large corresponding to the changing timing of noise level, using the two kinds of bit allocation and transmission power allocation memorized by said fourth memorizing process.

According to a thirty seventh aspect of the present invention, in the thirty sixth aspect, said first communication equipment provides a first data receiving process including a first demodulating process which demodulates the data transmitted from said second communication equipment, by using the same bit allocation and transmission power allocation as the bit allocation and transmission power allocation allocated corresponding to the changing timing of noise level at said second communication equipment, using the two kinds of bit allocation and transmission power allocation memorized by said third memorizing process.

According to a thirty eighth aspect of the present invention, in the thirty fifth aspect, said second communication equipment provides a second data receiving process including a second demodulating process which demodulates the data transmitted from said first communication equipment, by using the same bit allocation and transmission power allocation as the bit allocation and transmission power allocation allocated corresponding to the changing timing of noise level at said first communication equipment, using the two kinds of bit allocation and transmission power allocation memorized by said first memorizing process.

According to a thirty ninth aspect of the present invention, in the thirty first aspect, said first data transmitting process provides a first temporarily memorizing process for memorizing the data transmitted from external equipment temporarily, a first reading out process which reads out the two kinds of bit allocation and transmission power allocation memorized at said first memorizing process, a first selecting process which selects the bit allocation allocating to each carrier and transmission power allocation using for said each carrier of said first frequency band from the two kinds of bit allocation and transmission power allocation read out by said first reading out process, corresponding to the changing timing of noise level, a first modulating process which modulates the amplitude of each carrier of said first frequency band to the amplitude corresponding to the selected bit allocation and transmission power allocation and the order of bits of the data allocating to said each carrier, a first IFFT (inverse fast Fourier transform) process which adds up each carrier of said first frequency band modulated the amplitude at said first modulating process and outputs the voltage value expressed in digital form, a first DAC (digital to analog converter) process which converts the voltage value expressed in digital form outputted from said first IFFT process to analog signals and outputs to a loop, and a first filter process which removes side lobes generated at said second frequency band by the carrier of said first frequency band outputted to the loop by said first DAC process.

According to a fortieth aspect of the present invention, in the thirty first aspect, said second data transmitting process provides a second temporarily memorizing process for memorizing the data transmitted from external equipment temporarily, a second reading out process which reads out the two kinds of bit allocation and transmission power allocation memorized at said second memorizing process, a second selecting process which selects the bit allocation allocating to each carrier and transmission power allocation using for said each carrier of said second frequency band from the two kinds of bit allocation and transmission power allocation read out by said second reading out process, corresponding to the changing timing of noise level, a second modulating process which modulates the amplitude of each carrier of said second frequency band to the amplitude corresponding to the selected bit allocation and transmission power allocation and the order of bits of the data allocating to said each carrier, a second IFFT (inverse fast Fourier transform) process which adds up each carrier of said second frequency band modulated the amplitude at said second modulating process and outputs the voltage value expressed in digital form, a second DAC (digital to analog converter) process which converts the voltage value expressed in digital form outputted from said second IFFT process to analog signals and outputs to a loop, and a second filter process which removes side lobes generated at said first frequency band by the carrier of said second frequency band outputted to the loop by said second DAC process.

According to a forty first aspect of the present invention, in the thirty seventh aspect, said first data receiving process provides a third filter process which removes side lobes generated at said first frequency band by each carrier of said second frequency band transmitted from said second communication equipment, a first ADC (analog to digital converter) process which converts analog signals transmitted from said second communication equipment using the carrier of said second frequency band to the voltage value expressed in digital form, a first FFT (fast Fourier transform) process which implements the fast Fourier transform to said voltage value expressed in digital form from said first ADC process and takes out each carrier whose amplitude is modulated of said second frequency band, a third reading out process which reads out the two kinds of bit allocation and transmission power allocation memorized at said third memorizing process, a third selecting process which selects the same bit allocation and transmission power allocation as the bit allocation and transmission power allocation allocated corresponding to the noise level generated at the data transmission at said second communication equipment from the two kinds of bit allocation and transmission power allocation read out by said third reading out process, a first demodulating process which takes out the data, allocated to each carrier of said second frequency band, whose amplitude is modulated taken out at said first FFT process, by using the two kinds of bit allocation and transmission power allocation read out by said third reading out process, and a third temporarily memorizing process which memorizes the data taken out from said first demodulating process temporarily, in order to make the output amount of data a constant value.

According to a forty second aspect of the present invention, in the thirty eighth aspect, said second data receiving process provides a fourth filter process which removes side lobes generated at said second frequency band by each carrier of said first frequency band transmitted from said first communication equipment, a second ADC (analog to digital converter) process which converts analog signals transmitted from said first communication equipment using the carrier of said first frequency band to the voltage value expressed in digital form, a second FFT (fast Fourier transform) process which implements the fast Fourier transform to said voltage value expressed in digital form from said second ADC process and takes out each carrier whose amplitude is modulated of said first frequency band, a fourth reading out process which reads out the two kinds of bit allocation and transmission power allocation memorized at said first memorizing process, a fourth selecting process which selects the same bit allocation and transmission power allocation as the bit allocation and transmission power allocation allocated corresponding to the noise level generated at the data transmission at said first communication equipment from the two kinds of bit allocation and transmission power allocation read out by said fourth reading out process, and a second demodulating process which takes out the data, allocated to each carrier of said first frequency band, whose amplitude is modulated taken out at said second FFT process, by using the two kinds of bit allocation and transmission power allocation read out by said fourth reading out process, and a fourth temporarily memorizing process which memorizes the data taken out from said second demodulating process temporarily, in order to make the output amount of data a constant value.

According to a forty third aspect of the present invention, in the thirty eighth aspect, said first communication equipment provides a signal synchronized with noise generating process which generates a signal synchronized with noise which makes the amplitude of the designated carrier change, by synchronizing with the changing timing of noise level, and a fifth transmitting process which transmits the signal synchronized with noise generated at said signal synchronized with noise generating process to said second communication equipment, and said second communication equipment provides a fifth receiving process which receives said signal synchronized with noise transmitted from said first communication equipment, a timing detecting process which detects the changing timing of noise level by the change of the amplitude of said designated carrier received at said fifth receiving process, and a bit and power allocation selecting process which implements the designation of the bit allocation and transmission power allocation using for the data transmission corresponding to the noise level, from the two kinds of bit allocation and transmission power allocation memorized in said fourth memorizing process to said second modulating process, by the changing timing of noise level detected by said timing detecting process, and designates the same bit allocation and transmission power allocation as the bit allocation and transmission power allocation used corresponding to the noise level at said first communication equipment from the two kinds of bit allocation and transmission power allocation memorized in said first memorizing process to said second demodulating process, to said second demodulating process.

According to a forty fourth aspect of the present invention, in the thirty first aspect, said first frequency band is a high frequency band and said second frequency band is a low frequency band.

According to a forty fifth aspect of the present invention, in the thirty first aspect, said first frequency band is a low frequency band and said second frequency band is a high frequency band.

A method for multi-carrier transmission of the present invention separates the frequency band using for the data transmission to the first direction and the frequency band using for the data transmission to the second direction. During the period that the noise generated at the data transmission to the first direction is large, the bit rate of the transmission to the second direction using the second frequency band is made higher than the bit rate of the transmission to the first direction using the first frequency band. During the period that the noise generated at the data transmission to the second direction is large, the bit rate of the transmission to the first direction using the first frequency band is made higher than the bit rate of the transmission to the second direction using the second frequency band. With this, the present invention can improve the communication performance largely under the noise environment of the changing noise level, securing the compatibility with the existing communication systems using the frequency division system. The frequency bands used for the data transmission to the first direction and the second direction are separated, therefore the mutual cross-talk noise does not exist and a complex apparatus such as an echo canceler is not needed to be installed.

At the first communication equipment, the bit allocation allocating to each carrier of the first frequency band and transmission power allocation using for each carrier of the first frequency band which transmits the data to the first direction, at the period that the noise generated at the data transmission to the first direction is large and the bit allocation allocating to each carrier of the first frequency band and transmission power allocation using for each carrier of the first frequency band which transmits the data to the first direction, at the period that the noise generated at the data transmission to the second direction is large are memorized. The bit allocation to the carrier of the first frequency band is allocated, by making the bit rate at the period that the noise generated at the data transmission to the second direction higher than the bit rate at the period that the noise generated at the data transmission to the first direction. With this, the transmission capacity to the first direction is secured under the noise environment of the changing noise level.

At the second communication equipment, the bit allocation allocating to each carrier of the second frequency band and transmission power allocation using for each carrier of the second frequency band which transmits the data to the second direction, at the period that the noise generated at the data transmission to the first direction is large and the bit allocation allocating to each carrier of the second frequency band and transmission power allocation using for each carrier of the second frequency band which transmits the data to the second direction, at the period that the noise generated at the data transmission to the second direction is large are memorized. The bit allocation to the carrier of the second frequency band is allocated, by making the bit rate at the period that the noise generated at the data transmission to the first direction is large higher than the bit rate at the period that the noise generated at the data transmission to the second direction is large. With this, the transmission capacity to the second direction is secured under the noise environment of the changing noise level.

At the first communication equipment, the bit allocation allocating to each carrier of the second frequency band and transmission power allocation using for each carrier of the second frequency band transmitting from the second communication equipment, at the period that the noise generated at the data transmission to the second direction is large, and the bit allocation allocating to each carrier of the second frequency band and transmission power allocation using for each carrier of the second frequency band transmitting from the second communication equipment, at the period that the noise generated at the data transmission to the first direction is large are memorized. The data transmitted from the second communication equipment are demodulated using the same bit allocation and transmission power allocation as the bit allocation and transmission power allocation allocated corresponding to the changing timing of noise level at the second communication equipment from the memorized two kinds of bit allocation and transmission power allocation. With this, even the transmission capacity of the data transmitting from the second communication equipment is changed by the change of noise level, the data can be demodulated at the first communication equipment.

At the second communication equipment, the bit allocation allocating to each carrier of the first frequency band and transmission power allocation using for each carrier of the first frequency band transmitting from the first communication equipment, at the period that the noise generated at the data transmission to the second direction is large, and the bit allocation allocating to each carrier of the first frequency band and transmission power allocation using for each carrier of the first frequency band transmitting from the first communication equipment, at the period that the noise generated at the data transmission to the first direction is large are memorized. The data transmitted from the first communication equipment are demodulated using the same bit allocation and transmission power allocation as the bit allocation and transmission power allocation allocated corresponding to the noise cycle changing cyclically at the first communication equipment from the memorized two kinds of bit allocation and transmission power allocation. With this, even the transmission capacity of the data transmitting from the second communication equipment is changed by the change of noise level, the data can be demodulated at the second communication equipment.

At the second communication equipment, the pseudo-random signal allocated in sequence data being the predetermined pseudo-random order is generated to each carrier of the second frequency band using for the data transmission of the second direction and is transmitted to the first communication equipment. At the first communication equipment, the bit allocation allocating to each carrier and transmission power allocation using for each carrier of the second frequency band is calculated by using this pseudo-random signal. With this, the bit allocation and transmission power allocation corresponding to the noise level can be calculated.

At the first communication equipment, the pseudo-random signal allocated in sequence data being the predetermined pseudo-random order is generated to each carrier of the first frequency band using for the data transmission of the first direction and is transmitted to the second communication equipment. At the second communication equipment, the bit allocation allocating to each carrier and transmission power allocation using for each carrier of the first frequency band is calculated by using this pseudo-random signal. With this, the bit allocation and transmission power allocation corresponding to the noise level can be calculated.

According to a forty sixth aspect of the present invention, a method for multi-carrier transmission under the noise environment that the changing timing of noise level is known provides a bit allocation switching process which switches the bit allocation allocating to each carrier of a first frequency band corresponding to the changing timing of noise level, at an apparatus for multi-carrier transmission implementing the data transmission using said first frequency band, an allocating process which allocates data to each carrier of said first frequency band, by using the switched bit allocation, and a transmitting process including a carrier transmitting process which transmits each carrier of said first frequency band allocated data to a counter communication equipment. And the method makes the bit rate of the data transmission implementing at the period that the noise level becomes large at said counter communication equipment higher than the bit rate of the data transmission implementing at the period that the noise level becomes large at said apparatus for multi-carrier transmission.

According to a forty seventh aspect of the present invention, in the forty sixth aspect, said transmitting process provides a first reading out process which reads out the two kinds of bit allocation and transmission power allocation from a first memorizing process which memorized the bit allocation allocating to each carrier and transmission power allocation using for each carrier of said first frequency band transmitting data at the period that said noise is large at said apparatus for multi-carrier transmission and the bit allocation allocating to each carrier and transmission power allocation using for each carrier of said first frequency band transmitting data at the period that said noise is large at said counter communication equipment, a first selecting process which switches the two kinds of bit allocation and transmission power allocation read out from said first reading out process, corresponding to the changing timing of noise level, and a modulating process which allocates the bit allocation and transmission power allocation to each carrier of said first frequency band, using the bit allocation and transmission power allocation selected by said first selecting process, by making the bit rate of the data transmission implementing at the period that said noise becomes large at said counter communication equipment higher than the bit rate of the data transmission implementing at the period that said noise becomes large at said apparatus for multi-carrier transmission.

According to a forty eighth aspect of the present invention, in the forty sixth aspect, a second reading out process which reads out the two kinds of bit allocation and transmission power allocation from a second memorizing process which memorized the bit allocation allocating to each carrier and transmission power allocation using for each carrier of said second frequency band transmitting data at the period that said noise is large at said apparatus for multi-carrier transmission and the bit allocation allocating to each carrier and transmission power allocation using for each carrier of said second frequency band transmitting data at the period that said noise is large at said counter communication equipment, a second selecting process which switches the two kinds of bit allocation and transmission power allocation read out from said second reading out process, corresponding to the changing timing of noise level, and a receiving process including a demodulating process which takes out the data from each carrier of said second frequency band transmitted from said counter communication equipment, using the bit allocation and transmission power allocation selected by said second selecting process.

According to a forty ninth aspect of the present invention, in the forty sixth aspect, said transmitting process provides a first temporarily memorizing process for memorizing the data transmitted from external equipment temporarily, a first reading out process which reads out the data to be transmitted from said first temporarily memorizing process and the two kinds of bit allocation allocating to each carrier and transmission power allocation using for said each carrier of said first frequency band transmitting the data from said first memorizing process, at the period that the noise is large at said apparatus for multi-carrier transmission and at the period that the noise is large at said counter communication equipment, a first selecting process which selects the bit allocation allocating to each carrier and transmission power allocation using for said each carrier of said first frequency band from the two kinds of bit allocation and transmission power allocation read out by said first reading out process, corresponding to the changing timing of noise level, a modulating process which modulates the amplitude of each carrier to the amplitude corresponding to the bit allocation and transmission power allocation selected by said first selecting process and the order of bits of the data allocating to said each carrier read out from said first selecting process, an IFFT (inverse fast Fourier transform) process which adds up each carrier of said first frequency band modulated the amplitude at said modulating process and outputs the voltage value expressed in digital form, a DAC (digital to analog converter) process which converts the voltage value expressed in digital form outputted from said IFFT process to analog signals and outputs to a loop, and a first filter process which removes side lobes generated at said second frequency band by the carrier of said first frequency band outputted to the loop by said DAC process. And the method allocates the bit allocation and transmission power allocation to each carrier of said first frequency band, by making the bit rate at the period that said noise is large at said counter communication equipment higher than the bit rate at the period that said noise is large at said apparatus for multi-carrier transmission, corresponding to the changing timing of noise level.

According to a fiftieth aspect of the present invention, in the forty eighth aspect, said first receiving process provides a second filter process which removes side lobes generated at said first frequency band by each carrier of said second frequency band transmitted from said counter communication equipment, provided at the front position of said receiving process, an ADC (analog to digital converter) process which converts analog signals transmitted from said counter communication equipment using the carrier of said second frequency band to the voltage value expressed in digital form, a FFT (fast Fourier transform) process which implements the fast Fourier transform to said voltage value expressed in digital form from said ADC process and takes out each carrier whose amplitude is modulated of said second frequency band, a second reading out process which reads out the two kinds of bit allocation allocating to each carrier of said second frequency band and transmission power allocation using for said each carrier of said second frequency band, at the period that said noise is large at said apparatus for multi-carrier transmission and at the period that said noise is large at counter communication equipment, which are memorized at said second memorizing process, a demodulating process which takes out the data allocated to each carrier of said second frequency band from said FFT process, by using the same bit allocation and transmission power allocation as the bit allocation and transmission power allocation allocated corresponding to the changing timing of noise level at said counter communication equipment, and a second temporarily memorizing process which memorizes the data taken out from said demodulating process temporarily, in order to make the output amount of data a constant value.

According to a fifty first aspect of the present invention, in the forty sixth aspect, said first frequency band is a high frequency band and said second frequency band is a low frequency band.

According to a fifty second aspect of the present invention, in the forty sixth aspect, said first frequency band is a low frequency band and said second frequency band is a high frequency band.

A method for multi-carrier transmission of the present invention implements the data transmission from the apparatus for multi-carrier transmission to the counter communication equipment using the first frequency band and implements the data transmission from the counter communication equipment to the apparatus for multi-carrier transmission using the second frequency band. The bit allocation is allocated to each carrier of the first frequency band, by making the bit rate of the data transmission implementing during the period that the noise becomes large at the counter communication equipment higher than bit rate of the data transmission implementing during the period that the noise becomes large at the apparatus for multi-carrier transmission. With this, the present invention can improve the communication performance largely under the noise environment of the changing noise level, securing the compatibility with the existing communication systems using the frequency division system. The frequency division system is used for the data transmission, therefore the mutual cross-talk noise does not exist.

The bit allocation allocating to each carrier of the first frequency band and transmission power allocation using for each carrier of the first frequency band which transmits the data during the period that the noise is large at the apparatus for multi-carrier transmission and the bit allocation allocating to each carrier of the first frequency band and transmission power allocation using for each carrier of the first frequency band which transmits the data during the period that the noise is large at the counter communication equipment are memorized. The bit allocation to the carrier of the first frequency band is allocated, by making the bit rate of the data transmission at the period that the noise becomes large at the counter communication equipment higher than the bit rate of the data transmission at the period that the noise becomes large at the apparatus for multi-carrier transmission. With this, the data transmission corresponding to the noise level can be implemented.

The bit allocation allocating to each carrier of the second frequency band and transmission power allocation using for each carrier of the second frequency band transmitted from the counter communication equipment during the period that the noise is large at the apparatus for multi-carrier transmission and the bit allocation allocating to each carrier of the second frequency band and transmission power allocation using for each carrier of the second frequency band transmitted from the counter communication equipment during the period that the noise is large at the counter communication equipment are memorized. The signal transmitted from the counter communication equipment is demodulated by using the same bit allocation and transmission power allocation as the bit allocation and transmission power allocation used corresponding to the changing timing of noise level at the counter communication equipment. With this, even the amount of data transmission from the counter communication equipment is changed by the change of noise level, the transmitted data can be demodulated corresponding to the change.

BRIEF DESCRIPTION OF THE DRAWINGS

The objects and features of the present invention will become more apparent from the consideration of the following detailed description taken in conjunction with the accompanying drawings in which:

FIG. 6A is a diagram showing the average values of the SNR at the NEXT generated and the FEXT generated, which are evaluated at the downstream SNR evaluating section;

FIG. 6B is a diagram showing the determining state of the bit allocation of each carrier corresponding to the average value of SNR evaluated at the downstream SNR evaluating section;

FIG. 7 is a hyperframe structure diagram composed of 345 symbols;

FIG. 10 is a block diagram showing the structure of an embodiment of the present invention;

FIG. 22 is a diagram showing the input signal constellation;

FIG. 29 is a block diagram showing the function of filters of another embodiment of the present invention;

DESCRIPTION OF THE PREFERRED EMBODIMENTS

Figure 1:
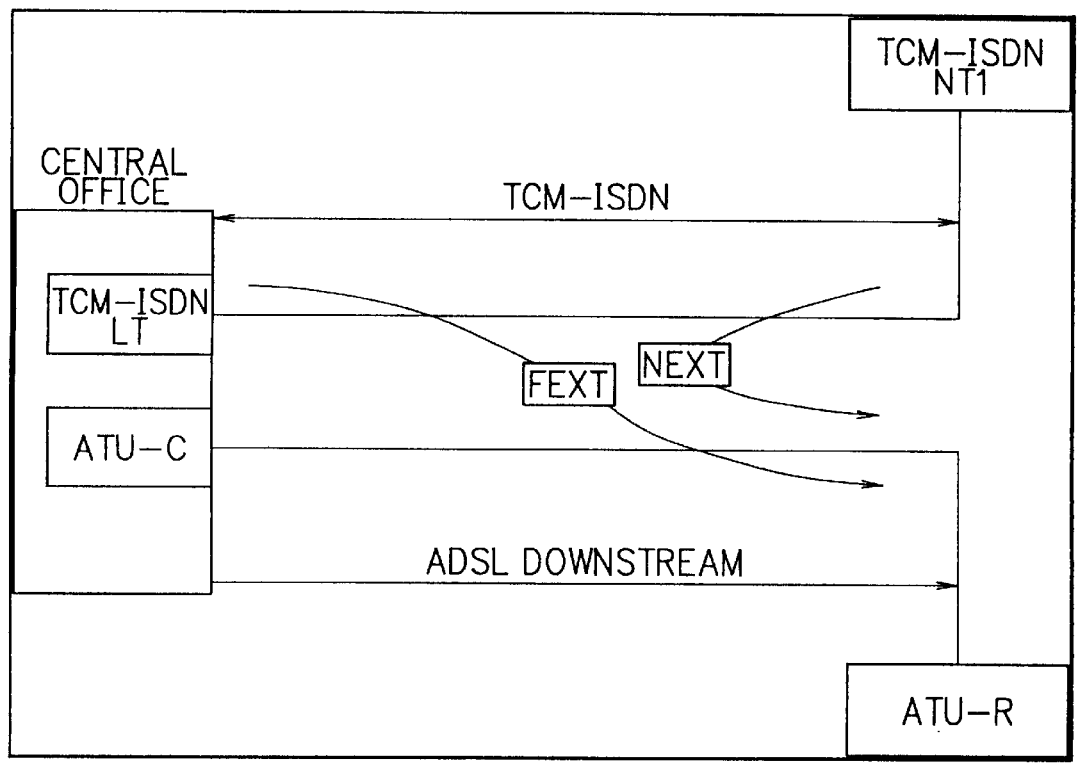
FIG. 1 is a cross-talk noise diagram showing a cross-talk noise generated in the ADSL apparatus caused by the ISDN line.
Figure 2:
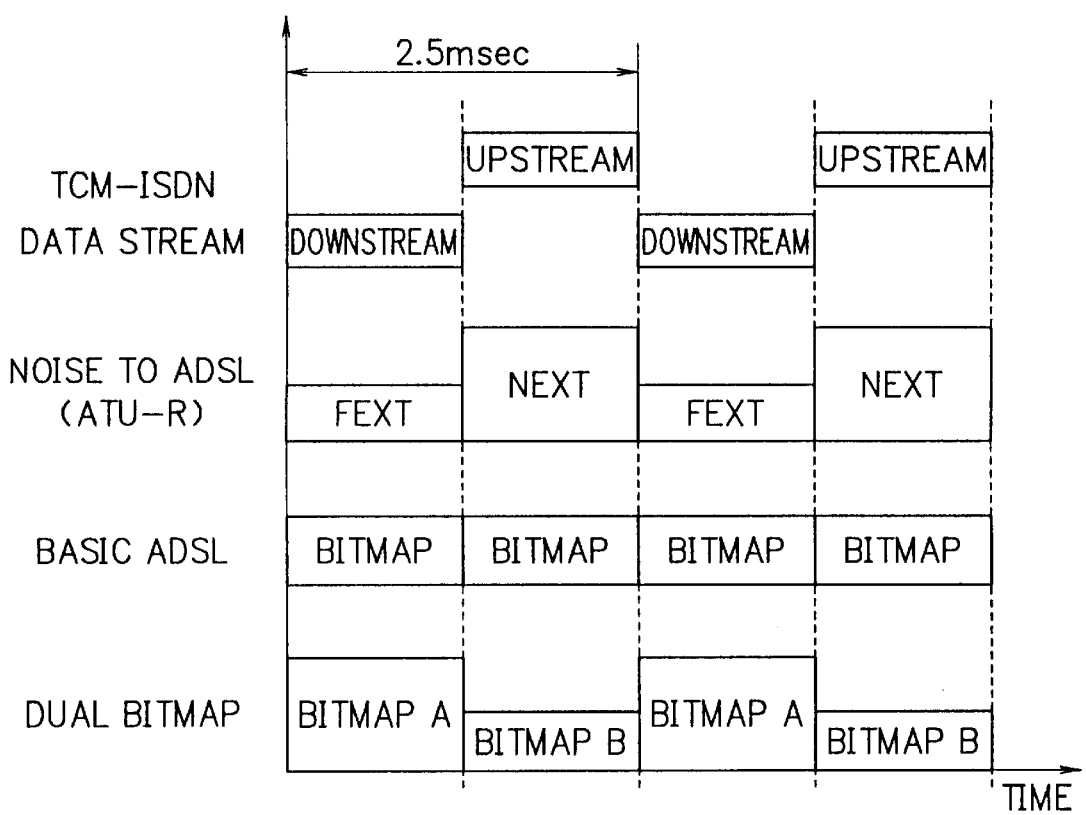
FIG. 2 is a noise amount diagram showing the amount of the cross-talk noise in FIG. 1.
Figure 3:
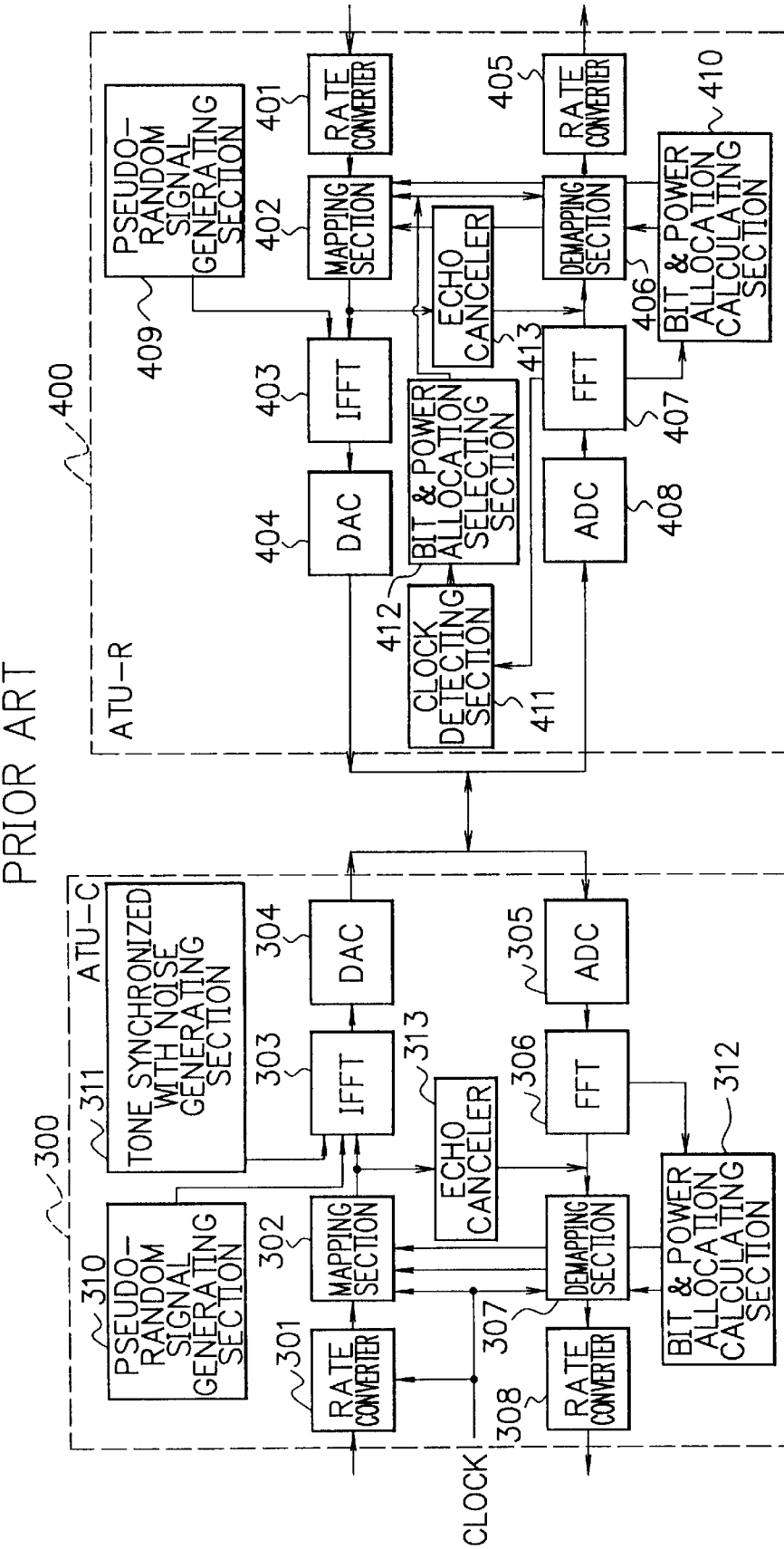
FIG. 3 is a block diagram showing the structure of a conventional ADSL apparatus.
Figure 4:
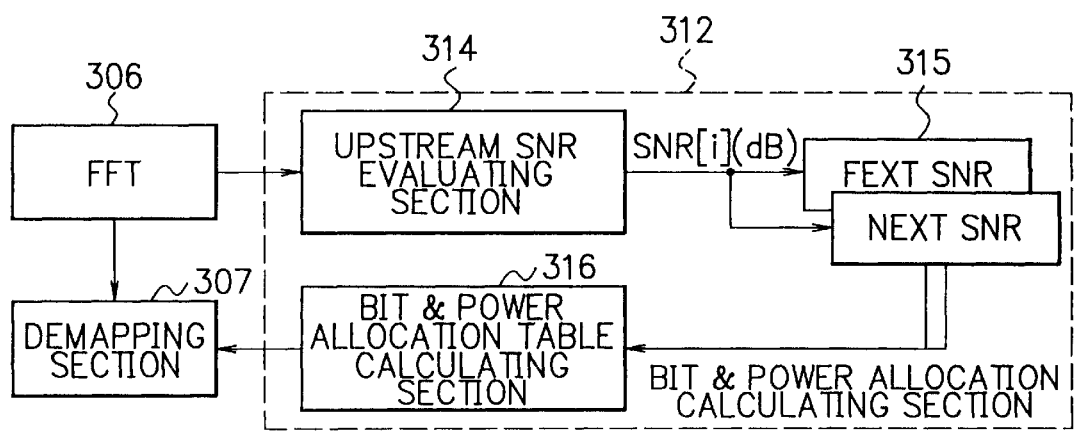
FIG. 4 is a block diagram showing the structure of a bit & power allocation calculating section of the ATU-C.

Referring now to the drawings, embodiments of a system, an apparatus and a method for multi-carrier transmission of the present invention are explained in detail. In FIGS. 9 to 33, the embodiments of the present invention are explained.

Figure 9:
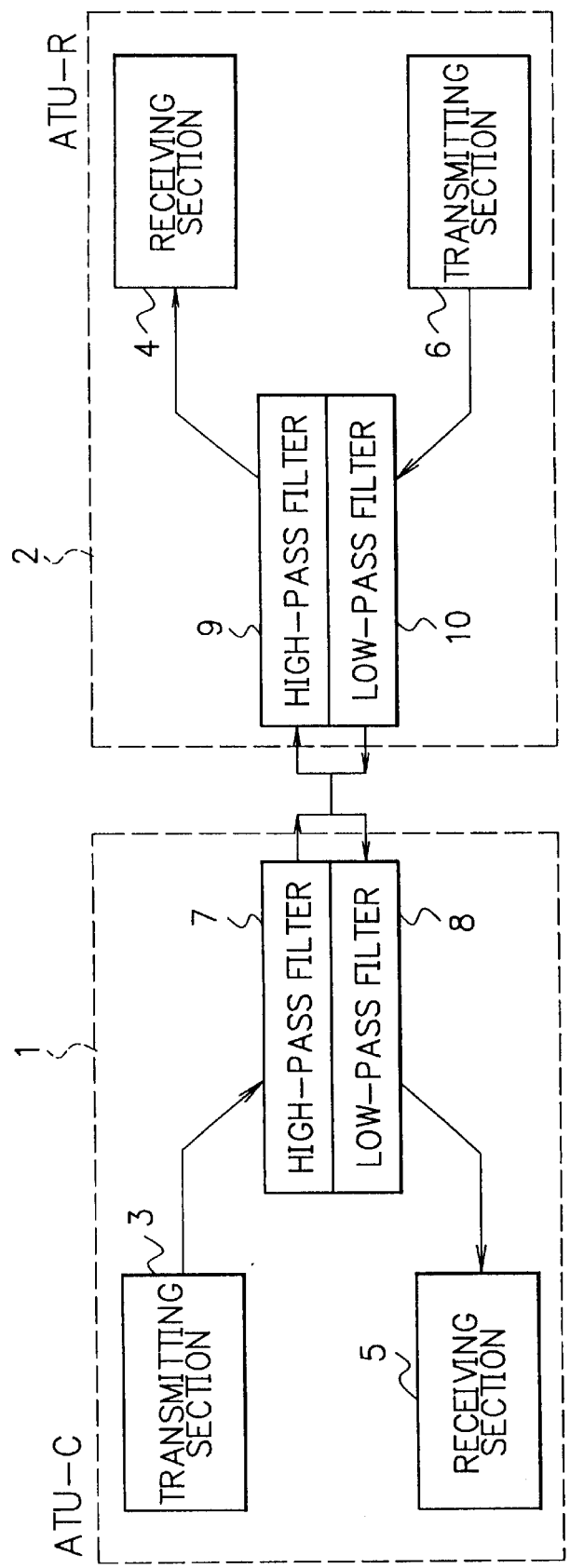
FIG. 9 is a block diagram showing an embodiment of a system for multi-carrier transmission of the present invention.

FIG. 9 is a block diagram showing an embodiment of the present invention. In FIG. 9, the system and the method for multi-carrier transmission of the present invention are applied for an ADSL system. As shown in FIG. 9, this embodiment provides an ATU-C (ADSL transceiver unit, central office end) 1 as a central office and an ATU-R (ADSI, transceiver unit, remote terminal end) 2 as a remote terminal end.

The ATU-C 1 provides a transmitting section 3 and a receiving section 5 and the ATU-R 2 provides a transmitting section 6 and a receiving section 4 and these sections have big function respectively. At the back position of the transmitting section 3 of the ATU-C 1, a high-pass filter 7 which removes side lobes generated by the frequency band using for downstream data transmission is provided. And at the front position of the receiving section 4 of the ATU-R 2, a high-pass filter 9 which removes side lobes generated by the frequency band using for downstream data transmission is provided. The same as mentioned above, at the front position of the receiving section 5 of the ATU-C 1, a low-pass filter 8 which removes side lobes generated by the frequency band using for upstream data transmission is provided. And at the back position of the transmitting section 6 of the ATU-R 2, a low-pass filter 10 which removes side lobes generated by the frequency band using for upstream data transmission is provided.

FIG. 10 is a block diagram showing the structure of an embodiment of the present invention. In FIG. 10, these functions of transmitting and receiving are shown in more detail. Referring to FIG. 10, the detailed structure of transmitting sections and receiving sections of the ATU-C 1 and ATU-R 2 is explained.

Figure 11:
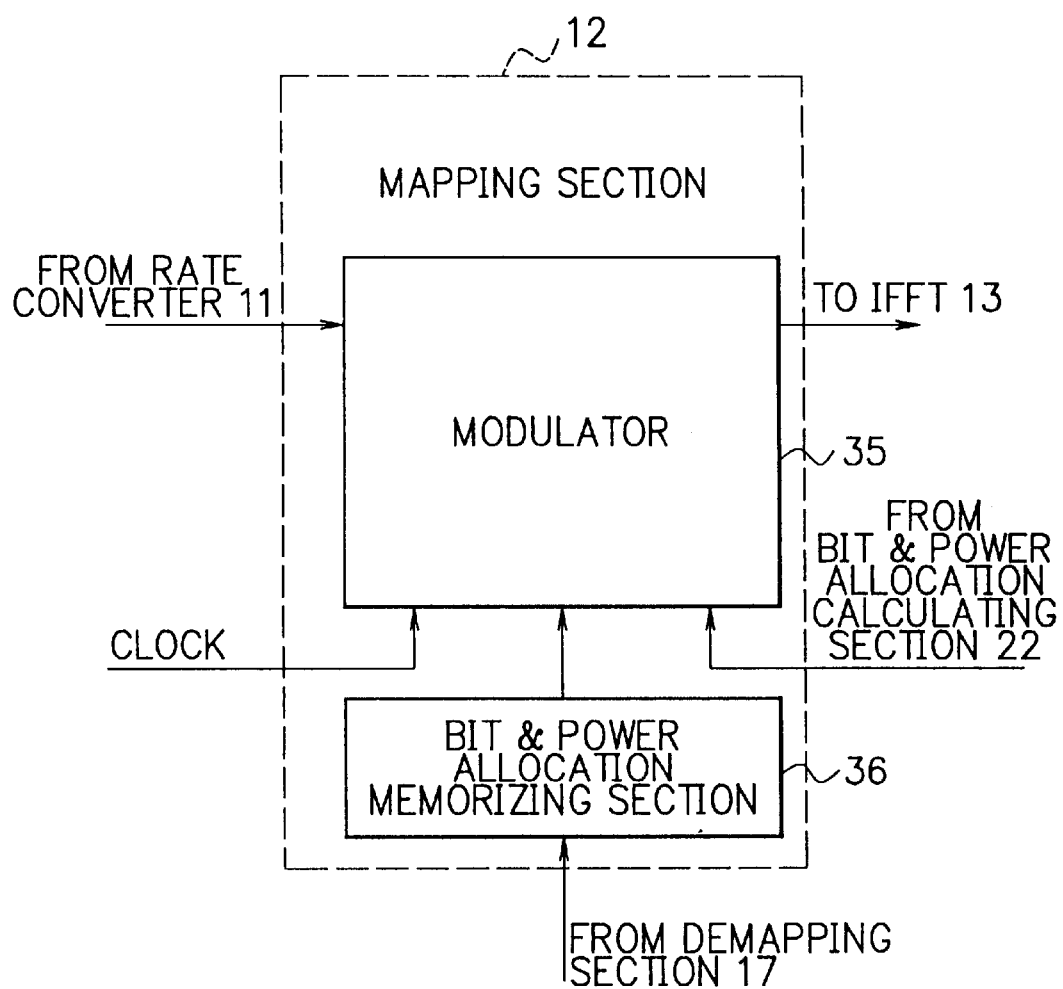
FIG. 11 is a block diagram showing the structure of the mapping section of the ATU-C.

The transmitting section 3 of the ATU-C 1 provides a rate converter 11 in which data transmitted in a constant speed from the external equipment are temporarily stored, a mapping section 12 which switches the bit allocation and transmission power allocation corresponding to the changing timing of noise level and implements the bit allocation and transmission power allocation to each carrier, an IFFT (inverse fast Fourier transform) 13 which implements the modulating and multiplexing in each carrier for multi-point QAM (quadrature amplitude modulation) signals being the output of this mapping, and a DAC (digital to analog converter) 14 which converts this digital mutiplexed output to a downstream analog signal and transmits the analog signal. And a high-pass filter 7 which removes the side lobes generated by the data transmission carrier is provided at the back position of the transmitting section 3. FIG. 11 is a block diagram showing the structure of the mapping section 12. As shown in FIG. 11, the mapping section 12 is constituted of a modulator 35 which modulates the amplitude of carriers and allocates the data to the carriers and a bit & power allocation memorizing section 36 which memorizes the bit allocation for allocating each carrier and the transmission power allocation using for each carrier.

Figure 12:
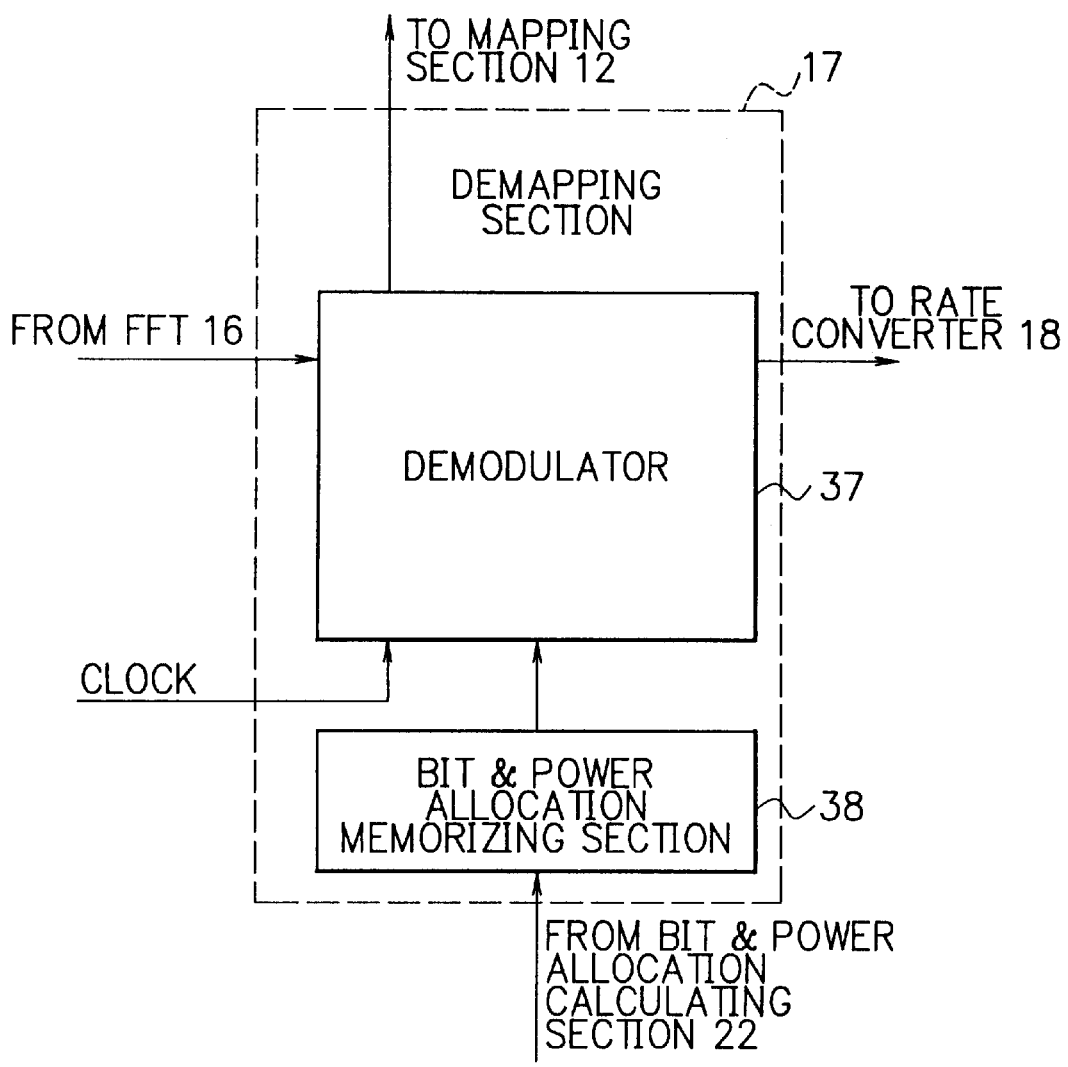
FIG. 12 is a block diagram showing the structure of the demapping section of the ATU-C.

The receiving section 5 of the ATU-C 1 provides an ADC (analog to digital converter) 15 which converts analog signals transmitted from the ATU-R 2 to digital signals, a FFT (fast Fourier transform) 16 which implements the fast Fourier transform for these digital signals, a demapping section 17 which switches the bit allocation and transmission power allocation corresponding to the changing timing of noise level and demodulates the transmitted signals, and a rate converter 18 which adjusts the change of the amount of data transmission caused by the change of bit allocation and transfers the data to the external equipment in a constant speed. And a low-pass filter 8 which removes the side lobes generated by the data transmission carrier is provided at the front position of the receiving section 5. FIG. 12 is a block diagram showing the structure of the demapping section 17. As shown in FIG. 12, the demapping section 17 is constituted of a demodulator 37 which takes out the data from the carrier transmitted from the ATU-R 2 and a bit and power allocation memorizing section 38 which memorizes the bit allocation and transmission power allocation using for the demodulation of the demodulator 37.

The ATU-C 1 further provides a pseudo-random signal generating section 20, a tone synchronized with noise generating section 21 and a bit & power allocation calculating section 22 to realize the present invention.

At the training period when the bit allocation allocating for carrier and the transmission power allocation using for carrier are calculated, the pseudo-random signal generating section 20 generates the pseudo-random signals allocated in sequence the data composed of predetermined pseudo-random order to each carrier using for downstream data transmission and outputs the result to the IFFT 13. The tone synchronized with noise generating section 21 generates the signal synchronized with noise which makes the amplitude of the predetermined carrier change synchronizing with the changing timing of noise level and outputs to the IFFT 13. The bit & power allocation calculating section 22 calculates plural SNR of each carrier every noise level used for upstream data transmission by using the pseudo-random signals transmitted from the ATU-R 2 and calculates the bit allocation allocating to each carrier and the transmission power allocation using for each carrier every noise level by the calculated average value of SNR of each carrier and memorizes the calculated bit allocation and transmission power allocation in the bit and power allocation memorizing section 38 of the demapping section 17 and also outputs to the mapping section 12.

Figure 13:
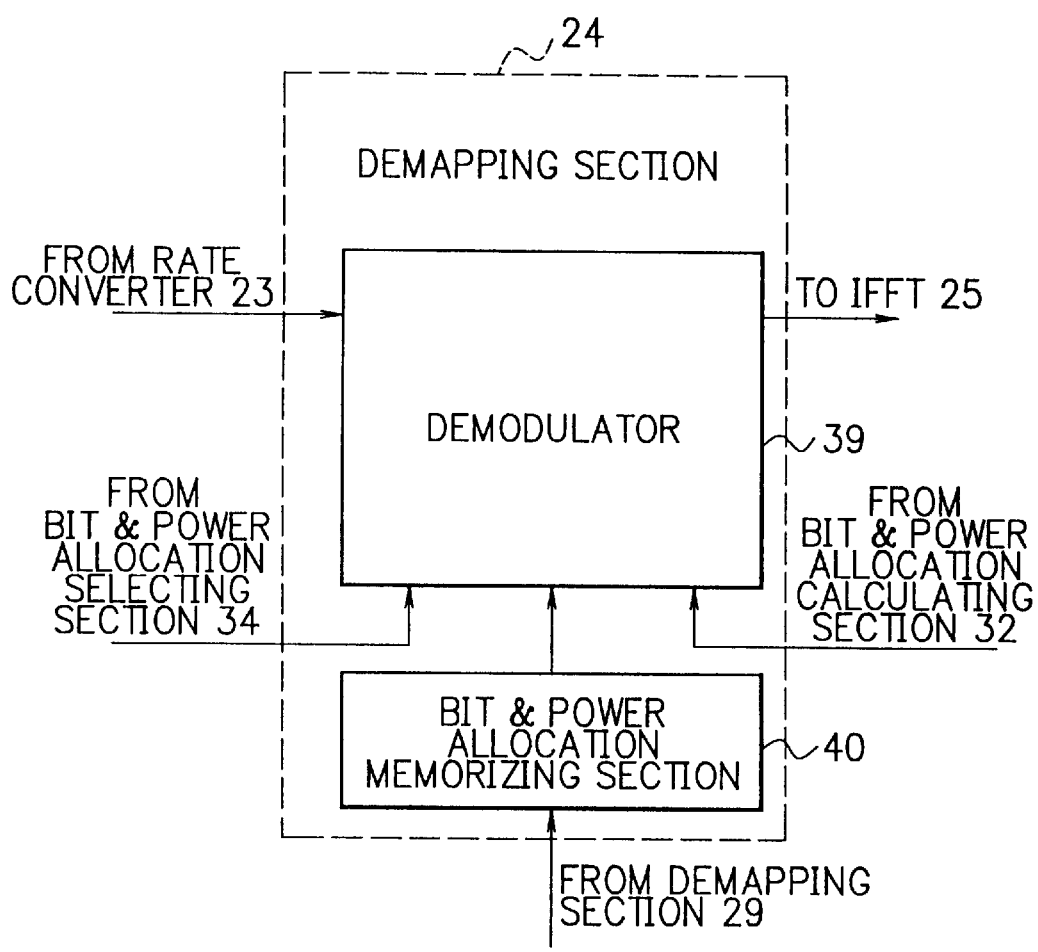
FIG. 13 is a block diagram showing the structure of the mapping section of ATU-R.

The transmitting section 6 of the ATU-R 2 provides a rate converter 23 in which data transmitted from the external equipment are temporarily stored, a mapping section 24 which switches the bit allocation and transmission power allocation corresponding to the changing timing of noise level and implements the bit allocation and transmission power allocation to each carrier, an IFFT (inverse fast Fourier transform) 25 which implements the modulating and multiplexing in each carrier for multi-point QAM (quadrature amplitude modulation) signals being the output of this mapping, and a DAC (digital to analog converter) 26 which converts this mutiplexed output to a upstream analog signal and transmits this analog signal. And a low-pass filter 10 which removes the side lobes generated by the data transmission carrier is provided at the back position of the transmitting section 6. FIG. 13 is a block diagram showing the structure of the mapping section 24. As shown in FIG. 13, the mapping section 24 is constituted of a modulator 39 which modulates the amplitude of carriers and allocates the data to the carriers and a bit & power allocation memorizing section 40 which memorizes the bit allocation for allocating to each carrier and the transmission power allocation using for each carrier.

Figure 14:
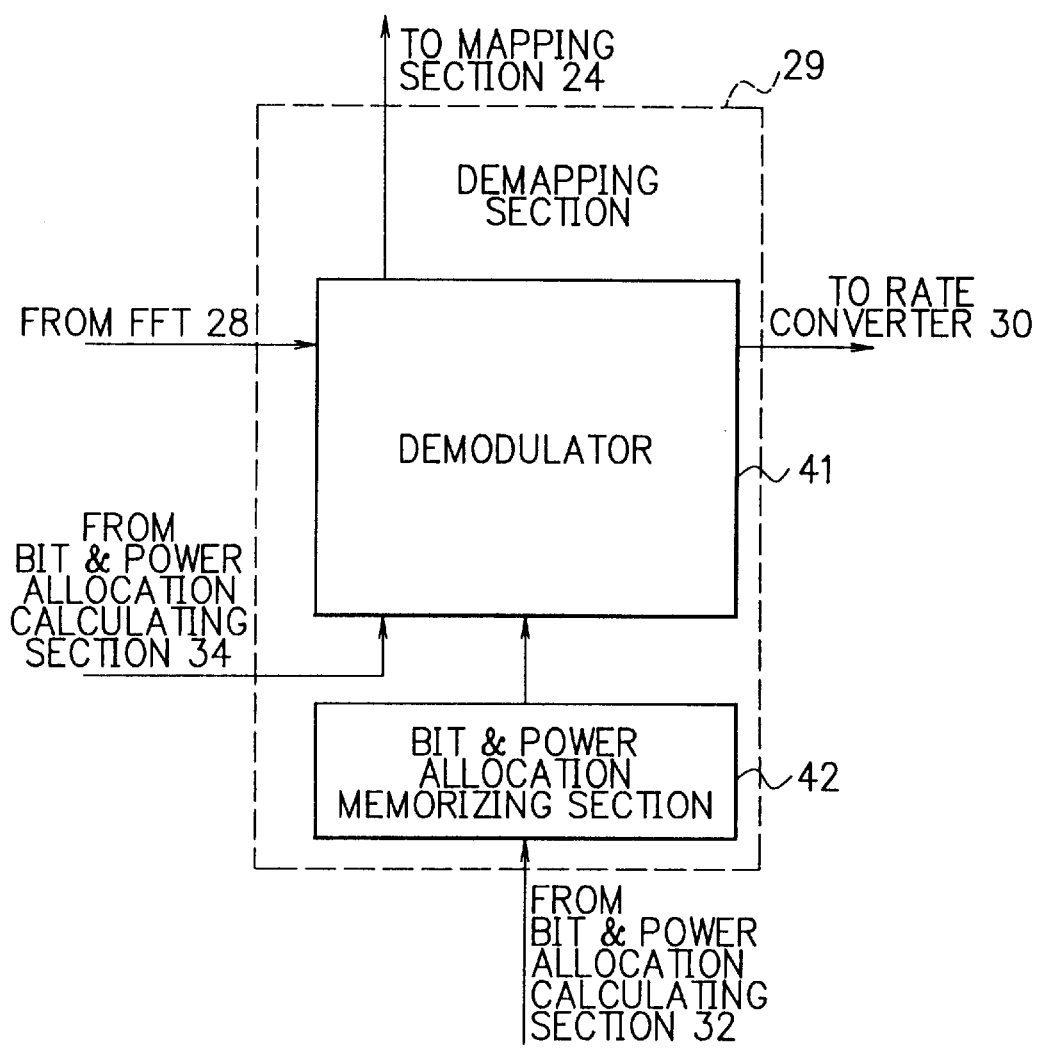
FIG. 14 is a block diagram showing the structure of the demapping section of the ATU-R.

The receiving section 4 of the ATU-R 2 provides an ADC (analog to digital converter) 27 which converts analog signals transmitted from the ATU-C 1 to digital signals, a FFT (fast Fourier transform) 28 which implements the fast Fourier transform for these digital signals, a demapping section 29 which switches the bit allocation and transmission power allocation corresponding to the changing timing of noise level and demodulates the transmitted signals, and a rate converter 30 which adjusts the change of the amount of data transmission caused by the change of bit allocation and transfers the data to the external equipment in a constant speed. And a high-pass filter 9 which removes the side lobes generated by the data transmission carrier is provided at the front position of the receiving section 4. FIG. 14 is a block diagram showing the structure of the demapping section 29. As shown in FIG. 14, the demapping section 29 is constituted of a demodulator 41 which takes out the data from the carrier transmitted from the ATU-C 1 and a bit & power allocation memorizing section 42 which memorizes the bit allocation and transmission power allocation using for the demodulation of the demodulator 41.

The ATU-R 2 further provides a pseudo-random signal generating section 31, a bit & power allocation calculating section 32, a clock detecting section 33 and a bit & power allocation selecting section 34 to realize the present invention.

At the training period when the bit allocation allocating for carrier and the transmission power allocation using for carrier are calculated, the pseudo-random signal generating section 31 generates the pseudo-random signals allocated in sequence the data composed of predetermined pseudo-random order to each carrier using for upstream data transmission and outputs the result to the IFFT 25. The bit & power allocation calculating section 32 calculates plural SNR of each carrier every noise level used for downstream data transmission by using the pseudo-random signals transmitted from the ATU-C 1 and calculates the bit allocation allocating to each carrier and the transmission power allocation using for each carrier every noise level by the calculated average value of SNR of each carrier and memorizes the calculated bit allocation and transmission power allocation in the bit & power allocation memorizing section 42 of the demapping section 29 and also outputs to the mapping section 24.

The clock in the ATU-C 1 is a clock synchronizing with the changing timing of noise level and, in this case, the changing timing of noise level is known. For example, at the case that the noise is a cross-talk noise from the TCM-ISDN, the NEXT and the FEXT are generated every 1.25 milliseconds, therefore the SNR of each carrier also changes every 1.25 milliseconds. Therefore, at the transmitting section 3 of the ATU-C 1, by receiving the clock by which the amplitude of the predetermined carrier changes in a 1.25 milliseconds cycle synchronized with the changing timing of noise level, the clock must be transmitted to the receiving section 4 of the ATU-R 2. Accordingly, the tone synchronized with noise generating section 21 generates a signal synchronized with noise made the amplitude of signal change by synchronizing with the clock and transmits the tone synchronized with noise to the ATU-R 2. This signal synchronized with noise can be detected at the clock detecting section 33 and the changing timing of detected noise level is outputted to the bit & power allocation selecting section 34. The bit & power allocation selecting section 34 recognizes the changing timing of noise level by the information from the clock detecting section 33 and designates the bit allocation allocating to the carrier using for data transmission and the transmission power allocation using for the carrier to the mapping section 24. The bit & power allocation selecting section 34 designates the bit allocation and transmission power allocation using at the time of demodulation of the data to the demapping section 29.

The operation of the IFFT is explained in more detail. The signals from the pseudo-random signal generating section, the tone synchronized with noise generating section and the mapping section are outputted to the IFFT. However these signals are not inputted at the same time. That is, the IFFT implements the inverse fast Fourier transform for signal inputted in different time and outputs to the DAC. And the mentioned above each equipment is controlled by a sequencer which is not described in diagrams. By the control of this sequencer, at the predetermined signal outputting timing, the pseudo-random signal generating section and the tone synchronized with noise generating section output signals to the IFFT. The IFFT recognizes from which equipment next signal is inputted, by the operation of sequencer.

The present invention is data transmission used multi-carrier under the cyclically changing noise environment. Therefore, the present invention is explained at the case that the ADSL system having the above mentioned structure is received the cyclically changing cross-talk noise from the TCM-ISDN loop.

In the TCM-ISDN loop, the data transmission of upstream and downstream directions is implemented alternately every 1.25 milliseconds. At the case that the ADSL loop is installed adjacent to the TCM-ISDN loop, synchronizing with the switching timing of the direction of data transmission of the TCM-ISDN loop, the NEXT and FEXT are cyclically generated at the ADSL system.

At the case that the telecommunications are implemented by the conventional ADSL technology, due to this cyclical cross-talk noise, the large amount of error is generated at the time when the NEXT being high noise state is generated. Moreover, at the case that the transmission rate is set at the telecommunication under the NEXT noise, the transmission rate is largely decreased.

Figure 15A:
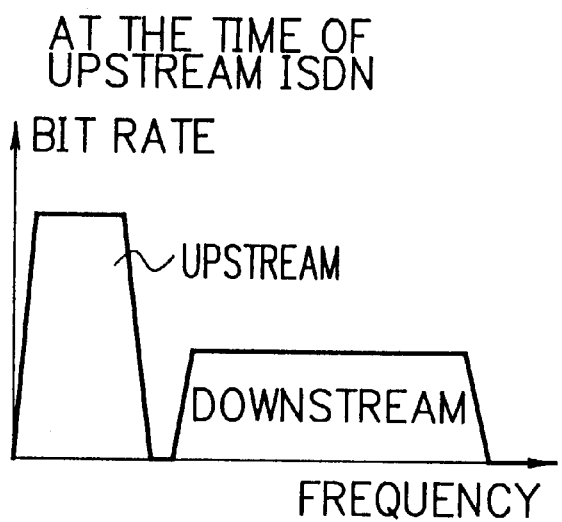
FIG. 15A is a diagram showing the relation between the frequency band and the bit rate at the time of the upstream direction of ISDN.
Figure 15B:
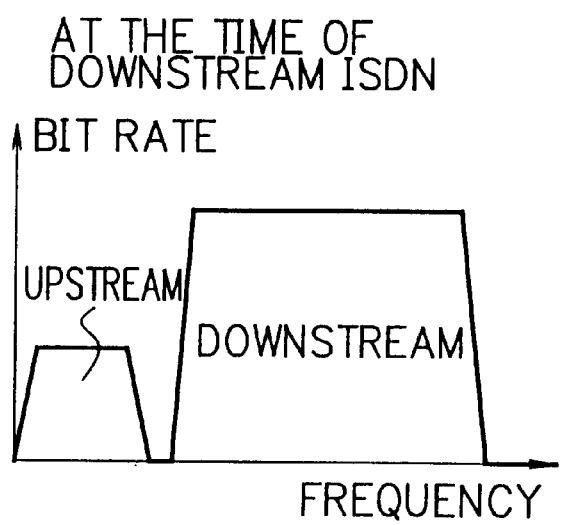
FIG. 15B is a diagram showing the relation between the frequency band and the bit rate at the time of the downstream direction of ISDN.

FIG. 15A is a diagram showing the relation between the frequency band and the bit rate at the time of the upstream direction of ISDN. FIG. 15B is a diagram showing the relation between the frequency band and the bit rate at the time of the downstream direction of ISDN.

In order to solve this problem, the embodiment of the present invention secures the transmission capacity of data by the following method. As shown in FIG. 15A, at the period that the noise generated at the downstream data transmission is large, the present invention makes the upstream bit rate of the transmission using low frequency band carriers higher than the downstream bit rate of the transmission using high frequency band carriers. As shown in FIG. 15B, at the period that the noise generated at the upstream data transmission is large, the present invention makes the downstream bit rate of the transmission using high frequency band carriers higher than the upstream bit rate of the transmission using low frequency band carriers. Furthermore, in order to keep the compatibility with a MODEM of the existing FDM-xDSL, the frequency bands of carriers using for the data transmission of upstream and downstream directions are separated, and the carrier of the low frequency band is used for the data transmission of upstream direction and the carrier of the high frequency band is used for the data transmission of downstream direction.

Next, in order to realize the mentioned above processing, the concrete operation of the embodiment of the present invention is explained.

At the training period when the bit allocation and transmission power allocation of each carrier using for the data transmission is calculated, the pseudo-random signal generating section 20 in the ATU-C 1 generates the pseudo-random signals which the amplitude of each carrier of the high frequency band using for the downstream data transmission is modulated to the amplitude corresponding to the bit order of the predetermined data allocating based on the predetermined pseudo-random order and outputs the result to the IFFT 13. This modulation is named a 4QAM (4 quadrature amplitude modulation) and the carrier amplitude corresponding to the order of the data is decided by a constellation. The constellation means that the order of bit allocating to carrier is corresponded to a coordinate on the two-dimensional coordinate formed by the same frequency carriers whose phases are orthogonal each other.

The IFFT 13 implements the inverse fast Fourier transform for this carrier whose amplitude is modulated and adds up each carrier. With this process, a voltage value expressed in digital form is outputted. The DAC 14 converts the voltage value expressed in digital form to an analog signal being an actual voltage value and outputs the converted result to the loop.

In the ATU-R 2, the voltage value expressed in digital form converted from the analog signal at the ADC 27 is taken out. The FFT 28 implements the fast Fourier transform for the voltage value expressed in digital form and takes out each carrier of high frequency band whose amplitude is modulated corresponding to the allocated data, in this, each carrier is a pseudo-random signal. This pseudo-random signal is transmitted to the bit & power allocation calculating section 32 and the SNR values of each carrier of high frequency band using for the downstream data transmission are calculated at the time of NEXT generated and at the time FEXT generated respectively. Using the average value of the calculated plural SNR values, the two kinds of bit allocation and transmission power allocation of each carrier are calculated at the time of NEXT generated and at the FEXT generated.

The bit & power allocation calculating section 32 outputs the calculated two kinds of downstream bit allocation and transmission power allocation to the demapping section 29 and makes these calculated allocation memorize at the bit and power allocation memorizing section 42 in the demapping section 29 and also outputs the calculated result to the mapping section 24.

The mapping section 24 allocates the designated carrier the information of the bit allocation allocating for each carrier of high frequency band using for the downstream data transmission and the information of the transmission power allocation using for each carrier of high frequency band using for the downstream data transmission 2 bits each by the mentioned above 4QAM, and transmits the allocated result to the IFFT 25.

The IFFT 25 outputs the voltage value expressed in digital form added up the designated carriers by the inverse fast Fourier transform. The DAC 26 converts the voltage value in digital form to the analog signal being the actual voltage value and outputs the analog signal to the loop.

In the ATU-C 1, the ADC 15 converts the analog signal transmitted from the ATU-R 2 to the voltage value expressed in digital form and the FFT 16 implements the fast Fourier transform for the digital voltage value and takes out the designated carrier which is modulated to the amplitude corresponding to the allocated data.

The demapping section 17 demodulates the carrier and takes out the information of the bit allocation allocating to each carrier of high frequency band from the designated carrier and the information of the transmission power allocation using for each carrier. The taken out information of the bit allocation and transmission power allocation is transmitted to the mapping section 12 and is memorized at the bit & power allocation memorizing section 36 shown in FIG. 11 in the mapping section 12.

The mapping section 12 implements the transmission of data by switching the bit allocation allocating for each carrier of high frequency band and the transmission power allocation using for each carrier of high frequency band corresponding to the changing timing of noise level. The mapping section 12 also demodulates the data transmitted from the counter remote terminal based on the bit allocation and transmission power allocation of downstream direction memorized in the demapping section 29.

At the training period, the pseudo-random signal generating section 31 in the ATU-R 2 generates the pseudo-random signal that is modulated the amplitude of each carrier of low frequency band using for the upstream data transmission to the amplitude corresponding to the designated data allocated based on the predetermined pseudo-random order. The pseudo-random signal is outputted to the IFFT 25. This modulation to the amplitude corresponding to the designated data is implemented by the mentioned above 4QAM.

The IFFT 25 implements the inverse fast Fourier transform to the pseudo-random signal composed of this amplitude modulated carrier and outputs the voltage value expressed in digital form added up each carrier. The DAC 26 converts the voltage value expressed in digital form to the analog signal being actual voltage value and outputs to the loop.

The ADC 15 in the ATU-C 1 converts the analog signal to the digital voltage value. The FFT 16 implements the fast Fourier transform to the voltage value expressed in digital and takes out each carrier of low frequency band whose amplitude is modulated corresponding to the allocated data, in this, each carrier is the pseudo-random signal. This pseudo-random signal is transmitted to the bit & power allocation calculating section 22 and the plural SNR values of each carrier of low frequency band using for the upstream data transmission are calculated at the time of the NEXT generated and the FEXT generated respectively. Using the average value of the calculated plural SNR values, the two kinds of bit allocation and transmission power allocation of each carrier are calculated at the time of the NEXT generated and the FEXT generated.

The bit & power allocation calculating section 22 outputs the calculated two kinds of upstream bit allocation and transmission power allocation to the bit & power allocation memorizing section 38 in the demapping section 17 and also outputs them to the mapping section 12.

The mapping section 12 allocates the designated carrier the information of the bit allocation and transmission power allocation allocating to each carrier of low frequency band using for the upstream data transmission 2 bits each by the mentioned above 4QAM, and transmits the allocated result to the IFFT 13.

The IFFT 13 outputs the voltage value expressed in digital form added up the designated carriers by the inverse fast Fourier transform. The DAC 14 converts the voltage value in digital form to the analog signal being the actual voltage value and outputs the analog signal to the loop.

In the ATU-R 2, the ADC 27 converts the analog signal transmitted from the ATU-C 1 to the voltage value expressed in digital form and the FFT 28 implements the fast Fourier transform for the digital voltage value and takes out the designated carrier which is modulated to the amplitude corresponding to the allocated data.

The demapping section 29 demodulates the carrier and takes out the information of the bit allocation allocating to each carrier of low frequency band from the designated carrier and the information of the transmission power allocation using for each carrier. The taken out information of the bit allocation and transmission power allocation is transmitted to the mapping section 24 and is memorized at the bit & power allocation memorizing section 40 shown in FIG. 13 in the mapping section 24.

The mapping section 24 implements the transmission of data by switching the bit allocation allocating to each carrier of low frequency band and the transmission power allocation using for each carrier of low frequency band corresponding to the changing timing of noise level. The mapping section 24 also demodulates the data transmitted from the counter remote terminal based on the bit allocation and transmission power allocation of upstream direction memorized in the demapping section 17.

At the case that the inputted signal is the pseudo-random signal, the FFT implements the fast Fourier transform to the signal inputted to the bit and power allocation calculating section and outputs the result to the bit and power allocation calculating section. At the case that the signal has the information of the calculated two kinds of bit allocation and transmission power allocation, the FFT implements the fast Fourier transform to the inputted signal and outputs to the demapping section. At the period that the data transmission is implemented using the two kinds of bit allocation and transmission power allocation calculated at the training period, the inputted signal is implemented the fast Fourier transform and is outputted to the demapping section. As mentioned above, the signals from the FFT are outputted to the two sections and this operation is controlled by the sequencer mentioned above.

The demapping section changes the output section at the case whether the signal is the signal allocated two kinds of bit allocation and transmission power allocation or the signal is the data allocated signal from the connected external equipment of the remote terminal, to which section the signal is outputted is controlled by the sequencer. And the demapping section, as at the training period a certain number of bits are allocated to carrier, takes out the data from the carrier based on these number of bits. At the period of the data transmission, the demapping section takes out the data allocated to the carrier by using the two kinds of bit allocation and transmission power allocation calculated at the training period. This switching operation is also controlled by the sequencer.

The signal from the rate converter and the signal from the bit & power allocation calculating section are inputted to the mapping section, the mapping section recognizes the signal from which section the next signal is inputted by the information from the sequencer and operates them. The mapping section generates the signal allocated the designated number of bits to the designated carrier, at the case that the input signal is the signal from the bit & power allocation calculating section. At the case that the signal is the signal from the rate converter, the mapping section generates the signal allocated the data to the carrier based on the memorized two kinds of bit allocation and transmission power allocation. This switching operation is also controlled by the sequencer.

The notifying method that the signal synchronized with noise generated at the tone synchronized with noise generating section 21 is notified to the ATU-R 2 is explained in more detail. And the operation of the clock detecting section 33 and the bit & power allocation selecting section 34 in the ATU-R 2 are also explained in more detail.

As mentioned above, at the case that the noise is the cross-talk noise from the TCM-ISDN, the NEXT and the FEXT are alternately generated every 1.25 milliseconds, therefore the SNR of each carrier is also changed every 1.25 milliseconds. Accordingly, the ATU-C 1 needs to notify the changing timing of the noise level to the ATU-R 2 by receiving the clock whose amplitude changes in 1.25 millisecond cycle synchronized with the changing timing of the noise level.

Therefore, the tone synchronized with noise generating section 21 in the ATU-C 1 generates the signal synchronized with noise which makes the amplitude of the designated carrier using for notifying the changing timing of the noise level change by synchronizing with the changing timing of the noise level and outputs the result to the IFFT 13.

The IFFT 13 implements the inverse fast Fourier transform to the designated carrier using for notifying the changing timing of the noise level and generates the voltage value in digital form. The DAC 14 converts the voltage value in digital form transmitted from the IFFT 13 to the analog signal being the actual voltage value and outputs the result to the loop.

The ADC 27 in the ATU-R 2 converts the analog signal transmitted from the ATU-C 1 to the voltage value in digital form. And the FFT 28 implements the fast Fourier transform to this voltage value in digital form and takes out the designated carrier whose amplitude is modulated for notifying the noise synchronization and outputs the result to the clock detecting section 33.

The clock detecting section 33 detects the changing timing of the noise level by the change of amplitude of the designated carrier and notifies the detected changing timing of the noise level to the bit & power allocation selecting section,34.

The bit & power allocation selecting section 34 recognizes the changing timing of the noise level by the notification from the clock detecting section 33. At the time when the mapping section 24 implements the bit allocation and transmission power allocation to each carrier, the bit & power allocation selecting section 34 designates the bit allocation and transmission power allocation using for the implementation of the data transmission corresponding to the noise level from the two kinds of bit allocation and transmission power allocation memorized in the bit & power allocation memorizing section 40. At the time when the demapping section 29 takes out the data allocated to the carrier transmitted from the ATU-C 1, the bit & power allocation selecting section 34 designates the same bit allocation and transmission power allocation as the bit allocation and transmission power allocation used corresponding to the noise level at the ATU-C 1 and used for the demodulation of the data, from the two kinds of bit allocation and transmission power allocation memorized in the bit & power allocation memorizing section 42.

Figure 5:
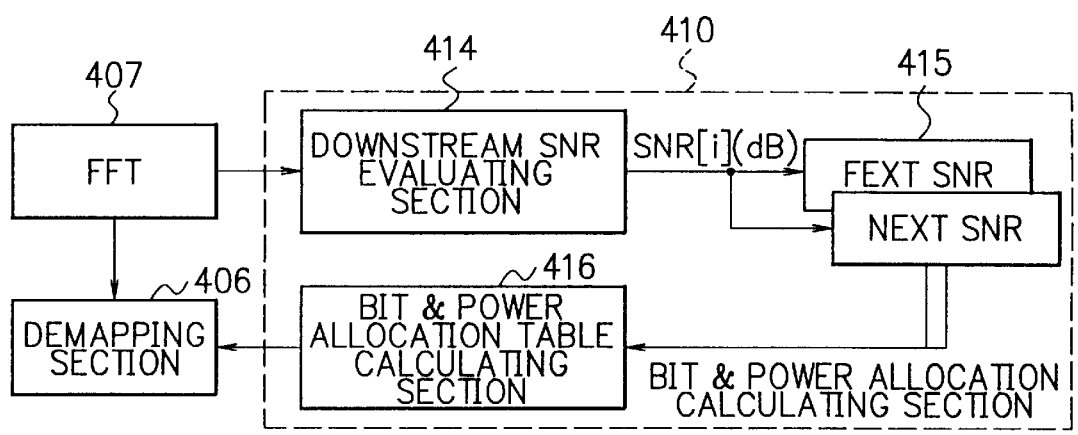
FIG. 5 is a block diagram showing the structure of a bit & power allocation calculating section of the ATU-R.
Figure 8:
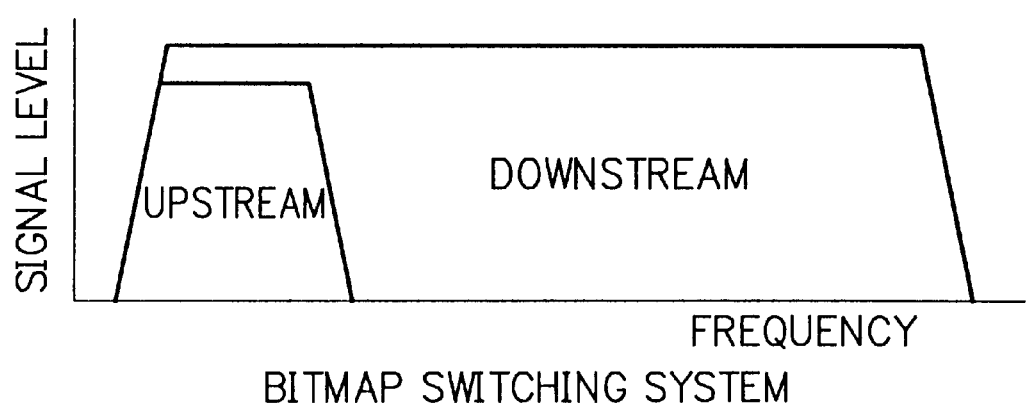
FIG. 8 is a frequency band diagram using for data transmission by an echo canceler system.

At the case that the noise is the cross-talk noise from the TCM-ISDN, as shown in FIG. 5, the receiving timing of the 345$^{th}$ symbol accords with the switching timing of the cross-talk noise from the ISDN. Which bit allocation and transmission power allocation should be used from the two kinds of bit allocation and transmission power allocation at every transmitting symbol is memorized in the bit & power allocation selecting section 34.

Figure 16:
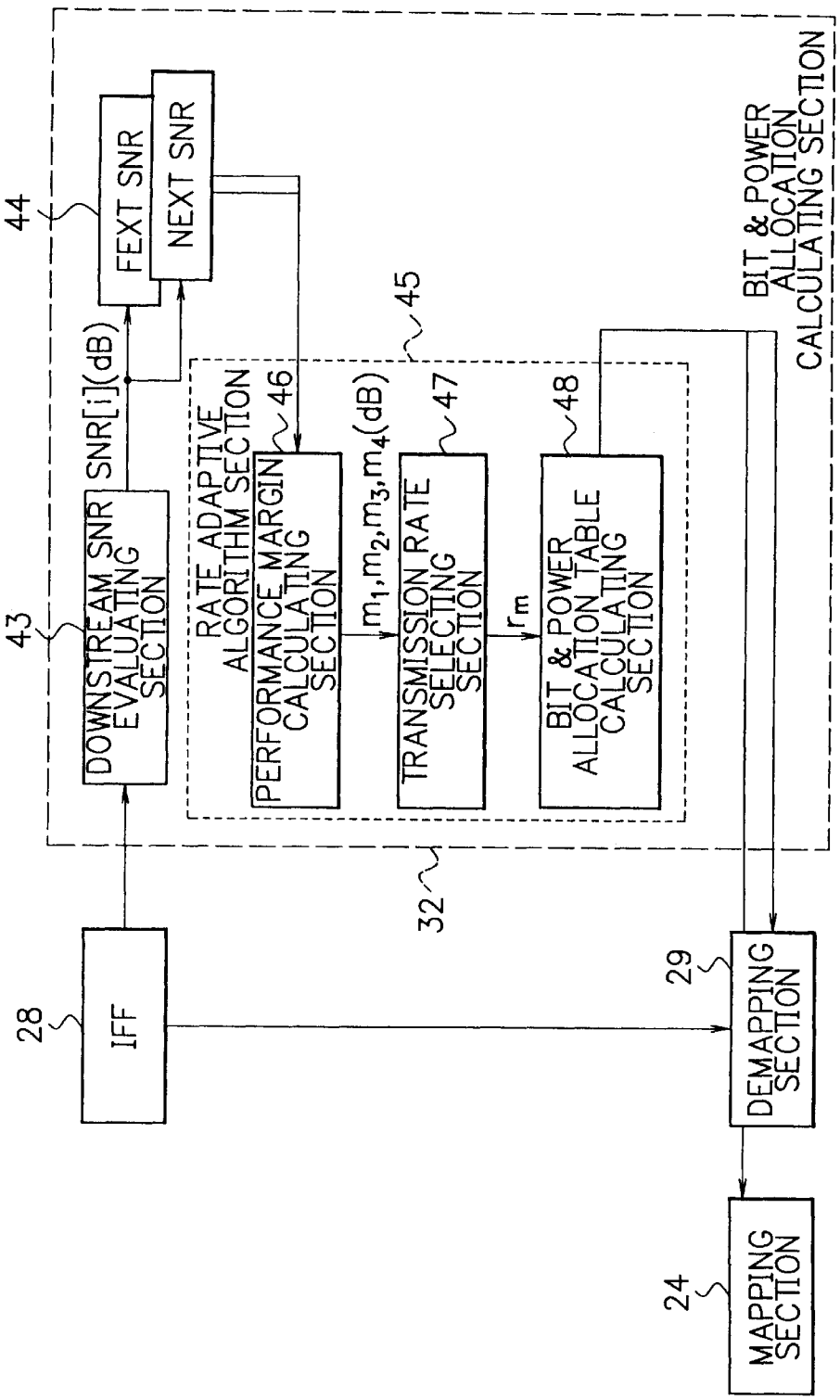
FIG. 16 is a block diagram showing the detailed structure of the bit & power allocation calculating section 32 in the ATU-R 2.
Figure 17:
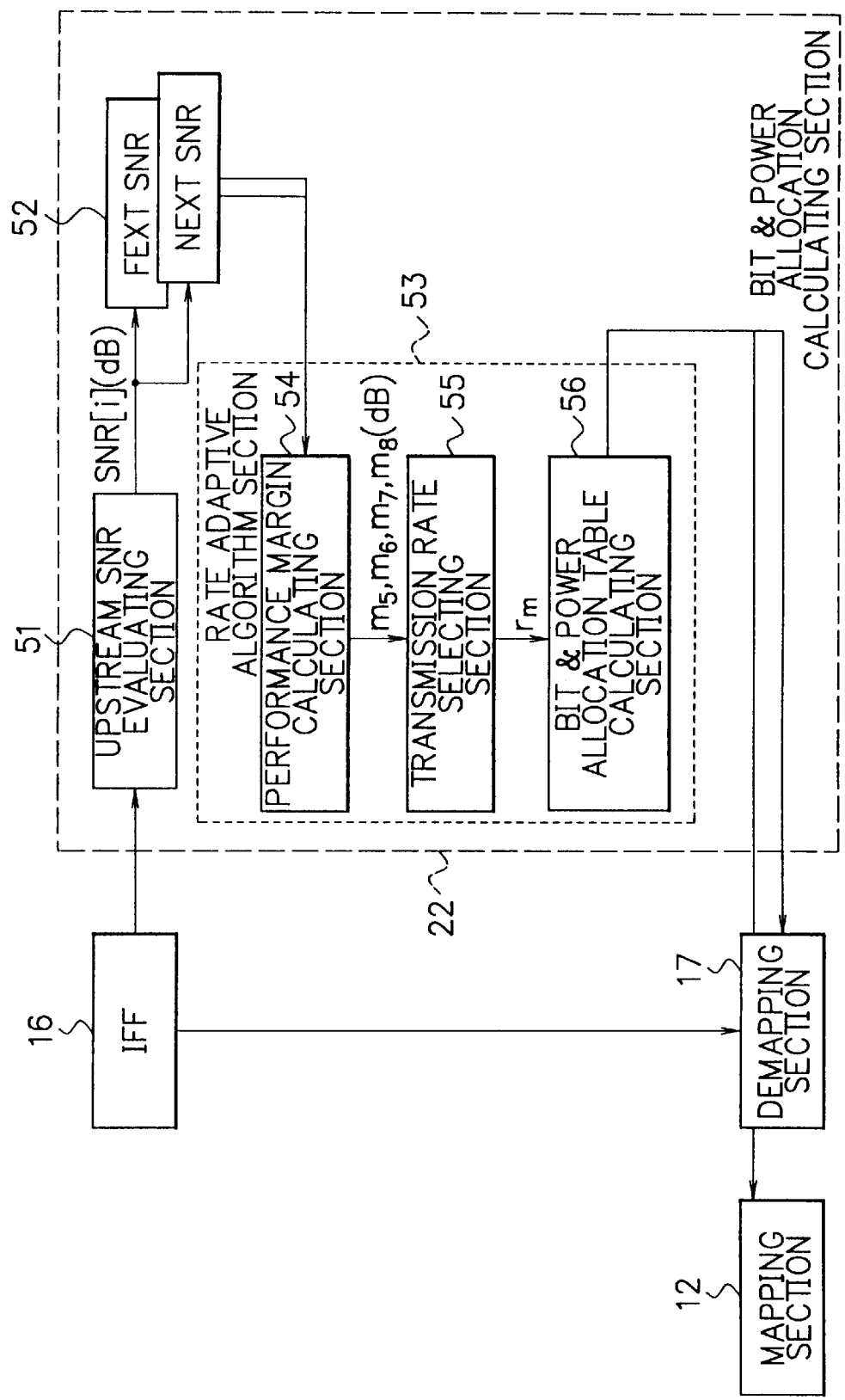
FIG. 17 is a block diagram showing the detailed structure of the bit & power allocation calculating section 22 in the ATU-C 1.

Next, the calculating method of the mentioned above bit allocation and transmission power allocation is concretely explained. FIG. 16 is a block diagram showing the detailed structure of the bit & power allocation calculating section 32 in the ATU-R 2. FIG. 17 is a block diagram showing the detailed structure of the bit & power allocation calculating section 22 in the ATU-C 1.

As shown in FIG. 16, the bit & power allocation calculating section 32 provides a downstream SNR evaluating section 43, a FEXT SNR & NEXT SNR 44 holding the FEXT SNR value and NEXT SNR value and a rate adaptive algorithm section 45. The rate adaptive algorithm section 45 provides a performance margin calculating section 46, a transmission rate selecting section 47 and a bit & power allocation table calculating section 48. As shown in FIG. 17, the bit & power allocation calculating section 22 provides an upstream SNR evaluating section 51, a FEXT SNR & NEXT SNR holding section 52 and a rate adaptive algorithm section 53. The rate adaptive algorithm section 53 provides a performance margin calculating section 54, a transmission rate selecting section 55 and a bit & power allocation table calculating section 56.

Between the bit & power allocation calculating section 22 in the ATU-C 1 and the bit & power allocation calculating section 32 in the ATU-R 2, only the frequency band of the carrier calculating the bit allocation and transmission power allocation is different, therefore only the operation of the bit & power allocation calculating section 32 in the ATU-R 2 is explained.

At the time of the upstream transmission of the ISDN, the NEXT is generated in the ATU-R 2 and at the time of the downstream transmission of the ISDN, the FEXT is generated in the ATU-R 2. Therefore, the downstream SNR evaluating section 43 calculates the plural SNR values of each carrier frequency at the NEXT generated time and the FEXT generated time respectively, using the pseudo-random signal transmitted from the ATU-C 1. And the average value of the SNR values is calculated in each carrier and the calculated average value of the SNR values at the NEXT generated is held in the NEXT SNR 44 and the calculated average value of the SNR values at the FEXT generated is held in the FEXT SNR 44.

The performance margin calculating section 46 calculates the four kinds of maximum performance margin value based on the SNR values of each carrier evaluated at the downstream SNR evaluating section 43, at the case that the downstream transmission rates transmitted from the ATU-C 1 are realized respectively. In this example, the transmission rates are four kinds. The performance margin is a margin for the SNR, needed to secure Pe/2=$10^{-7}$. The Pe is the probability of symbol error which the signal on the carrier makes an error. The transmission rate selecting section 47 selects the transmission-able value and the largest value of the transmission rate from the four kinds of performance margin values. The bit & power allocation table calculating section 48 calculates the bit & power allocation for transmitting at the selected transmission rate "rn". The calculated bit & power allocation table is transmitted to the ATU-C 1 as mentioned above, however this bit & power allocation table are calculated for each group of SNR values changing cyclically at the NEXT generated and the FEXT generated respectively. For the ATU-C 1, the transmission rate selected at the transmission rate selecting section 47 is memorized.

Figure 18:
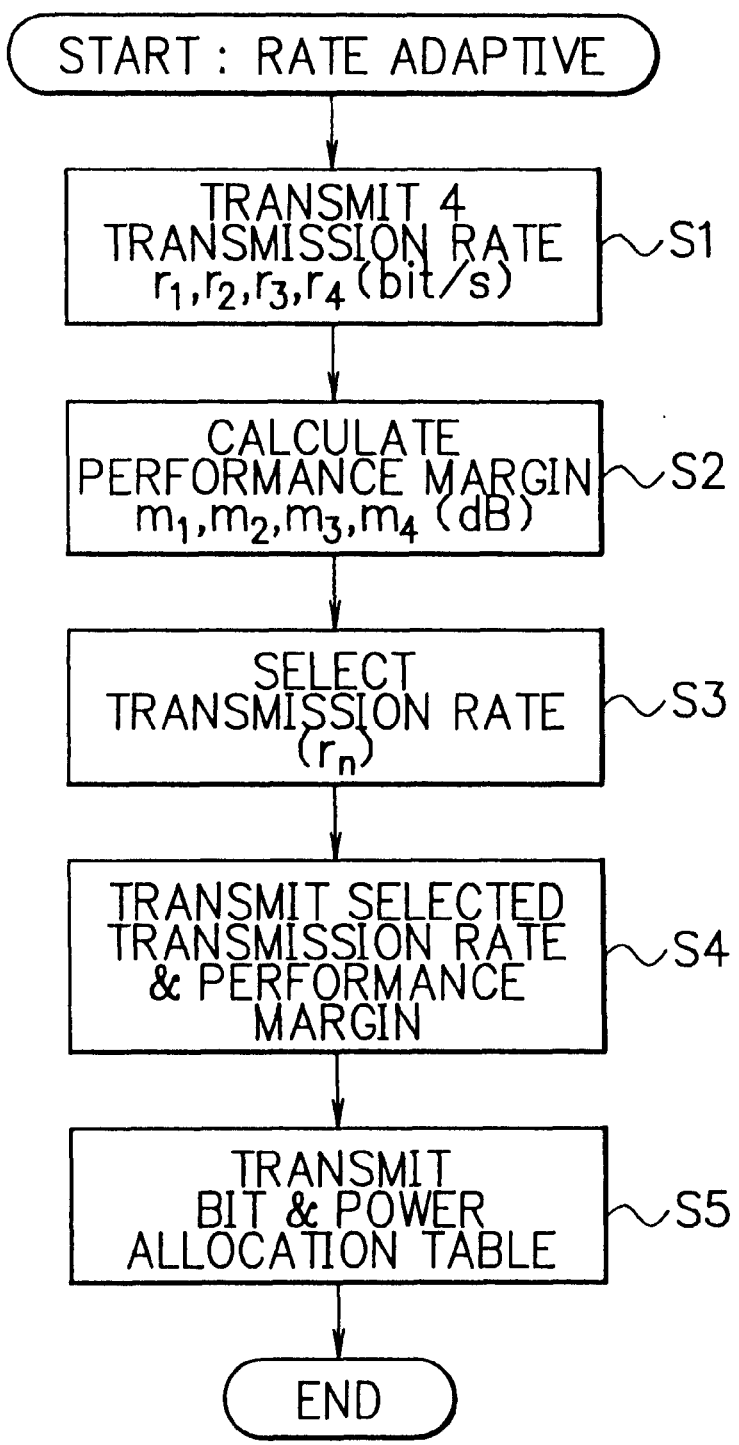
FIG. 18 is a flowchart showing the operation of the bit & power allocation calculating section 32 in the ATU-R 2.

FIG. 18 is a flowchart showing the operation of the bit & power allocation calculating section 32 in the ATU-R 2. Referring to FIG. 18, the operation is explained.

The four transmission rates given by the external equipment to the ATU-C 1 are transmitted to the ATU-R 2 (step S1). For example, the four kinds of transmission rates "r1 to r4 (bit/s)" are transmitted to the ATU-R 2 from the ATU-C 1. In the ATU-R 2, at the case the noise changes cyclically, especially in this case that the TCM-ISDN loop is installed in the same cable, the NEXT and FEXT are generated to the ADSL from the ISDN. The downstream SNR evaluating section 43 evaluates the SNR values of each frequency at the both NEXT generated and FEXT generated cases and holds the evaluated values in the NEXT SNR and FEXT SNR 44.

Figure 19:
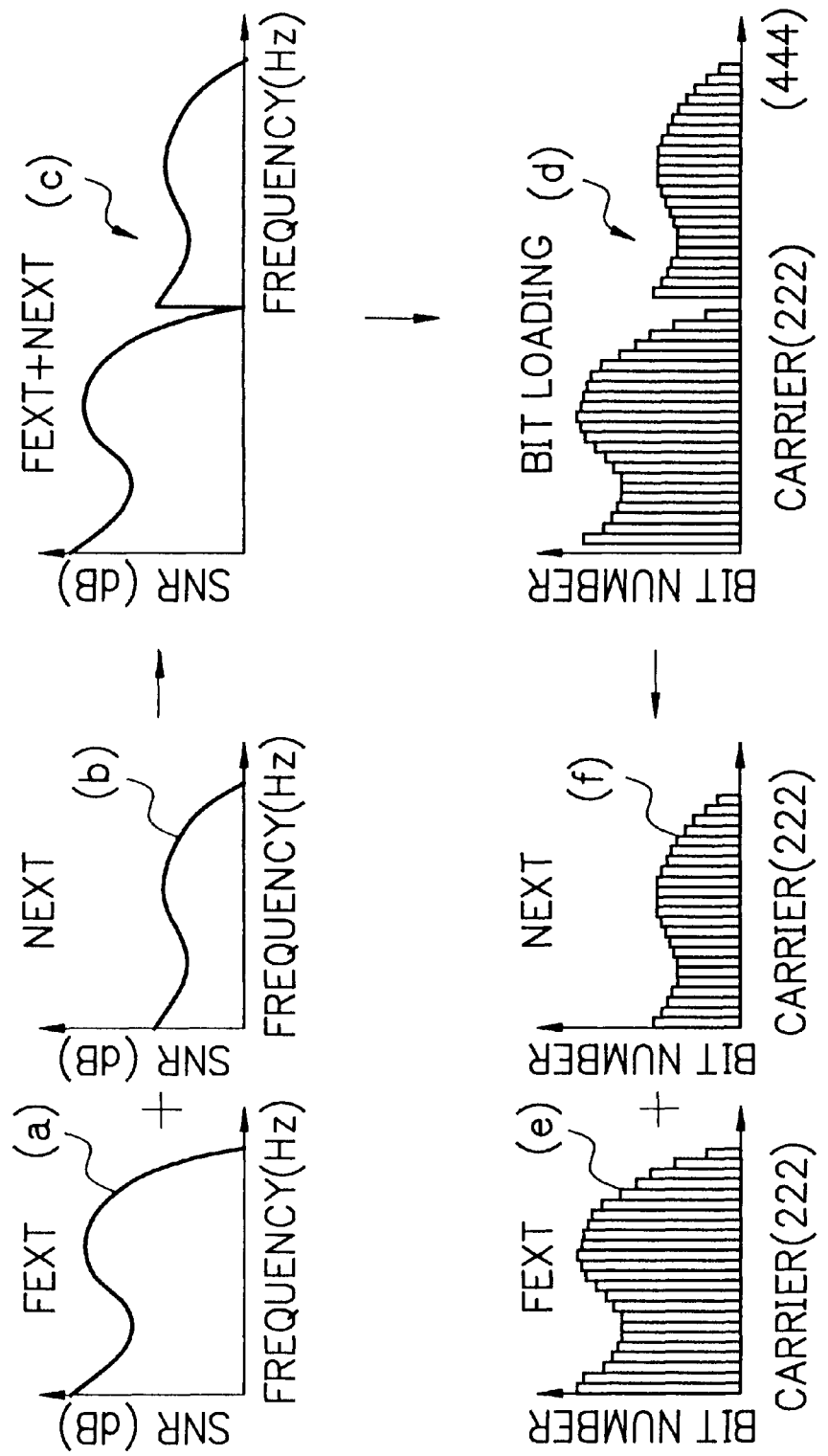
FIG. 19 is a diagram showing the method of the bit allocation.

FIG. 19 is a diagram showing the method of the bit allocation. In FIG. 19, (a) and (b) show the SNR values of the evaluated each frequency, (a) shows the SNR value at the time of the FEXT generated and (b) shows the SNR value at the time of the NEXT generated.

The performance margin calculating section 46 calculates the four kinds of bit allocation setting the performance margin value maximum based on the SNR values of each carrier evaluated at the downstream SNR evaluating section 43 respectively, at the case that the transmitted four transmission rates are realized (step S2). FIG. 19 shows the calculating method. In this case, as shown in FIG. 19 (c), the SNR values at the NEXT generated and FEXT generated shown in FIG. (a) and (b) are used as the SNR value evaluated until the two times frequency by not changing cyclically.

With this, at the time when the performance margin of the loop is calculated, for the SNR values of each carrier not changing at the time shown in FIG. 19 (d) in which the using frequency is two times frequency, making the transmission rate two times as many as the given transmission rate, the bit allocation method is used by considering the case that the 444 carriers are used. Actually, the number of carriers used for the data transmission is 222 carriers and this number is standardized by the ANSI (American National Standard Institute). The number of 444 carriers is the number of carriers using for the data transmission added the carriers used at the FEXT generated and the NEXT generated by considering not changing at the time as shown in FIG. 19 (d). In this embodiment, the electric power for each carrier is limited and the maximum electric power limit of each carrier is defined as $E_{mask}$. In this, the maximum limit $E_{target}$ of the total transmission electric power usable for the data transmission is (total number of carriers)×(maximum electric power limit of each carrier $E_{mask}$), in this embodiment, the transmission electric power usable for each carrier is not limited is applied.

The transmission rate selecting section 47 selects the transmit-able transmission rate whose transmission rate is fastest and whose margin is not negative from the calculated four kinds of performance margin values, for example from the four kinds of margin values m1 to m4 shown in step S2 in FIG. 18 (step S3). The selected transmission rate and the performance margin are transmitted to the ATU-R 2 (step S4).

The bit & power allocation table calculating section 48 calculates the bit & power allocation table for the implementation of the transmission at the selected transmission rate (step S5). This table must be calculated for the respective SNR values changing cyclically at the NEXT generated and the FEXT generated. The using bit & power allocation table uses the 222 carriers of the first half of 444 carriers as for the FEXT table and the 222 carriers of the second half of 444 carriers as for the NEXT table, at the case that the 444 carriers are used as the bit & power allocation table. The calculated respective tables are transmitted to the ATU-C 1 from the ATU-R 2.

Figure 20:
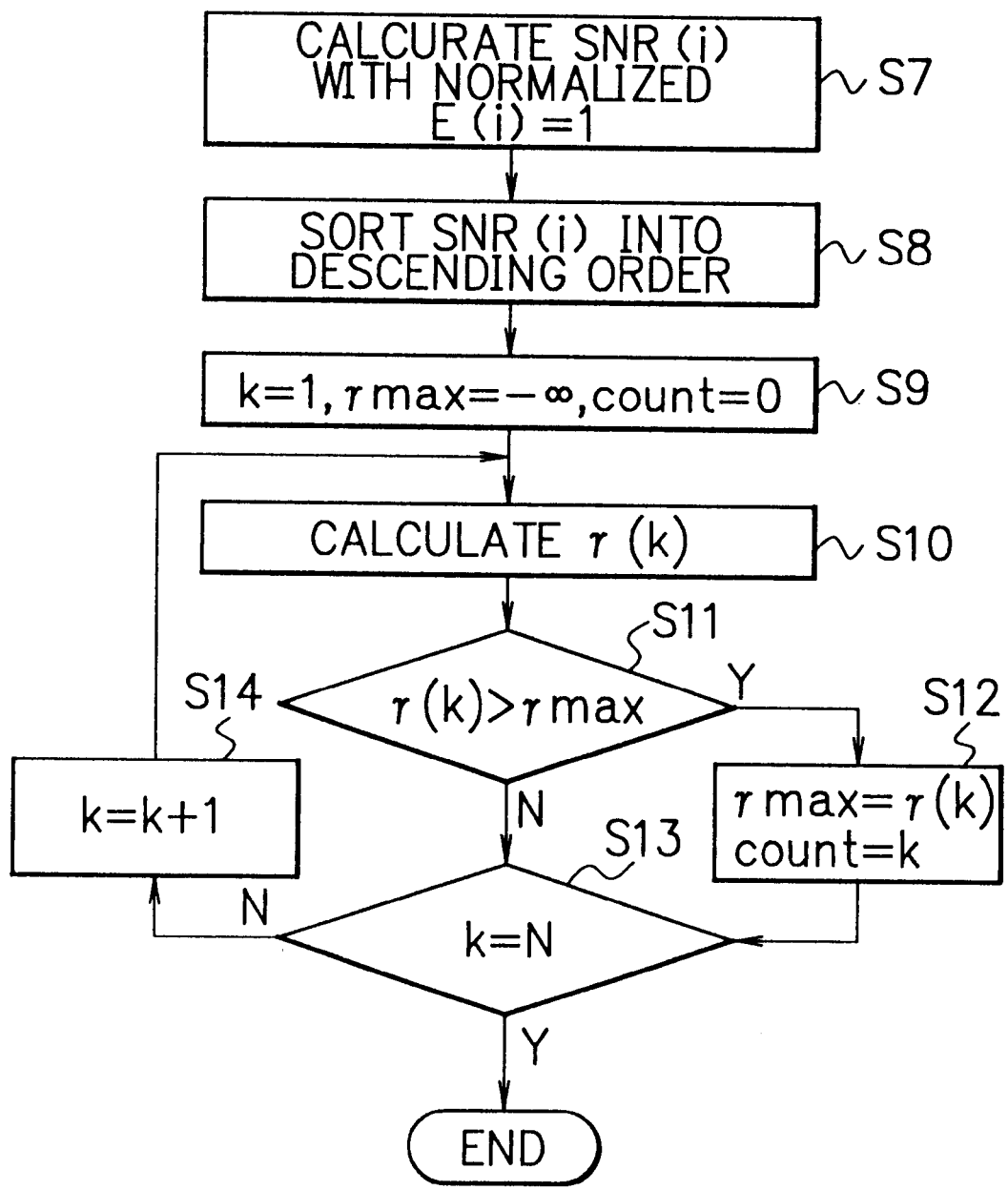
FIG. 20 is a flowchart showing the calculation method of the performance margin at the step S2 in FIG. 18.

FIG. 20 is a flowchart showing the calculation method of the performance margin at the step S2 in FIG. 18. First, the transmission power E (i) of each carrier "i" is defined and the SNR (i) is calculated with normalized E (i)=1 (step S7). Then, the calculated SNR (i) are sorted into the descending order (step S8) and the number of the SNR (i) is rearranged to the following expression, $$SNR(i) \geq SNR(i+1),$$

this expression of inequality is applied for from the total numbers of carriers N to the smallest number "i".

Next, k=1, $\gamma_{max}=-\infty$, count=0 are set (step S9). In this, "k" means carrier number, $\gamma_{max}$ means the maximum possible performance margin at the present and "count" is the number of carriers using for achieving $\gamma_{max}$. And $\gamma$ (k) is calculated (step S10).

The calculating equation of this $\gamma$ (k) is defined as follows:

$$\gamma(k) = 10 \log_{10}\left\{\frac{\overline{SNR(k)}}{2^{\frac{B_{target}}{k}} - 1}\right\} + \mathit{reff} - 9.8(\mathrm{dB})$$

The $\gamma$ ( k) is the maximum performance margin achievable in one carrier. In this time, the target achieving rate is $B_{target}$, the total coding gain is $\gamma_{eff}$, of the desirable bit error rate is $10^{-7}$ and k pieces of the best carrier is used, then the present geometric average of SNR is as follows:

$$\overline{SNR(k)} = \left[\prod_{i=1}^{k} E_i \cdot SNR(i)\right]^{\frac{1}{k}}$$

The coding gain means the gain obtained by coding such as the Trellis coding.

The present transmission power $E_i$ using the $i^{th}$ carrier is given as follows:

$$E_i = E_{max} \quad (3)$$

The total input power $E_{target}$ is:

$$E_{target} = k \times E_{maxi}$$

"k" is the using number of carrier.

$E_{maxi}$ is the maximum power which the $i^{th}$ carrier can transmit and this is determined by the transmission power mask. In this case, depending on the total input power $E_{target}$, the maximum power transmit-able of each carrier is not limited.

At the case that $\gamma$ (k)>$\gamma_{max}$, $\gamma_{max}=\gamma$ ((k) and count=k are set (steps S11 and S12). At the case that "k" is not N expressing the total number of carriers, set k=k+1 (step S14) and return to step 10. In this, $\gamma_{max}$ shows the maximum possible performance margin at the given system parameters and the "count" becomes the best number of carriers using to achieve $\gamma_{max}$.

Figure 21:
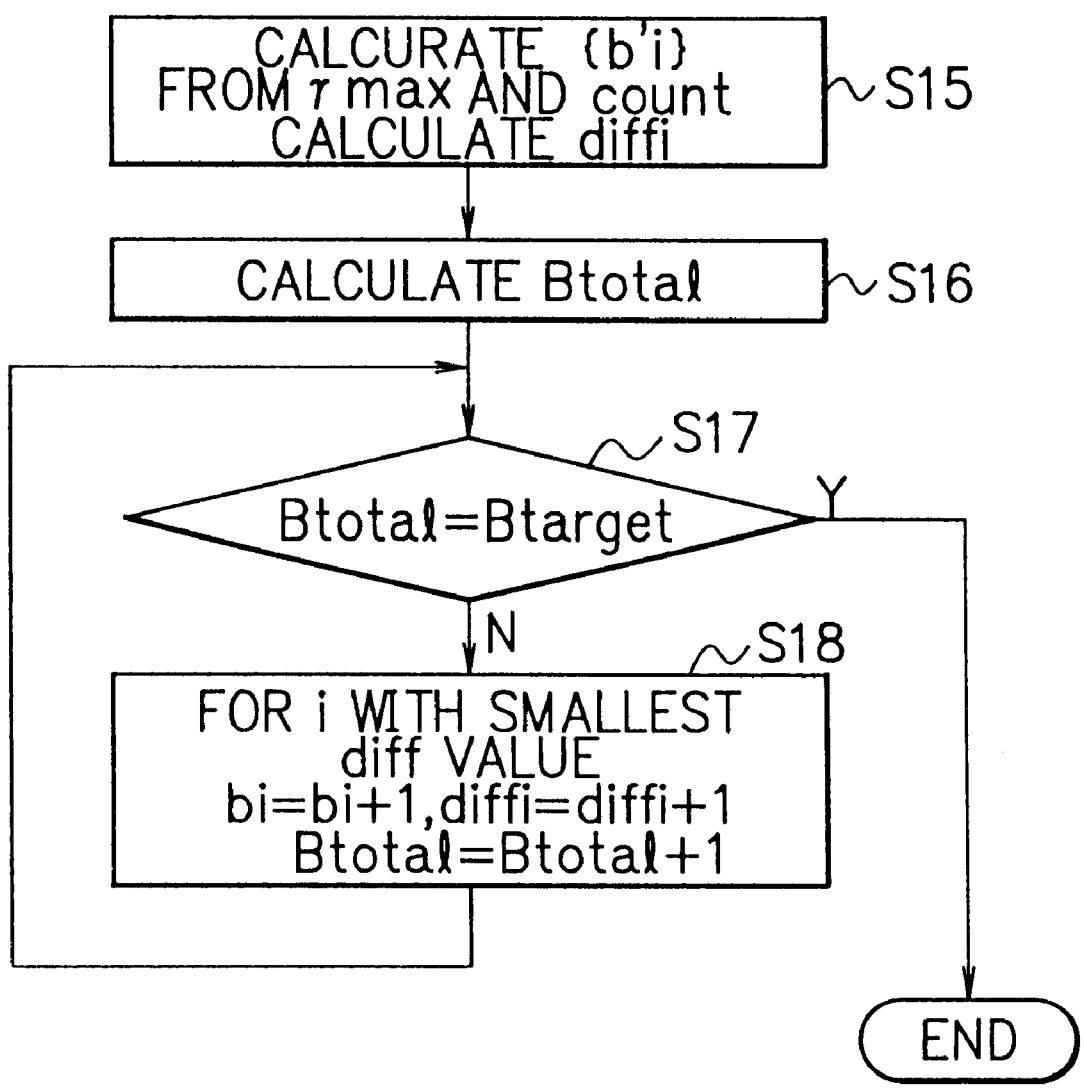
FIG. 21 is a flowchart showing the calculation method of the bit allocation table at the step S5 in FIG. 18.

FIG. 21 is a flowchart showing the calculation method of the bit allocation table at the step S5 in FIG. 18. Using above mentioned $\gamma_{max}$ (and "count", the initial bit allocation table { $b'_i$ } is calculated by the following equation:

$$b_i = \mathrm{floor}\,[\log_2\{1 + E_{maxi} SNR(i)/\Gamma_{max}\}]$$

"floor" shows discarding the numbers below the decimal points and the values discarded decimals are calculated as "diffi" by the following equation:

$$\mathrm{diffi} = b_i - \log_2\{1 + E_{maxi} SNR(i)/\Gamma_{max}\} \text{(step S15)}$$

In this, $\Gamma_{max}$ is calculated by the following equation:

$$\Gamma_{max}=[Q^{-1}(Pe/Ne)]^2+r\text{max}-r\text{eff}-4.77(\text{dB})$$

Ne is the number of the nearest points of the input signal constellation. Q function is defined in the following equation:

$$Q(x) = \int_x^\infty 1/\sqrt{2\pi}\, e^{-y^2/2}\, dy$$

FIG. 22 is a diagram showing the input signal constellation. The number of the nearest points of the input signal constellation means the number of the other points most adjacent to the one point on the constellation shown in FIG. 22. And $B_{total}$ is calculated (step S16). This $B_{total}$ is the total bit number supported by the present bit allocation table at one multi-carrier symbol. $B_{total}$ is shown in the following equation:

$$B_{total}=\Sigma b'_i$$

In this, $\Sigma$ is the sum of i=0 to N−1.

At the case that $B_{total}<B_{target}$, from the present bit table, the bit allocation table { b'i } of the carrier having the smallest diffi value is increased one bit, $$\text{diffi=diffi+1}$$

$$B_{total}=B_{total}+1$$

are operated (steps S17 and S18). This operation is continued until $B_{total}=B_{target}$.

Figure 23:
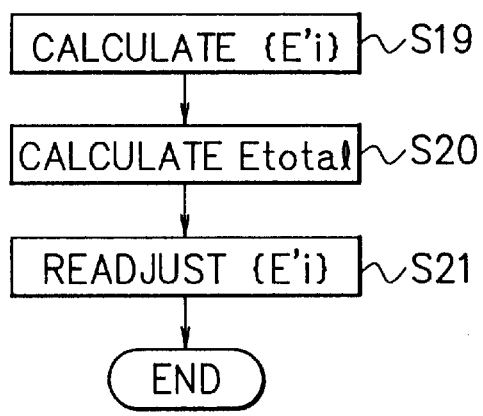
FIG. 23 is a flowchart showing the calculation method of the power allocation table at the step S5 in FIG. 18.

FIG. 23 is a flowchart showing the calculation method of the power allocation table at the step S5 in FIG. 18. First, input power {E'$_i$} is allocated to become $P_e(i)=P_{e,i,target}$, based on the given bit allocation table { b'$_i$ } (step S19). In this, $P_e(i)$ is the symbol error probability of the $i^{th}$ carrier and $P_{e,i,target}$ is the target error probability of the $i^{th}$ carrier. The {E'$_i$} is the total transmission power using the $i^{th}$ carrier. The present total transmission power $E_{total}$ is calculated by the following equation (step S20):

$$E_{total}=\Sigma E_i$$

In this, $\Sigma$ is the sum of the i=0 to N−1.

And the final power allocation {E'$_i$} is readjusted (step S21). This readjustment is implemented by selecting either smaller value of $E_{target}/E_{total}$ or $E_{max,i}$. In this system, the initial bit allocation and power allocation table is given by the {b'$_i$} and {E'$_i$}.

The two kinds of the downstream bit allocation and transmission power allocation calculated by the above mentioned methods are memorized in the mapping section 12 in the ATU-C 1 and the demapping section 29 in the ATU-R 2. The mapping section 12 switches the bit allocation allocating for each carrier and transmission power allocation of each carrier at the high frequency band corresponding to the change of noise level and implements the data transmission. The demapping section 29 demodulates the data transmitted from the remote terminal based on the memorized downstream bit allocation and transmission power allocation.

Next, the data transmission method using the bit allocation and transmission power allocation obtained at the initialed time as mentioned above.

The data transmitted from the external equipment in a constant rate are temporarily memorized at the rate converter 11 in order to adjust for the dual bitmap.

The mapping section 12 obtains the bit allocation allocating for each carrier and transmission power allocation using for each carrier of the high frequency band from the bit & power allocation memorizing section 36 and reads out the bit allocation constellation allocated to each carrier by the bit allocation. Two cases of the constellation, one is that the bit allocation allocating to the carrier is 4 bits and the other is that the bit allocation allocating to the carrier is 5 bits, are shown in FIG. 22.

Figure 24:
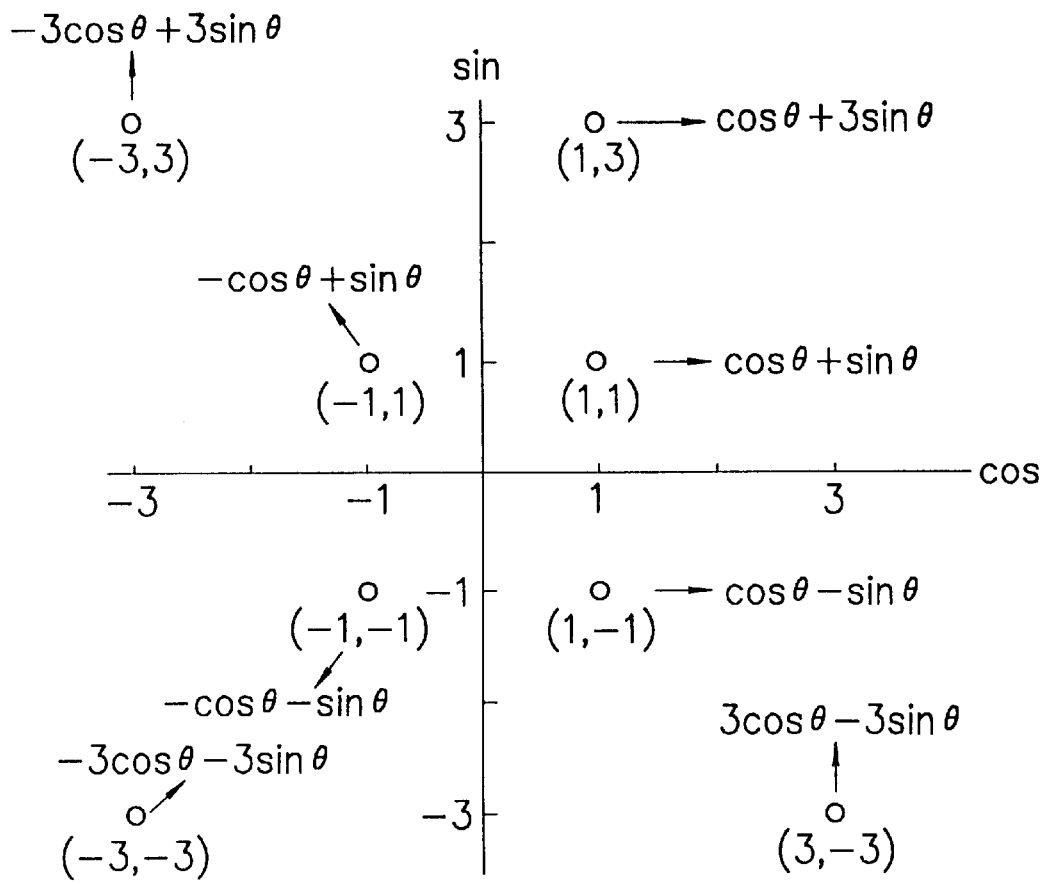
FIG. 24 is a diagram showing the constellation.

Next, the mapping section 12 adjusts the gain at the read out constellation corresponding to the transmission power allocation of obtained each carrier. After the constellation and the gain are determined, the information, which is expressed by the order of bits of data to be on the carriers, is converted to the position information on the constellation. FIG. 24 is a diagram showing the constellation. As shown in FIG. 24, the positions expressing the order of bits on the constellation are separated to sine elements and cosine elements and the amplitude of the carrier is modulated by composing the sine elements and the cosine elements. The information of the carrier whose amplitude is modulated is outputted to the IFFT 13.

Figure 25:
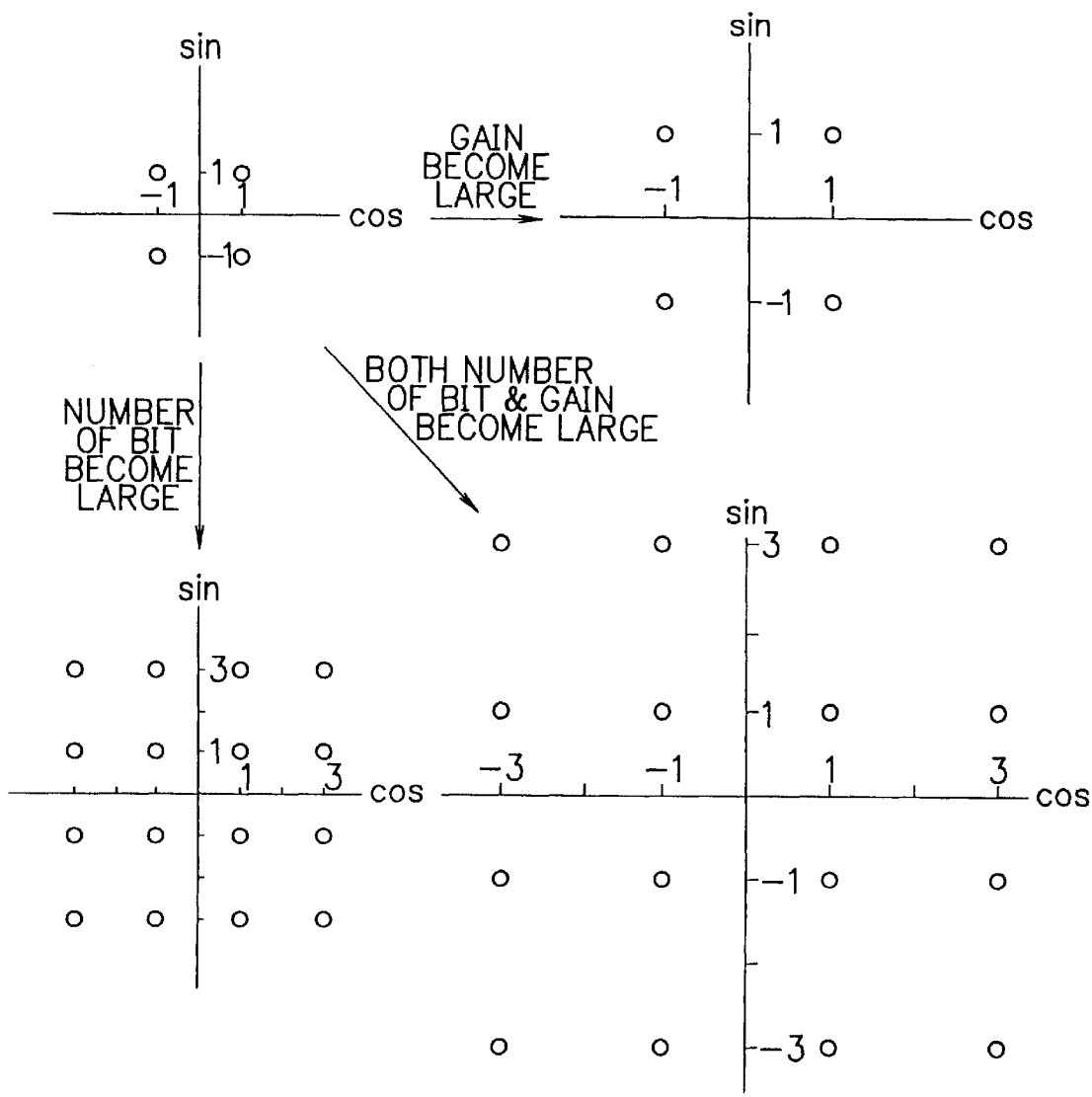
FIG. 25 is a diagram showing the relation between the gain and the amount of noise.

FIG. 25 is a diagram showing the relation between the gain and the amount of noise. As shown in FIG. 25, each point is moved far from the original point by making the gain high on the constellation. At the case that the number of bits to be transmitted is large and the data transmission is implemented by not making the gain high, the intervals of points on the constellation become narrow as shown in FIG. 25, therefore the probability of error caused by the noise becomes high. Therefore, at the case that the noise is large, the gain is made to high and with this the intervals of points on the constellation become wide and the probability of error is made to low.

The IFFT 13 implements the inverse fast Fourier transform to each carrier of high frequency band transmitted from the mapping section 12 and outputs the voltage value expressed in digital form by adding up each carrier.

The DAC 14 converts the voltage value in digital form generated at the IFFT 13 to the analog signal being the actual voltage value and outputs to the loop. In this, the side lobes generated in the low frequency band from the high frequency band carrier using for the data transmission are removed by the high-pass filter 7.

In the ATU-R 2, the side lobes generated in the low frequency band from the high frequency band carrier using for the downstream data transmission are removed by the high-pass filter 9.

At the receiving section of the ATU-R 2, the ADC 27 converts the received analog signal to the voltage value expressed in digital form.

The voltage value in digital form outputted from the ADC 27 is outputted to the FFT 28. The FFT 28 implements the fast Fourier transform to the voltage value in digital form and takes out each carrier of the high frequency band allocated the data. Each carrier of the high frequency band taken out from the FFT 28 is transmitted to the demapping section 29.

The demapping section 29 reads out two kinds of bit allocation and transmission power allocation from the bit and power allocation memorizing section 42 shown in FIG. 14 and takes out the data allocated to the carrier from the carrier of the high frequency band outputted from the FFT 28 by using the bit allocation and transmission power allocation designated by the bit and power allocation selecting section 34. That is, the constellation which is used for the data allocation to the carrier by the bit allocation and transmission power allocation is read out and the allocated data to the carrier are taken out by obtaining the position on the constellation by the amplitude of the carrier.

The data taken out by the demapping section 29 are outputted to the rate converter 30 and are temporarily stored. The rate converter 30 temporarily stores the data taken out by the demapping section 29 and transmits the data to the external equipment by making the output a constant amount.

At the upstream data transmission, the mapping section 24 uses the bit allocation and transmission power allocation designated by the bit and power allocation selecting section 34 and modulates the amplitude of each carrier of the low frequency band to the amplitude corresponding to the designated bit allocation and transmission power allocation and the order of bits of the data allocating to each carrier and outputs the result to the IFFT 25. The demapping section 17, which takes out the data allocated to the carrier from each carrier of the low frequency band from the ATU-R 2, selects the same bit allocation and transmission power allocation as the bit allocation and transmission power allocation used at the ATU-R 2 by the clock whose amplitude changes by synchronizing with the changing timing of noise level from two kinds of bit allocation and transmission power allocation obtained from the bit and power allocation memorizing section 38 and takes out the data from the carrier of the low frequency band from the FFT 16 by using the selected bit allocation and transmission power allocation.

Figure 26:
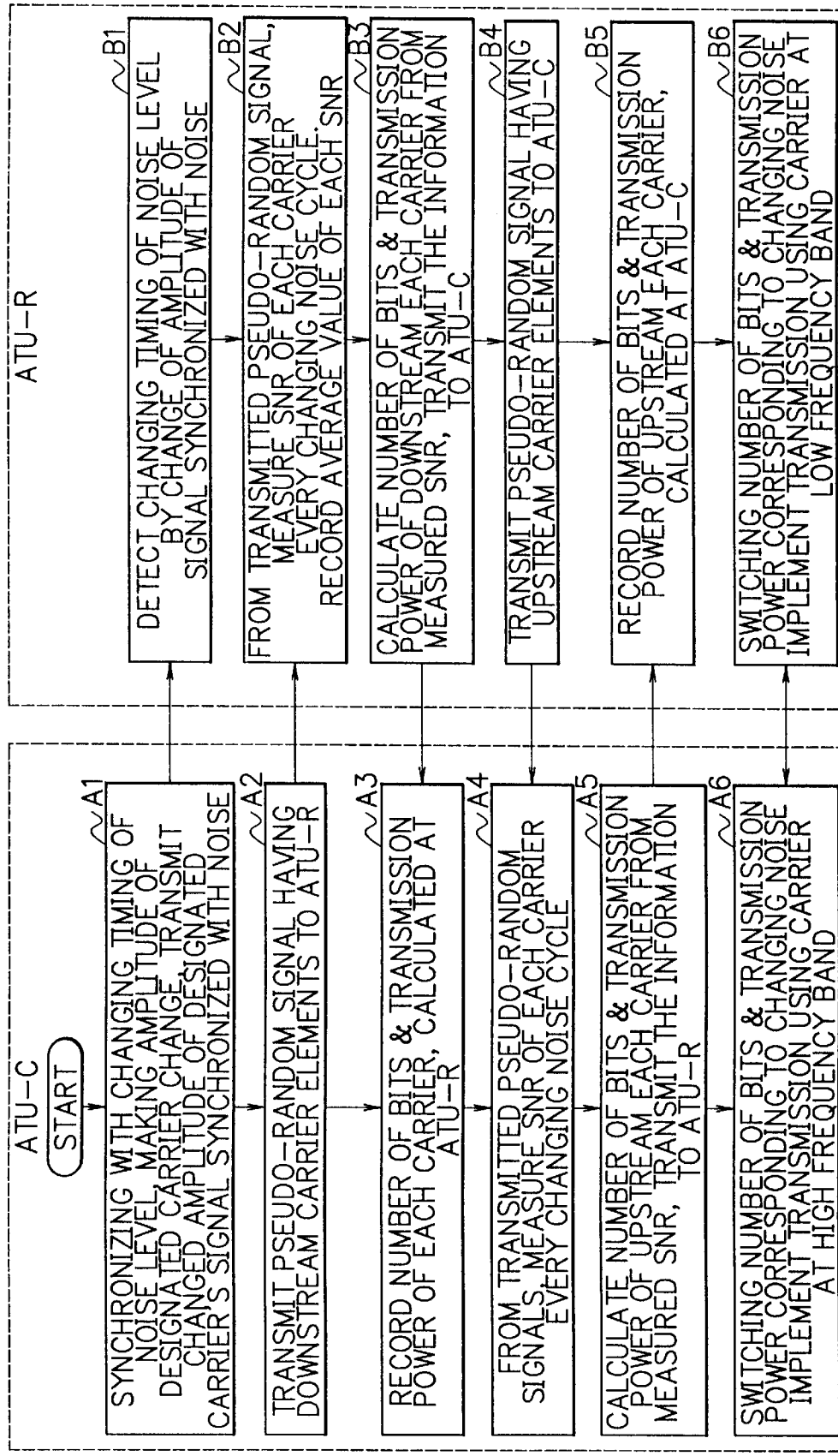
FIG. 26 is a flowchart showing the process of the present invention.

FIG. 26 is a flowchart showing the process of the present invention. Referring to FIG. 26, a series of processing of the present invention is explained.

In order to detect the changing timing of noise level at the ATU-R 2 shown in FIG. 9, the tone synchronized with noise generating section 21 in the ATU-C 1 makes the amplitude of the signal change by synchronizing with the clock being synchronized with the changing timing of noise level and generates the signal synchronized with noise, and the transmitting section 3 in the ATU-C 1 transmits the output (step A1).

At the receiving section 4 in the ATU-R 2, the clock detecting section 33 detects the changing timing of noise level by the change of the amplitude of this signal synchronized with noise (step B1) and inform the result to the bit & power allocation selecting section 34.

Next, in order to obtain the bit allocation allocating to each carrier and transmission power allocation using for each carrier of the high frequency band using for the downstream direction data transmission, the pseudo-random signal generating section 20 in the ATU-C 1 transmits the pseudo-random signal (step A2).

This pseudo-random signal is received at the receiving section 4 in the ATU-R 2 and the downstream SNR evaluating section 43 in FIG. 16 evaluates the SNR of each carrier of the high frequency band every noise level and calculates the average value of SNR of each carrier (step B2). From this average value of SNR, the bit and power allocation table calculating section 48 in FIG. 16 calculates the number of bits and transmission power of each carrier are calculated and the calculated information is memorized in the bit and power allocation memorizing section 42 in the demapping section 29 and is also transmitted to the ATU-C 1 by the transmitting section 6 (step B3).

In the ATU-C 1, the bit and power allocation memorizing section 36 in the mapping section 12 memorizes this transmitted bit allocation and transmission power allocation as the downstream carrier information (step A3).

Next, in order to calculate the bit allocation and transmission power allocation for the upstream carrier, the pseudo-random signal generated at the pseudo-random signal generating section 31 in the ATU-R 2 is transmitted to the ATU-C 1 (step B4). This pseudo-random signal has frequency elements of each carrier of the low frequency band using for the data transmission of the upstream direction. At the receiving section 5 in the ATU-C 1, the upstream SNR evaluating section 51 shown in FIG. 17 evaluates the SNR of each carrier of the low frequency band every noise level from the transmitted pseudo-random signal and calculates the average value of SNR of each carrier (step A4).

The bit and power allocation table calculating section 56 shown in FIG. 17 calculates the bit allocation and transmission power allocation of each carrier from this calculated SNR and the calculated result is memorized at the bit and power allocation memorizing section 38 in the demapping section 17 and is also transmitted to the ATU-R 2 from the transmitting section 3 (step A5).

At the ATU-R 2, the bit and power allocation memorizing section 40 in the mapping section 24 memorizes this transmitted bit allocation and transmission power allocation as the upstream carrier information (step B5).

At the same time of the communication starting, in the downstream transmission, the transmitting section 3 in the ATU-C 1 switches the bit allocation and transmission power allocation using for every noise level changing at the mapping section 12 and implements the bit allocation and transmission power allocation for the carrier of the high frequency band and transmits the data (step A6). The receiving section 4 in the ATU-R 2 extracts the transmitted data based on the two kinds of bit allocation and transmission power allocation memorized in the bit and power allocation memorizing section 42 in the demapping section 29.

In the upstream transmission, the transmitting section 6 in the ATU-R 2 switches the bit allocation and transmission power allocation using for every noise level changing at the mapping section 24 and implements the bit allocation and transmission power allocation for the carrier of the low frequency band and transmits the data (step B6). The receiving section 5 in the ATU-C 1 extracts the transmitted data based on the two kinds of bit allocation and transmission power allocation memorized in the bit and power allocation memorizing section 38 in the demapping section 17.

At this time, during the period that the noise generated at the data transmission of the downstream direction is large, as shown in FIG. 15A, the bit rate of the upstream direction which transmits using the low frequency band becomes higher than the bit rate of the downstream direction which transmits using the high frequency band. During the period that the noise generated at the data transmission of the upstream direction is large, as shown in FIG. 15B, the bit rate of the downstream direction which transmits using the high frequency band becomes higher than the bit rate of the upstream direction which transmits using the low frequency band.

The side lobes generated by the carrier of the high frequency band using for the data transmission of the downstream direction are removed by the high-pass filter 7 provided at the back position of the transmitting section in the ATU-C 1 and the high-pass filter 9 provided at the front position of the receiving section in the ATU-R 2. The side lobes generated by the carrier of the low frequency band using for the data transmission of the upstream direction are removed by the low-pass filter 10 provided at the back position of the transmitting section in the ATU-R 2 and the low-pass filter 8 provided at the front position of the receiving section in the ATU-C 1.

The bit allocation changes caused by the change of noise level, therefore, at the transmitting section, the rate converters 11 and 23 which temporarily store the data transmitted from the external equipment are provided and the amount of data is adjusted. And at the receiving section, the rate converters 18 and 30 are provided and the amount of output data is adjusted to be a constant value.

As mentioned above, at the embodiment of the present invention, the data transmission is implemented using the carrier of the high frequency band for the data transmission of the downstream direction and the data transmission is implemented using the carrier of the low frequency band for the data transmission of the upstream direction. During the period that the noise generated at the data transmission of the downstream direction is large, the bit rate of the upstream direction which transmits using the low frequency band is made to higher than the bit rate of the downstream direction which transmits using the high frequency band. During the period that the noise generated at the data transmission of the upstream direction is large, the bit rate of the downstream direction which transmits using the high frequency band is made to higher than the bit rate of the upstream direction which transmits using the low frequency band. With this, the present invention can make the communication performance improve largely under the noise environment changing cyclically, keeping the compatibility with the existing communication system using the frequency division. Moreover, the frequency bands using for the data transmission of the upstream direction and the downstream direction are separated, therefore the mutual cross-talk noise does not exist.

The bit allocation and transmission power allocation of the carrier of the high frequency band, which is calculated at the bit and power allocation calculating section 32 in the ATU-R 2 and is used for the data transmission of the downstream direction, is memorized at the mapping section 12 in the ATU-C 1. And corresponding to the changing timing of noise level, by making the bit rate during the period that the noise generated at the data transmission of the upstream direction is large higher than the bit rate during the period that the noise generated at the data transmission of the downstream direction is large, the bit allocation is implemented to each carrier of the high frequency band, with this, the transmission capacity of the downstream direction can be secured easily.

The bit allocation and transmission power allocation, which is calculated at the bit and power allocation calculating section 22 in the ATU-C 1, is memorized at the mapping section 24 in the ATU-R 2. And corresponding to the changing timing of noise level, by making the bit rate during the period that the noise generated at the data transmission of the downstream direction is large higher than the bit rate during the period that the noise generated at the data transmission of the upstream direction is large, the bit allocation is implemented to each carrier of the low frequency band, with this, the transmission capacity of the upstream direction can be secured easily.

The bit allocation and transmission power allocation of the carrier of the low frequency band, which is calculated at the bit and power allocation calculating section 22 in the ATU-C 1 and is used for the data transmission of the upstream direction, is memorized at the demapping section 17 in the ATU-C 1. And using the same bit allocation and transmission power allocation as the bit allocation and transmission power allocation allocated corresponding to the changing noise level at the ATU-R 2 for the demodulation of data, the data whose transmission capacity changes corresponding to the noise level can be easily demodulated.

The bit allocation and transmission power allocation of the carrier of the high frequency band, which is calculated at the bit and power allocation calculating section 32 in the ATU-R 2 and is used for the data transmission of the downstream direction, is memorized at the demapping section 29 in the ATU-R 2. And using the same bit allocation and transmission power allocation as the bit allocation and transmission power allocation allocated corresponding to the changing noise level at the ATU-C 1 for the demodulation of data, the data whose transmission capacity changes corresponding to the noise level can be easily demodulated.

At the ATU-R 2, the amplitude of each carrier of the low frequency band using for the data transmission of the upstream direction is modulated to the amplitude corresponding to the order of the designated data allocating by the predetermined pseudo-random order and is transmitted to the ATU-C 1. At the ATU-C 1, the bit allocation allocating to each carrier and transmission power allocation using for each carrier of the low frequency band is calculated, using this pseudo-random signal. With this, the data transmission corresponding to the noise level can be implemented.

At the ATU-C 1, the amplitude of each carrier of the high frequency band using for the data transmission of the downstream direction is modulated to the amplitude corresponding to the order of the designated data allocating by the predetermined pseudo-random order and is transmitted to the ATU-R 2. At the ATU-R 2, the bit allocation allocating to each carrier and transmission power allocation using for each carrier of the high frequency band is calculated, using this pseudo-random signal. With this, the data transmission corresponding to the noise level can be implemented.

Figure 27A:
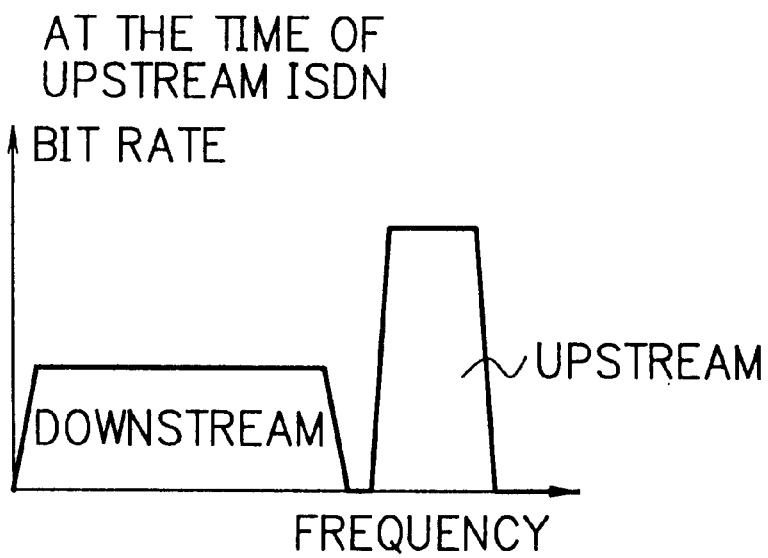
FIG. 27A is a diagram showing the relation between the bit rate and the frequency band of the upstream direction and downstream direction.
Figure 27B:
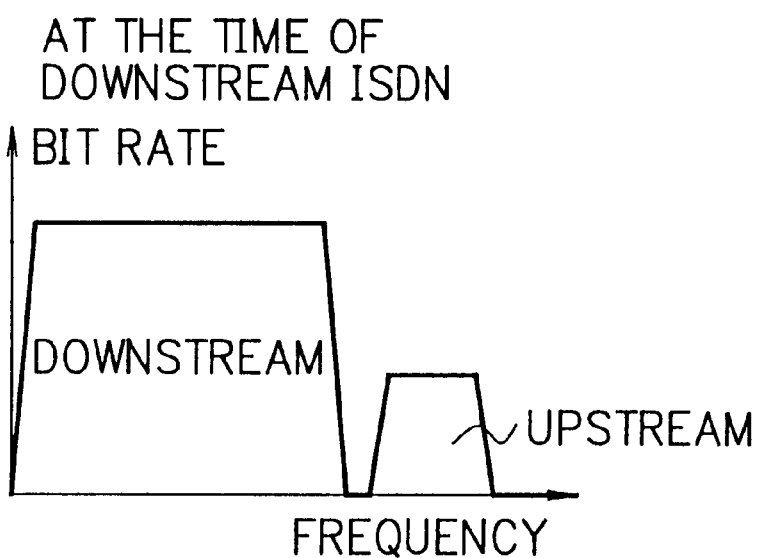
FIG. 27B is a diagram showing the relation between the bit rate and the frequency band of the upstream direction and downstream direction.

FIGS. 27A and 27B are diagrams showing the relation between the bit rate and the frequency band of the upstream direction and downstream direction. As an alternative of the above mentioned embodiment, as shown in FIGS. 27A and 27B, the carrier of the high frequency band is used for the data transmission of the upstream direction and the carrier of the low frequency band is used for the data transmission of the downstream direction. This example is also applicable. In this case, during the period that the noise generated at the data transmission to the downstream direction is large, the bit rate of the upstream direction which transmits using the carrier of the high frequency band is made higher than the bit rate of the downstream direction which transmits using the carrier of the low frequency band as shown in FIG. 27A. And during the period that the noise generated at the data transmission to the upstream direction is large, the bit rate of the downstream direction which transmits using the carrier of the low frequency band is made higher than the bit rate of the upstream direction which transmits using the carrier of the high frequency band as shown in FIG. 27B.

Figure 28:
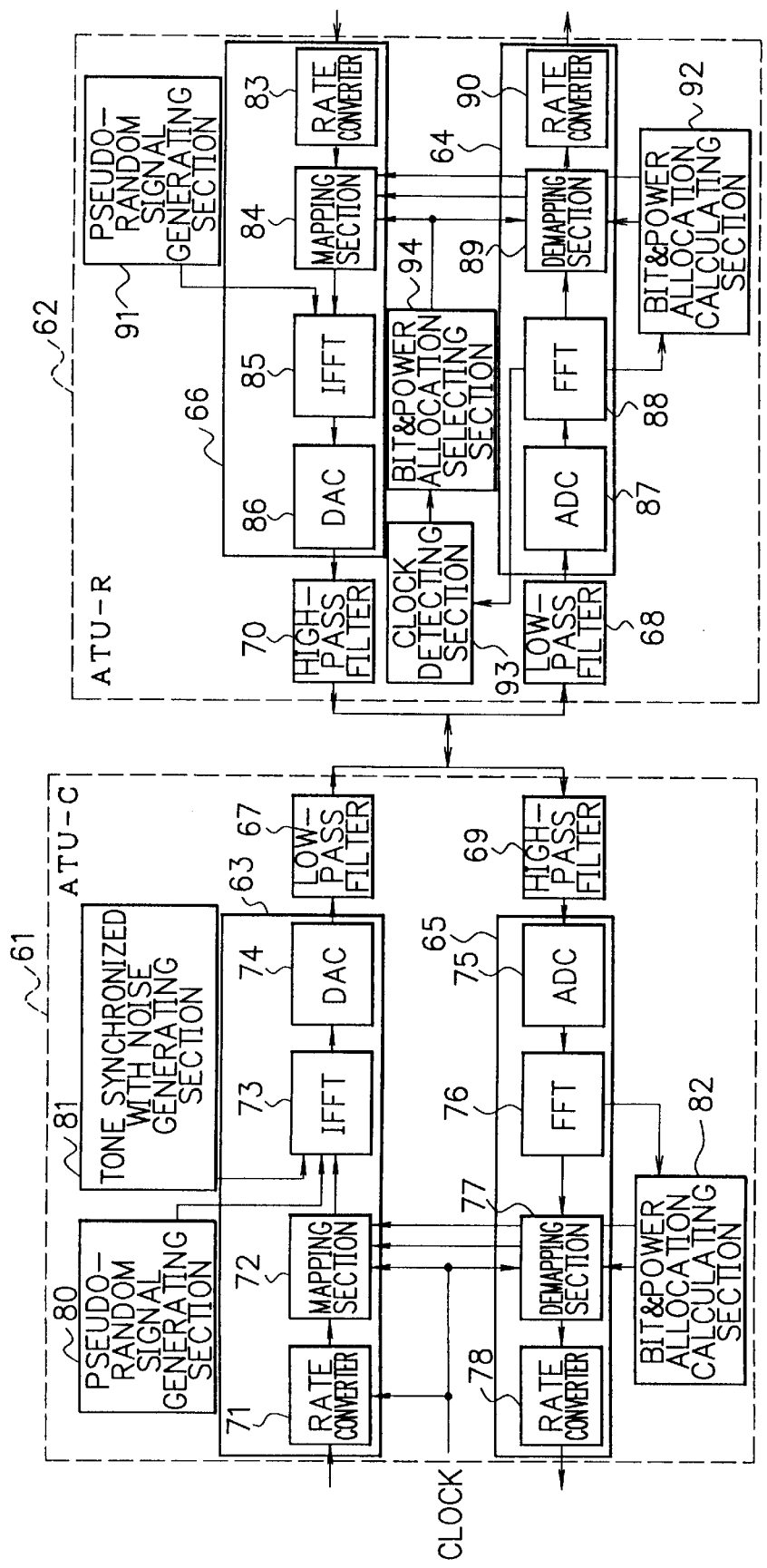
FIG. 28 is a block diagram showing another embodiment of the present invention.

FIG. 28 is a block diagram showing another embodiment of the present invention. In order to make the above mentioned data transmission possible, referring to FIG. 28 this embodiment is explained. A pseudo-random signal generating section 80 in an ATU-C 61 generates the pseudo-random signal for each carrier of the low frequency band using for the data transmission of the downstream direction. A bit and power allocation calculating section 92 in an ATU-R 62 calculates two kinds of bit allocation allocating to each carrier and transmission power allocation using for each carrier of the low frequency band at the NEXT generated and FEXT generated. And the calculated bit allocation and transmission power allocation is memorized at a demapping section 89 in the ATU-R 62 and at a mapping section 72 in the ATU-C 61.

A pseudo-random signal generating section 91 in the ATU-R 62 generates the pseudo-random signal for each carrier of the high frequency band using for the data transmission of the upstream direction. A bit and power allocation calculating section 82 in an ATU-C 61 calculates two kinds of bit allocation and transmission power allocation allocating for each carrier of the high frequency band at the NEXT generated and FEXT generated. And the calculated bit allocation and transmission power allocation is memorized at a demapping section 77 in the ATU-C 61 and at a mapping section 84 in the ATU-R 62.

At the time of the data transmission to the downstream direction, the mapping section 72 in the ATU-C 61 makes the bit rate of the period in which the noise generated at the data transmission to the upstream direction is large higher than the bit rate of the period in which the noise generated at the data transmission to the downstream direction is large and implements the bit allocation for the carrier of the low frequency band. The demapping section 89 in the ATU-R 62 takes out the data from the carrier transmitted from the ATU-C 61, by using the same bit allocation and transmission power allocation as the bit allocation and transmission power allocation allocated to the carrier of the low frequency band corresponding to the changing timing of noise level at the ATU-C 61, from the memorized two kinds of bit allocation and transmission power allocation.

The mapping section 84 in the ATU-R 62 makes the bit rate of the period in which the noise generated at the data transmission to the downstream direction is large higher than the bit rate of the period in which the noise generated at the data transmission to the upstream direction is large and implements the bit allocation for the carrier of the high frequency band. The demapping section 77 in the ATU-C 61 takes out the data from the-carrier transmitted from the ATU-R 62, by using the same bit allocation and transmission power allocation as the bit allocation and transmission power allocation allocated to the carrier of the high frequency band corresponding to the changing timing of noise level at the ATU-R 62, from the memorized two kinds of bit allocation and transmission power allocation.

FIG. 29 is a block diagram showing the function of filters of another embodiment of the present invention. As shown in FIG. 29, the side lobes generated at the high frequency band by the carrier of the low frequency band using for the data transmission of the downstream direction are removed by the low-pass filter 67 provided at the back position of the transmitting section 63 in the ATU-C 61 and the low-pass filter 68 provided at the front position of the receiving section 64 in the ATU-R 62. The side lobes generated at the low frequency band by the carrier of the high frequency band using for the data transmission of the upstream direction are removed by the high-pass filter 69 provided at the front position of the receiving section 65 in the ATU-C 61 and the high-pass filter 70 provided at the back position of the transmitting section 66 in the ATU-R 62

As mentioned above, at another embodiment of the present invention, the data transmission is implemented using the carrier of the low frequency band for the data transmission of the downstream direction and the data transmission is implemented using the carrier of the high frequency band for the data transmission of the upstream direction. During the period that the noise generated at the data transmission of the downstream direction is large, the bit rate of the upstream direction which transmits using the high frequency band is made to be higher than the bit rate of the downstream direction which transmits using the low frequency band. During the period that the noise generated at the data transmission of the upstream direction is large, the bit rate of the downstream direction which transmits using the low frequency band is made to be higher than the bit rate of the upstream direction which transmits using the high frequency band. With this, the present invention can make the communication performance improve largely under the noise environment changing cyclically, keeping the compatibility with the existing communication system using the frequency division. Moreover, the frequency bands using for the data transmission of the upstream direction and the downstream direction are separated, therefore the mutual cross-talk noise does not exist.

The ATU-R 62 modulates the amplitude of each carrier of the high frequency band using for the data transmission of the upstream direction to the amplitude corresponding to the order of the designated data allocated by the predetermined pseudo-random order and transmits to the ATU-C 61. The ATU-C 61 calculates the bit allocation allocating to each carrier and transmission power allocation using for each carrier of the high frequency band by using this pseudo-random signals. With this, the data transmission corresponding to the noise level can be implemented.

The ATU-C 61 modulates the amplitude of each carrier of the low frequency band using for the data transmission of the downstream direction to the amplitude corresponding to the order of the designated data allocated by the predetermined pseudo-random order and transmits to the ATU-R 62. The ATU-R 62 calculates the bit allocation allocating to each carrier and transmission power allocation using for each carrier of the low frequency band by using this pseudo-random signals. With this, the data transmission corresponding to the noise level can be implemented.

Figure 30:
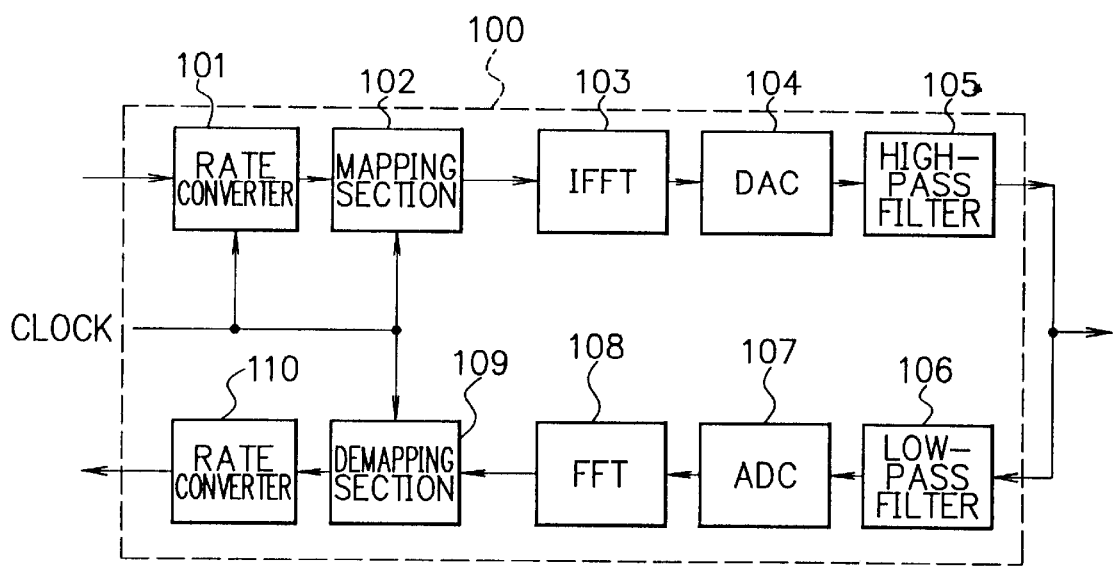
FIG. 30 is a block diagram showing an embodiment of an apparatus for multi-carrier transmission of the present invention.

FIG. 30 is a block diagram showing an embodiment of an apparatus for multi-carrier transmission of the present invention. Referring to FIG. 30, the embodiment of the apparatus and a method for the multi-carrier transmission of the present invention is explained. This embodiment is that the present invention is applied for the ADSL apparatus. The example is the case that the TCM-ISDN loop is installed in the same cable in which the ADSL loop is installed.

As shown in FIG. 30, the apparatus of the embodiment provides a rate converter 101, a mapping section 102, an IFFT 103, a DAC 104 and a high-pass filter 105 in a transmitting section, and a low-pass filter 106, an ADC 107, a FFT 108, a demapping section 109 and a rate converter 110 in a receiving section. The function of each equipment is the same as the function of each equipment explained in the mentioned above embodiment, therefore the same explanation is omitted.

In this embodiment, the mapping section 102 memorizes beforehand the bit allocation and transmission power allocation allocating to the carrier of the high frequency band at the period that the noise becomes large in the counter communication equipment and also memorizes beforehand the bit allocation and transmission power allocation allocating to the carrier of the high frequency band at the period that the noise becomes large in the apparatus for the multi-carrier transmission. And the demapping section 109 memorizes beforehand the bit allocation allocating to the carrier of the low frequency band corresponding to the changing timing of the noise level at the counter communication equipment and transmission power allocation using for this carrier.

Figure 31A:
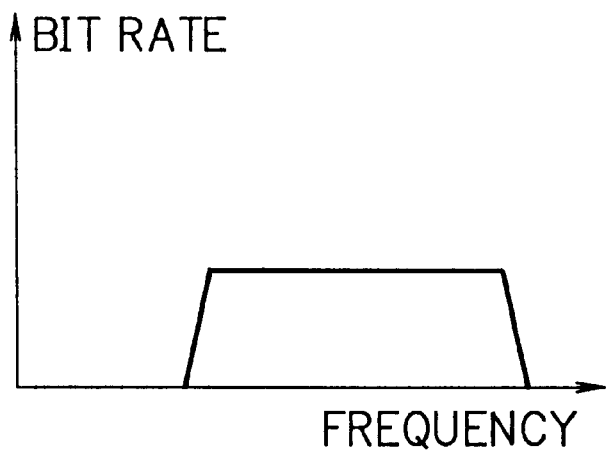
FIG. 31A is a diagram showing the relation between the using frequency band and the bit rate.
Figure 31B:
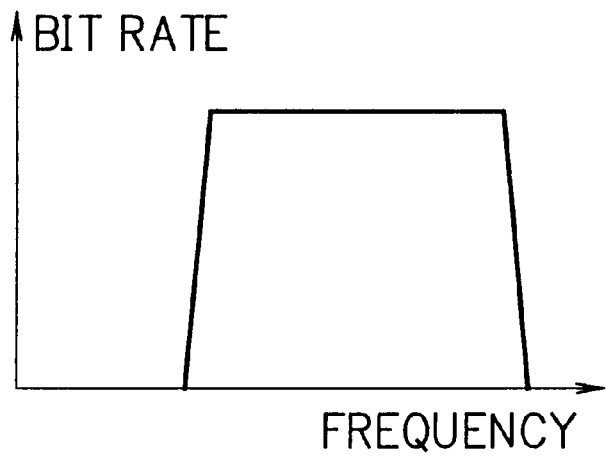
FIG. 31B is a diagram showing the relation between the using frequency band and the bit rate.

FIGS. 31A and 31B are diagrams showing the relation between the using frequency band and the bit rate. As shown in FIGS. 31A and 31B, the bit allocation and transmission power allocation is allocated to each carrier of the high frequency band, by that the bit rate of the data transmission which is implemented at the period that the noise becomes large at the counter communication equipment is made to be higher than the bit rate of the data transmission which is implemented at the period that the noise becomes large at the apparatus for multi-carrier transmission, corresponding to the changing timing of noise level.

The demapping section 109 demodulates the data transmitted from the counter communication equipment, by using the same bit allocation and transmission power allocation as the bit allocation and transmission power allocation allocated to the carrier of the low frequency band corresponding to the changing timing of noise level at the counter communication equipment from memorized two kinds of bit allocation and transmission power allocation.

As mentioned above, the present invention implements the data transmission by switching the bit allocation corresponding to the changing timing of noise level. Furthermore, the present invention separated the frequency band using for the transmission of the apparatus for multi-carrier transmission from the frequency band using for the transmission of the counter communication equipment. With this, the transmission capacity can be easily secured under the changing environment of noise level.

The data transmission from this apparatus to the counter communication equipment is implemented using the high frequency band and the data transmission from the counter communication equipment to this apparatus is implemented using the low frequency band. The bit allocation is allocated to each carrier of the high frequency band, by making the bit rate of the data transmission during the period that the noise generated at the counter communication equipment is large higher than the bit rate of the data transmission during the period that the noise generated at this apparatus is large. With this, the present invention can make the communication performance improve largely under the changing environment of noise level, keeping the compatibility with the existing communication system using the frequency division. Moreover, the frequency division system is applied for the data transmission, therefore the mutual cross-talk noise does not exist.

Figure 32A:
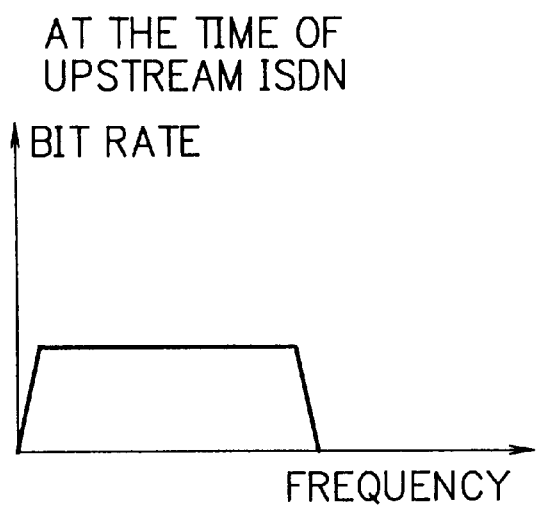
FIG. 32A is a diagram showing the relation between the using frequency band and the bit rate.
Figure 32B:
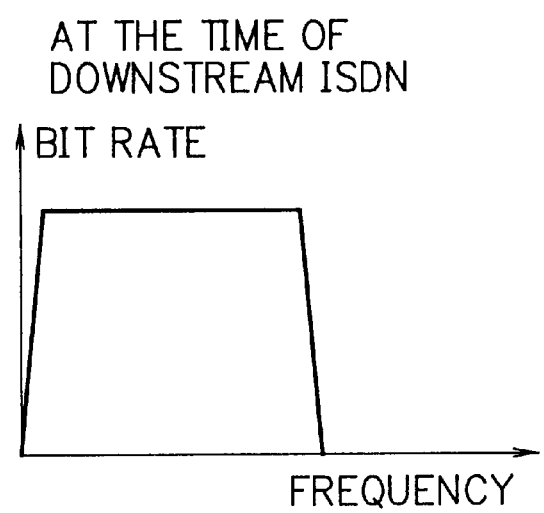
FIG. 32B is a diagram showing the relation between the using frequency band and the bit rate.

FIGS. 32A and 32B are diagrams showing the relation between the using frequency band and the bit rate. As an another alternative of the present invention, this bit allocation and transmission power allocation shown in FIGS. 32A and 32B is usable. As shown in FIGS. 32A and 32B, the bit allocation and transmission power allocation is allocated to each carrier of the low frequency band, by that the bit rate of the data transmission which is implemented at the period that the noise becomes large at the counter communication equipment is made to be higher than the bit rate of the data transmission which is implemented at the period that the noise becomes large at this apparatus, corresponding to the changing timing of noise level. This application is also usable.

Figure 33:
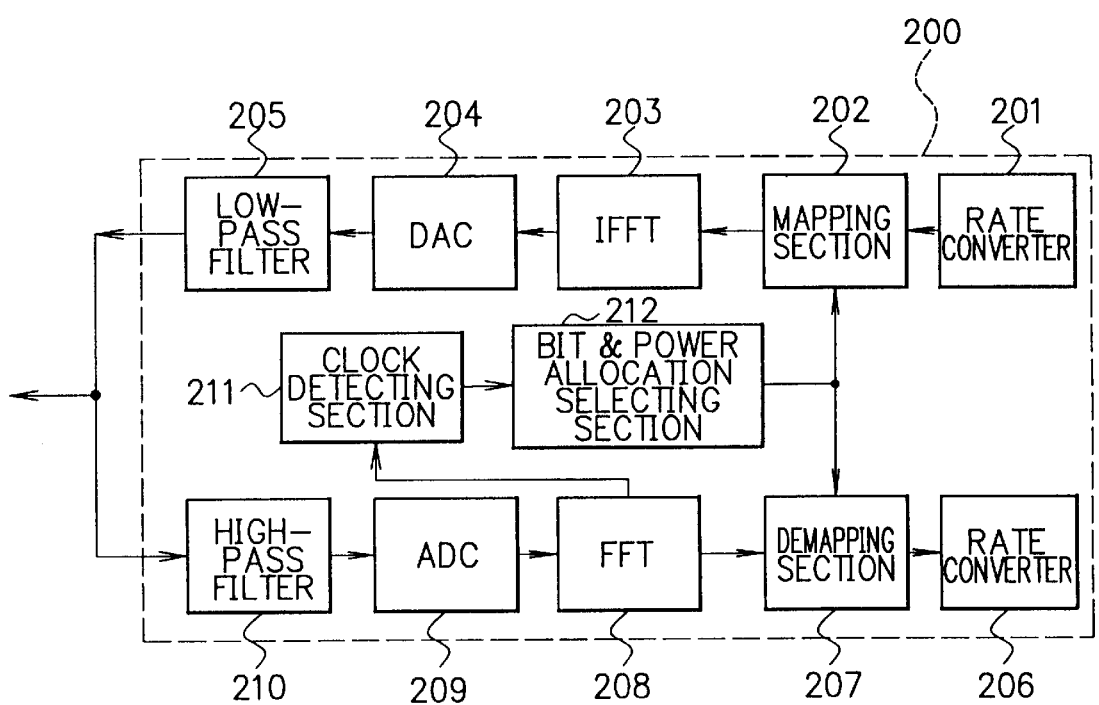
FIG. 33 is a block diagram showing a third embodiment of the present invention.

FIG. 33 is a block diagram showing a third embodiment of the present invention. In order to achieve this data transmission, as shown in FIG. 33, a transmitting section of this apparatus for multi-carrier transmission provides a rate converter 201, a mapping section 202, an IFFT 203, a DAC 204 and a low-pass filter 205, and transmits the data to a counter communication equipment by changing the bit allocation allocating to the carrier and transmission power allocation using for the carrier of the low frequency band which transmits the data corresponding to the changing timing of noise level. And a receiving section of this apparatus for multi-carrier transmission provides a high-pass filter 210, an ADC 209, a FFT 208, a demapping section 207 and a rate converter 206, and demodulates the data allocated to the carrier transmitted from the counter communication equipment, by using the same bit allocation and transmission power allocation as the bit allocation and transmission power allocation allocated to the carrier of the high frequency band corresponding to the changing timing of noise level at the counter communication equipment. This embodiment is also applicable. With this structure, the same effect as the mentioned above first and another embodiments can be obtained in this third embodiment.

The apparatus for multi-carrier transmission shown in FIGS. 30 and 33 obtains a clock synchronizing with the changing timing of noise level in this apparatus and informs the result to the mapping section and the demapping section, in order to recognize the changing timing of noise level. This structure is also applicable. And this apparatus further provides a clock detecting section 211 which detects the clock informed from the counter communication equipment and synchronizing with the changing timing of noise level, and a bit and power allocation selecting section 212 which designates the bit allocation and transmission power allocation using for the mapping section and the demapping section, by the changing timing of noise level detected by this clock detecting section. This structure is further usable.

The above mentioned embodiments are the suitable embodiments for the present invention. However, the present invention is not limited to these embodiments and is applicable for various types of embodiments within the concept of the present invention. For example, in the above mentioned embodiments, the present invention is applied for the ADSL system. However, the present invention is applicable for such as a SDSL (symmetric digital subscriber line) system, a HDSL (high speed digital subscriber line) and a VDSL (very high speed digital subscriber line). That is, the present invention is applicable for the communication system that the frequency band of the carrier using the data transmission of the upstream direction and the frequency band of the carrier using the data transmission of the downstream direction are separated. And the present invention is usable under the environment of cyclical cross-talk noise except the TCM-ISDN loop.

As it is clear from the mentioned above explanation, the system and method for multi-carrier transmission of the present invention implements the data transmission using a carrier of a first frequency band for data transmission of a first direction and using a carrier of a second frequency band for data transmission of a second direction. And this system and method makes the bit rate of the second direction which implements the data transmission using the second frequency band higher than the bit rate of the first direction which implements the data transmission using the first frequency band, during the period that the noise generated at the data transmission to the first direction is large. And this system and method makes the bit rate of the first direction which implements the data transmission using the first frequency band higher than the bit rate of the second direction which implements the data transmission using the second frequency band, during the period that the noise generated at the data transmission to the second direction is large. With this, this system and method can improve the communication performance largely under the changing noise environment of noise level, by keeping the compatibility with the existing communication systems using the frequency division. The frequency bands used for the data transmission of the first direction and the second direction are separated, therefore mutual cross-talk noise does not exist.

At a first communication equipment, this system and method memorizes the bit allocation allocating to the carrier and transmission power allocation using for each carrier of the first frequency band which transmits the data to the first direction during the period that the noise generated at the data transmission to the first direction is large and the bit allocation allocating to the carrier and transmission power allocation using for each carrier of the first frequency band which transmits the data to the first direction during the period that the noise generated at the data transmission to the second direction is large. And this system and method implements the bit allocation to the carrier of the first frequency band, by making the bit rate during the period that the noise generated at the data transmission to the second direction is large higher than the bit rate during the period that the noise generated at the data transmission to the first direction is large. With this, the transmission capacity to the first direction can be secured under the changing noise environment of noise level.

At a second communication equipment, this system and method memorizes the bit allocation allocating to the carrier and transmission power allocation using for each carrier of the second frequency band which transmits the data to the second direction during the period that the noise generated at the data transmission to the first direction is large and the bit allocation allocating to the carrier and transmission power allocation using for each carrier of the second frequency band which transmits the data to the second direction during the period that the noise generated at the data transmission to the second direction is large. And this system and method implements the bit allocation to the carrier of the second frequency band, by making the bit rate during the period that the noise generated at the data transmission to the first direction is large higher than the bit rate during the period that the noise generated at the data transmission to the second direction is large. With this, the transmission capacity to the second direction can be secured under the changing noise environment of noise level.

At the first communication equipment, this system and method memorizes the bit allocation allocating to the carrier and transmission power allocation using for each carrier of the second frequency band transmitted from the second communication equipment during the period that the noise generated at the data transmission to the second direction is large and the bit allocation allocating to the carrier and transmission power allocation using for each carrier of the second frequency band transmitted from the second communication equipment during the period that the noise generated at the data transmission to the first direction is large. And this system and method demodulates the data transmitted from the second communication equipment, from these two kinds of bit allocation and transmission power allocation, by using the same bit allocation and transmission power allocation as the bit allocation and transmission power allocation allocated corresponding to the changing timing of noise level at the second communication equipment. With this, even the transmission capacity of the data transmitted from the second communication equipment is changed, the data can be demodulated at the first communication equipment.

At the second communication equipment, this system and method memorizes the bit allocation allocating to the carrier and transmission power allocation using for each carrier of the first frequency band transmitted from the first communication equipment during the period that the noise generated at the data transmission to the second direction is large and the bit allocation allocating to the carrier and transmission power allocation using for each carrier of the first frequency band transmitted from the first communication equipment during the period that the noise generated at the data transmission to the first direction is large. And this system and method demodulates the data transmitted from the first communication equipment, from these two kinds of bit allocation and transmission power allocation, by using the same bit allocation and transmission power allocation as the bit allocation and transmission power allocation allocated corresponding to the changing timing of noise level at the first communication equipment. With this, even the transmission capacity of the data transmitted from the second communication equipment is changed, the data can be demodulated at the second communication equipment.

At the second communication equipment, this system and method modulates the amplitude of each carrier of the second frequency band using for the data transmission of the second direction to the amplitude corresponding to the order of the designated data allocated by the predetermined pseudo-random order and transmits the result to the first communication equipment. The first communication equipment calculates the bit allocation allocating to each carrier and transmission power allocation using for each carrier of the second frequency band, by using this pseudo-random signal. With this, the data communication corresponding to the noise level can be implemented.

At the first communication equipment, this system and method modulates the amplitude of each carrier of the first frequency band using for the data transmission of the first direction to the amplitude corresponding to the order of the designated data allocated by the predetermined pseudo-random order and transmits the result to the second communication equipment. The second communication equipment calculates the bit allocation allocating to each carrier and transmission power allocation using for each carrier of the second frequency band, by using this pseudo-random signal. With this, the bit allocation and transmission power allocation corresponding to the noise level can be calculated.

The apparatus and method for multi-carrier transmission of the present invention implements the data transmission from the apparatus for multi-carrier transmission to the counter communication equipment by using the first frequency band and implements the data transmission from the counter communication equipment to the apparatus for multi-carrier transmission by using the second frequency band. And this apparatus and method implements the bit allocation to each carrier of the first frequency band, by making the bit rate of the data transmission during the period that the noise becomes large at the counter communication equipment higher than the bit rate of the data transmission during the period that the noise becomes large at the apparatus for multi-carrier transmission. With this, the communication performance can be improved largely under the changing noise environment of noise level, keeping the compatibility with the existing communication system using the frequency division. Moreover, the frequency division system is used for the data transmission, therefore the mutual cross-talk noise does not exist.

The bit allocation allocating to each carrier and transmission power allocation using for each carrier of the first frequency band which transmits the data during the period that the noise is large at the apparatus for multi-carrier transmission and the bit allocation allocating to each carrier and transmission power allocation using for each carrier of the first frequency band which transmits the data during the period that the noise is large at the counter communication equipment are memorized. The bit allocation to each carrier of the first frequency band is implemented, by making the bit rate of the data transmission during the period that the noise becomes large at the counter communication equipment higher than the bit rate of the data transmission during the period that the noise becomes large at the apparatus for multi-carrier transmission. With this, the capacity of data transmission can be secured, even under the changing noise environment of noise level.

The bit allocation allocating to each carrier and transmission power allocation using for each carrier of the second frequency band transmitted from the counter communication equipment during the period that the noise is large at the apparatus for multi-carrier transmission and the bit allocation allocating to each carrier and transmission power allocation using for each carrier of the second frequency band transmitted from the counter communication equipment during the period that the noise is large at the counter communication equipment are memorized. The signal transmitted from the counter communication equipment is demodulated, by using the same bit allocation and transmission power allocation as the bit allocation and transmission power allocation used at the counter communication equipment corresponding to the changing timing of noise level. With this, even the amount of the data transmission from the counter communication equipment is changed by the change of noise level, the data transmitted corresponding to this change can be demodulated.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A system for multi-carrier transmission which implements data transmission using the multi-carrier between a first communication equipment and a second communication equipment interactively under the noise environment that the changing timing of noise level is known, wherein:
said first communication equipment switches bit rates of the data transmission using a first frequency band corresponding to the changing timing of noise level and comprises a first transmitting means for transmitting the data to said second communication equipment,
said second communication equipment switches bit rates of the data transmission using a second frequency band corresponding to the changing timing of noise level and comprises a second transmitting means for transmitting the data to said first communication equipment,
said system for multi-carrier transmission makes the bit rate with which said second transmitting means implements the data transmission of a second direction from said second communication equipment to said first communication equipment using said second frequency band higher than the bit rate with which said first transmitting means implements the data transmission of the first direction from said first communication equipment to said second communication equipment using said first frequency band, during the period that the noise generated at the data transmission of said first direction from said first communication equipment to said second communication equipment is large.

2. A system for multi-carrier transmission in accordance with claim 1, wherein:
said system for multi-carrier transmission makes the bit rate with which said first transmitting means implements the data transmission of said first direction using said first frequency band higher than the bit rate with which said second transmitting means implements the data transmission of said second direction using said second frequency band, during the period that the noise generated at the data transmission to said second direction is large.

3. A system for multi-carrier transmission in accordance with claim 1, wherein:
said first transmitting means implements the data transmission using the carrier of said first frequency band, by making the bit rate of the data transmission implementing during the period that the noise generated at the data transmission to said second direction is large higher than the bit rate of the data transmission implementing during the period that the noise generated at the data transmission to said first direction is large.

4. A system for multi-carrier transmission in accordance with claim 1, wherein:
said second transmitting means implements the data transmission using the carrier of said second frequency band, by making the bit rate of the data transmission implementing during the period that the noise generated at the data transmission to said first direction is large higher than the bit rate of the data transmission implementing during the period that the noise generated at the data transmission to said second direction is large.

5. A system for multi-carrier transmission in accordance with claim 1, wherein:
said first transmitting means, comprising:
a first memorizing means which memorizes the bit allocation allocating to each carrier of said first frequency band and the transmission power allocation using for each carrier of said first frequency band which transmit the data to said first direction during the period that the noise generated at the data transmission to said first direction is large and memorizes the bit allocation allocating to each carrier of said first frequency band and the transmission power allocation using for each carrier of said first frequency band which transmit the data to said first direction during the period that the noise generated at the data transmission to said second direction is large; and
a first modulating means which reads out the two kinds of bit allocation and transmission power allocation from said first memorizing means and allocates the bit allocation and transmission power allocation to each carrier of said first frequency band, by making the bit rate during the period that the noise generated at the data transmission to said second direction is large higher than the bit rate during the period that the noise generated at the data transmission to said first direction is large, corresponding to the changing timing of noise level.

6. A system for multi-carrier transmission in accordance with claim 1, wherein:
said second transmitting means, comprising:
a second memorizing means which memorizes the bit allocation allocating to each carrier of said second frequency band and the transmission power allocation using for each carrier of said second frequency band which transmit the data to said second direction during the period that the noise generated at the data transmission to said first direction is large and memorizes the bit allocation allocating to each carrier of said second frequency band and the transmission power allocation using for each carrier of said second frequency band which transmit the data to said second direction during the period that the noise generated at the data transmission to said second direction is large; and a second modulating means which reads out the two kinds of bit allocation and transmission power allocation from said second memorizing section and allocates the bit allocation and transmission power allocation to each carrier of said second frequency band, by making the bit rate during the period that the noise generated at the data transmission to said first direction is large higher than the bit rate during the period that the noise generated at the data transmission to said second direction is large, corresponding to the changing timing of noise level.

7. A system for multi-carrier transmission in accordance with claim 1, wherein:

said first communication equipment, comprising:

a third memorizing means which memorizes the bit allocation allocating to each carrier of said second frequency band and transmission power allocation using for each carrier of said second frequency band transmitted from said second communication equipment during the period the noise generated at the data transmission to said first direction and memorizes the bit allocation allocating to each carrier of said second frequency band and transmission power allocation using for each carrier of said second frequency band transmitted from said second communication equipment during the period the noise generated at the data transmission to said second direction; and a first receiving means which includes a first demodulating means that reads out the two kinds of bit allocation and transmission power allocation from said third memorizing section and demodulates the data transmitted from said second communication equipment, by using the same bit allocation and transmission power allocation as the bit allocation and transmission power allocation allocated at said second communication equipment corresponding to the changing timing of noise level.

8. A system for multi-carrier transmission in accordance with claim 1, wherein:

said second communication equipment, comprising:

a fourth memorizing means which memorizes the bit allocation allocating to each carrier of said first frequency band and transmission power allocation using for each carrier of said first frequency band transmitted from said first communication equipment during the period the noise generated at the data transmission to said first direction and memorizes the bit allocation allocating to each carrier of said first frequency band and transmission power allocation using for each carrier of said first frequency band transmitted from said first communication equipment during the period the noise generated at the data transmission to said second direction; and a second receiving means which includes a second demodulating means that reads out the two kinds of bit allocation and transmission power allocation from said fourth memorizing means and demodulates the data transmitted from said first communication equipment, by using the same bit allocation and transmission power allocation as the bit allocation and transmission power allocation allocated at said first communication equipment corresponding to the changing timing of noise level.

9. A system for multi-carrier transmission in accordance with claim 7, wherein:

said second communication equipment comprises a second pseudo-random signal generating means which generates pseudo-random signals allocated in sequence the data being predetermined pseudo-random order to each carrier of said second frequency band using for the data transmission to said second direction and outputs to said second transmitting means, said first communication equipment, comprising:

a first SNR (signal to noise ratio) calculating means which calculates the two kinds of average SNR value of each carrier of said second frequency band using for the data transmission of said second direction used the pseudo-random signals received at said first receiving means, at the period that the noise generated at the data transmission to said second direction is large and at the period that the noise generated at the data transmission to said first direction is large; and a first bit and power allocation calculating means which calculates the two kinds of the bit allocation allocating to each carrier and transmission power allocation using for each carrier of said second frequency band, by using said average SNR value of each carrier calculated at said first SNR calculating means, at the period that the noise generated at the data transmission to said second direction is large and at the period that the noise generated at the data transmission to said first direction is large, said third memorizing means memorizes the information of the two kinds of bit allocation and transmission power allocation calculated at said first bit and power allocation calculating means and also outputs them to said first modulating means, and said first transmitting means outputs them to said second communication equipment, said first modulating means, at the training period that evaluates the bit allocation and transmission power allocation allocating to each carrier, allocates the information of the two kinds of the bit allocation and transmission power allocation calculated at said first bit and power allocation calculating means to the designated carrier in designated number of bits each, said second communication equipment receives said designated carrier from said first communication equipment at said second receiving means and also takes out the information of said two kinds of bit allocation and transmission power allocation from said designated carrier at said second demodulating means and memorizes the information of the taken out two kinds of bit allocation and transmission power allocation at said second memorizing means.

10. A system for multi-carrier transmission in accordance with claim 8, wherein:

said first communication equipment comprises a first pseudo-random signal generating means which generates pseudo-random signals allocated in sequence the data being predetermined pseudo-random order to each carrier of said first frequency band using for the data transmission to said first direction and outputs to said first transmitting means, said second communication equipment, comprising:

a second SNR (signal to noise ratio) calculating means which calculates the two kinds of average SNR value of each carrier of said first frequency band using for the data transmission of said first direction used the pseudo-random signals received at said second receiving means, at the period that the noise generated at the data transmission to said first direction is large and at the period that the noise generated at the data transmission to said second direction is large; and a second bit and power allocation calculating means which calculates the two kinds of the bit allocation allocating to each carrier and transmission power allocation using for each carrier of said first frequency band, by using said average SNR value of each carrier calculated at said second SNR calculating means, at the period that the noise generated at the data transmission to said first direction is large and at the period that the noise generated at the data transmission to said second direction is large, said fourth memorizing means memorizes the information of the two kinds of bit allocation and transmission power allocation calculated at said second bit and power allocation calculating means and also outputs them to said second modulating means, and said second transmitting means outputs them to said first communication equipment, said second modulating means, at the training period that evaluates the bit allocation and transmission power allocation allocating to each carrier, allocates the information of the two kinds of the bit allocation and transmission power allocation calculated at said second bit and power allocation calculating means to the designated carrier in designated number of bits each, said first communication equipment receives said designated carrier from said second communication equipment at said first receiving means and also takes out the information of said two kinds of bit allocation and transmission power allocation from said designated carrier at said first demodulating means and memorizes the information of the taken out two kinds of bit allocation and transmission power allocation at said first memorizing means.

11. A system for multi-carrier transmission in accordance with claim 9, wherein:

said first communication equipment, comprising:

a first filter means which removes side lobes generated at said second frequency band from the carrier of said first frequency band having the data, at the back position of said first transmitting means; and a second filter means which removes side lobes generated at said first frequency band from the carrier of said second frequency band transmitted from said second communication equipment, at the front position of said first receiving means.

12. A system for multi-carrier transmission in accordance with claim 9, wherein:

sad second communication equipment, comprising:

a third filter means which removes side lobes generated at said first frequency band from the carrier of said second frequency band having the data, at the front position of said second transmitting means; and a fourth filter means which removes side lobes generated at said second frequency band from the carrier of said first frequency band transmitted from said first communication equipment, at the back position of said second receiving means.

13. A system for multi-carrier transmission in accordance with claim 8, wherein:

said first communication equipment comprises a clock signal generating means which generates the clock signal changed the amplitude of the designated carrier, by synchronizing with the changing timing of noise level and transmits said clock signal from said clock signal generating means to said second communication equipment using said first transmitting means, said second communication equipment comprises a clock detecting means which detects the changing timing of noise level from the change of the amplitude of said clock signal received from said second receiving means, transmitted from said first communication equipment, said second communication equipment designates the bit allocation and transmission power allocation using for the implementation of the data transmission corresponding to the noise level, from the two kinds of bit allocation and transmission power allocation memorized at said second memorizing means, to said second modulating means by the changing timing of noise level detected by said clock detecting means, and comprises a bit allocation and transmission power allocation selecting means which designates the same bit allocation and transmission power allocation as the bit allocation and transmission power allocation used corresponding to the noise level at said first communication equipment using for the demodulation of the data, from the two kinds of bit allocation and transmission power allocation memorized at said fourth memorizing means, to said second demodulating means.

14. A system for multi-carrier transmission which implements the data transmission using the multi-carrier between the first communication equipment and the second communication equipment interactively under the noise environment that the changing timing of noise level is known, wherein:

said first communication equipment, comprising:

a first temporarily memorizing means for memorizing the data transmitted from external equipment temporarily;

a first memorizing means which memorizes the two kinds of the bit allocation allocating to each carrier and transmission power allocation using for each carrier of the first frequency band transmitting the data, at the period that the noise generated at the data transmission to the first direction being from said first communication equipment to said second communication equipment is large and at the period that the noise generated at the data transmission to the second direction being from said second communication equipment to said first communication equipment is large;

a first modulating means which reads out the two kinds of bit allocation and transmission power allocation memorized in said first memorizing means and also reads out the data memorized in said first temporarily memorizing means, and selects the bit allocation allocating to each carrier and transmission power allocation using for each carrier of said first frequency band corresponding to the noise level at the data transmission, and modulates the amplitude of said each carrier to the amplitude corresponding to the selected bit allocation and transmission power allocation and the order of bits of the data allocating to said each carrier;

a first IFFT (inverse fast Fourier transform) means which adds up each carrier of said first frequency band modulated the amplitude at said first modulating means and outputs the voltage value expressed in digital form;

a transmitting means providing a first DAC (digital to analog converter) means which converts the voltage value expressed in digital form outputted from said first IFFT means to analog signals and outputs to a loop; and a first filter means which removes side lobes generated at said second frequency band by the carrier of said first frequency band outputted to the loop by said first DAC means, and allocates the bit allocation and transmission power allocation to each carrier of said first frequency band, by making the bit rate during the period that the noise generated at the data transmission to said second direction is large higher than the bit rate during the period that the noise generated at the data transmission to said first direction is large, by said first modulating means.

15. A system for multi-carrier transmission in accordance with claim 14, wherein:

said second communication equipment, comprising:

a second temporarily memorizing means for memorizing the data transmitted from external equipment temporarily;

a second memorizing means which memorizes the two kinds of the bit allocation allocating to each carrier and transmission power allocation using for each carrier of the second frequency band transmitting the data, at the period that the noise generated at the data transmission to the first direction is large and at the period that the noise generated at the data transmission to the second direction is large;

a second modulating means which reads out the two kinds of bit allocation and transmission power allocation memorized in said second memorizing means and also reads out the data memorized in said second temporarily memorizing means, and selects the bit allocation allocating to each carrier and transmission power allocation using for each carrier of said second frequency band corresponding to the noise level at the data transmission, and demodulates said amplitude of each carrier to the amplitude corresponding to the selected bit allocation and transmission power allocation and said order of bits allocating to each carrier;

a second IFFT (inverse fast Fourier transform) means which adds up each carrier of said second frequency band modulated the amplitude at said second modulating means and outputs the voltage value expressed in digital form;

a transmitting means providing a second DAC (digital to analog converter) means which converts the voltage value expressed in digital form outputted from said second IFFT means to analog signals and outputs to a loop; and a third filter means which removes side lobes generated at said first frequency band by the carrier of said second frequency band outputted to the loop by said second DAC means, and allocates the bit allocation and transmission power allocation to each carrier of said second frequency band, by making the bit rate during the period that the noise generated at the data transmission to said first direction is large higher than the bit rate during the period that the noise generated at the data transmission to said second direction is large, by said second modulating means.

16. A system for multi-carrier transmission in accordance with claim 14, wherein:

said first communication equipment, comprising:

a first ADC (analog to digital converter) means which converts analog signals transmitted from said second communication equipment using the carrier of said second frequency band to the voltage value expressed in digital form;

a first FFT (fast Fourier transform) means which implements the fast Fourier transform to said voltage value expressed in digital form from said first ADC means and takes out each carrier whose amplitude is modulated of said second frequency band;

a third memorizing means which memorizes the two kinds of the bit allocation allocated to each carrier and transmission power allocation used for each carrier of said second frequency band transmitting from said second communication equipment, at the period that the noise generated at the data transmission to said first direction is large and at the period that the noise generated at the data transmission to said second direction is large;

a first demodulating means which reads out the two kinds of the bit allocation and transmission power allocation from said third memorizing means and takes out the data allocated to each carrier of said second frequency band from said first FFT means, by using the same bit allocation and transmission power allocation as the bit allocation and transmission power allocation allocated corresponding to the changing timing of noise level at said second communication equipment;

a receiving means providing a third temporarily memorizing means which temporarily memorizes the data taken out by said first demodulating means, in order to make the output amount of data a constant value; and a second filter means which removes side lobes generated at said first frequency band by each carrier of said second frequency band transmitted from said second communication equipment, at the front position of said receiving means.

17. A system for multi-carrier transmission in accordance with claim 15, wherein:

said second communication equipment, comprising:

a second ADC (analog to digital converter) means which converts analog signals transmitted from said first communication equipment using the carrier of said first frequency band to the voltage value expressed in digital form;

a second FFT (fast Fourier transform) means which implements the fast Fourier transform to said voltage value expressed in digital form from said second ADC means and takes out each carrier whose amplitude is modulated of said first frequency band;

a fourth memorizing means which memorizes the two kinds of the bit allocation allocated to each carrier and transmission power allocation used for each carrier of said first frequency band transmitting from said first communication equipment, at the period that the noise generated at the data transmission to said first direction is large and at the period that the noise generated at the data transmission to said second direction is large;

a second demodulating means which reads out the two kinds of the bit allocation and transmission power allocation from said fourth memorizing means and takes out the data allocated to each carrier of said first frequency band from said second FFT means, by using the same bit allocation and transmission power allocation as the bit allocation and transmission power allocation allocated corresponding to the changing timing of noise level at said first communication equipment;

a receiving means providing a fourth temporarily memorizing means which temporarily memorizes the data taken out by said second demodulating means, in order to make the output amount of data a constant value; and a fourth filter means which removes side lobes generated at said second frequency band by each carrier of said first frequency band transmitted from said first communication equipment, at the front position of said receiving means.

18. A system for multi-carrier transmission in accordance with claim 17, wherein:

said second communication equipment, comprising:
a second pseudo-random signal generating means which modulates the amplitude of each carrier of said second frequency band using for the data transmission of said second direction to the amplitude corresponding to the order of bits of the designated data allocating by the predetermined pseudo-random order, and outputs the result to said second IFFT, said first communication equipment, comprising:
a first SNR calculating means which calculates the two kinds of average value of SNR of each carrier of said second frequency band using for the data transmission to said second direction, by using each carrier whose amplitude is modulated of said second frequency band, taken out by said first FFT means, at the period that the noise generated at the data transmission to said second direction is large and at the period that the noise generated at the data transmission to said first direction is large; and a first bit and power allocation calculating means which calculates the two kinds of the bit allocation allocating to each carrier and transmission power allocation using for each carrier of said second frequency band, by using the average value of SNR of said each carrier calculated at said first SNR calculating means, at the period that the noise generated at the data transmission to said second direction is large and at the period that the noise generated at the data transmission to said first direction is large, and the information of the two kinds of bit allocation and transmission power allocation calculated at said first bit and power allocation calculating means is memorized in said third memorizing means and is also outputted to said first modulating means, and is outputted to said second communication equipment, said first modulating means, at the training period that the bit allocation and transmission power allocation allocating to said each carrier is evaluated, modulates the amplitude of the designated carrier to the amplitude corresponding to the order of bits of the data allocating to each carrier, with this, allocates the information of the two kinds of bit allocation and transmission power allocation calculated at said first bit and power allocation calculating means to said designated carrier in the designated number of bits each and outputs the result to said first IFFT means, said second communication equipment takes out the information of said two kinds of bit allocation and transmission power allocation from said designated carrier whose amplitude is modulated which is taken out from said second FFT means at said second demodulating means and memorizes the information of the taken out two kinds of bit allocation and transmission power allocation in said second memorizing means.

19. A system for multi-carrier transmission in accordance with claim 17, wherein:

said first communication equipment, comprising:
a first pseudo-random signal generating means which modulates the amplitude of each carrier of said first frequency band using for the data transmission of said first direction to the amplitude corresponding to the order of bits of the designated data allocating by the predetermined pseudo-random order, and outputs the result to said first IFFT, said second communication equipment, comprising:
a second SNR calculating means which calculates the two kinds of average value of SNR of each carrier of said first frequency band using for the data transmission to said first direction, by using each carrier whose amplitude is modulated of said first frequency band, taken out by said second FFT means, at the period that the noise generated at the data transmission to said first direction is large and at the period that the noise generated at the data transmission to said second direction is large; and a second bit and power allocation calculating means which calculates the two kinds of the bit allocation allocating to each carrier and transmission power allocation using for each carrier of said first frequency band, by using the average value of SNR of said each carrier calculated at said second SNR calculating means, at the period that the noise generated at the data transmission to said first direction is large and at the period that the noise generated at the data transmission to said second direction is large, and the information of the two kinds of bit allocation and transmission power allocation calculated at said second bit and power allocation calculating means is memorized in said fourth memorizing means and is also outputted to said second modulating means, and is outputted to said first communication equipment, said second modulating means, at the training period that the bit allocation and transmission power allocation allocating to said each carrier is evaluated, modulates the amplitude of the designated carrier to the amplitude corresponding to the order of bits of the data allocating to each carrier, with this, allocates the information of the two kinds of bit allocation and transmission power allocation calculated at said second bit and power allocation calculating means to said designated carrier in the designated number of bits each and outputs the result to said second IFFT means, said first communication equipment takes out the information of said two kinds of bit allocation and transmission power allocation from said designated carrier whose amplitude is modulated which is taken out from said first FFT means at said first demodulating means and memorizes the information of the taken out two kinds of bit allocation and transmission power allocation in said first memorizing means.

20. A system for multi-carrier transmission in accordance with claim 17, wherein:

said first communication equipment, comprising:
a signal synchronized with noise generating means which generates a signal synchronized with noise which makes the amplitude of the designated carrier change, by synchronizing with the changing timing of noise level, and outputs the result to said first IFFT means, said second communication equipment, comprising:
- a timing detecting means which detects the changing timing of noise level by the change of the amplitude of said designated carrier taking out from said second FFT means; and
- a bit and power allocation selecting means which implements the designation of the bit allocation and transmission power allocation using for the data transmission corresponding to the noise level, from the two kinds of bit allocation and transmission power allocation memorized in said second memorizing means, to said second modulating means, by the changing timing of noise level detected by said timing detecting means, and designates the same bit allocation and transmission power allocation as the bit allocation and transmission power allocation used corresponding to the noise level at said first communication equipment from the two kinds of bit allocation and transmission power allocation memorized in said fourth memorizing means, to said second demodulating means using for the demodulation of the data.

21. A system for multi-carrier transmission in accordance with claim 1, wherein:
said first frequency band is a high frequency band; and
said second frequency band is a low frequency band.

22. A system for multi-carrier transmission in accordance with claim 1, wherein:
said first frequency band is a low frequency band; and
said second frequency band is a high frequency band.

23. An apparatus for multi-carrier transmission which implements the data transmission using the multi-carrier under the noise environment that the changing timing of noise level is known, comprising:
a transmitting means which implements the data transmission using each carrier of a first frequency band, by making the bit rate of the data transmission implementing during the period that the noise becomes large at the counter communication equipment higher than the bit rate of the data transmission implementing during the period that the noise becomes large at the apparatus for multi-carrier transmission.

24. An apparatus for multi-carrier transmission in accordance with claim 23, wherein:
said first transmitting means, comprising:
- a first memorizing means which memorizes the bit allocation allocating to each carrier of said first frequency band and the transmission power allocation using for each carrier of said first frequency band which transmit the data during the period that said noise is large at said apparatus for multi-carrier transmission and memorizes the bit allocation allocating to each carrier of said first frequency band and the transmission power allocation using for each carrier of said first frequency band which transmit the data during the period that said noise is large at said counter communication equipment;
- a first modulating means which reads out the two kinds of bit allocation and transmission power allocation memorized at said first memorizing means and allocates the bit allocation and transmission power allocation to each carrier of said first frequency band, by making the bit rate of the data transmission implementing during the period that said noise becomes large at said counter communication equipment higher than the bit rate of the data transmission implementing during the period that said noise becomes large at said apparatus for multi-carrier transmission.

25. An apparatus for multi-carrier transmission in accordance with claim 23, wherein:
said apparatus for multi-carrier transmission, comprising:
- a second memorizing means which memorizes the bit allocation allocating to each carrier of said second frequency band and transmission power allocation using for each carrier of said second frequency band transmitted from said counter communication equipment during the period that said noise is large at said apparatus for multi-carrier transmission and memorizes the bit allocation allocating to each carrier of said second frequency band and transmission power allocation using for each carrier of said second frequency band during the period that said noise is large at said counter communication equipment; and
- a receiving means which includes a demodulating means that reads out the two kinds of bit allocation and transmission power allocation from said second memorizing means and demodulates the data transmitted from said counter communication equipment, by using the same bit allocation and transmission power allocation as the bit allocation and transmission power allocation allocated at said counter communication equipment corresponding to the changing timing of noise level.

26. An apparatus for multi-carrier transmission in accordance with claim 25, wherein:
said apparatus for multi-carrier transmission, comprising:
- a first filter means which removes side lobes generated at said second frequency band from the carrier of said first frequency band having the data, at the back position of said transmitting means; and
- a second filter means which removes side lobes generated at said first frequency band from the carrier of said second frequency band transmitted from said counter communication equipment, at the front position of said receiving means.

27. An apparatus for multi-carrier transmission which implements the data transmission using the multi-carrier under the noise environment that the changing timing of noise level is known, wherein:
said apparatus for multi-carrier transmission, comprising:
- a first temporarily memorizing means for memorizing the data transmitted from external equipment temporarily;
- a first memorizing means which memorizes the two kinds of the bit allocation allocating to each carrier and transmission power allocation using for each carrier of the first frequency band transmitting the data, at the period that said noise is large at said apparatus for multi-carrier transmission and at the period that said noise is large at said counter communication equipment;
- a first modulating means which reads out the two kinds of bit allocation and transmission power allocation memorized in said first memorizing means and also reads out the data memorized in said first temporarily memorizing means, and selects the bit allocation allocating to said each carrier and transmission power allocation using for said each carrier of said first frequency band corresponding to the noise level at the data transmission, and modulates the amplitude of said each carrier to the amplitude corresponding to the selected bit allocation and transmission power allocation and the order of bits of the data allocating to said each carrier;

an IFFT (inverse fast Fourier transform) means which adds up each carrier of said first frequency band modulated the amplitude at said first modulating means and outputs the voltage value expressed in digital form;

a transmitting means providing a DAC (digital to analog converter) means which converts the voltage value expressed in digital form outputted from said IFFT means to analog signals and outputs to a loop; and a first filter means which removes side lobes generated at said second frequency band by the carrier of said first frequency band outputted to the loop by said DAC means, and allocates the bit allocation and transmission power allocation to each carrier of said first frequency band, by making the bit rate during the period that said noise is large at said counter communication equipment higher than the bit rate during the period that said noise is large at said apparatus for multi-carrier transmission, by said modulating means.

28. An apparatus for multi-carrier transmission in accordance with claim 27, wherein:

said apparatus for multi-carrier transmission, comprising:

an ADC (analog to digital converter) means which converts analog signals transmitted from said counter communication equipment using the carrier of said second frequency band to the voltage value expressed in digital form;

a FFT (fast Fourier transform) means which implements the fast Fourier transform to said voltage value expressed in digital form from said ADC means and takes out each carrier whose amplitude is modulated of said second frequency band;

a second memorizing means which memorizes the two kinds of bit allocation allocated to each carrier and transmission power allocation used for each carrier of said second frequency band transmitting from said counter communication equipment, at the period that said noise is large at said apparatus for multi-carrier transmission and at the period that said noise is large at said counter communication equipment;

a demodulating means which reads out the two kinds of the bit allocation and transmission power allocation from said second memorizing means and takes out the data allocated to each carrier of said second frequency band from said FFT means, by using the same bit allocation and transmission power allocation as the bit allocation and transmission power allocation allocated corresponding to the changing timing of noise level at said counter communication equipment;

a receiving means providing a second temporarily memorizing means which temporarily memorizes the data taken out by said demodulating means, in order to make the output amount of data a constant value; and a second filter means which removes side lobes generated at said first frequency band by each carrier of said second frequency band transmitted from said counter communication equipment, at the front position of said receiving means.

29. An apparatus for multi-carrier transmission in accordance with claim 23, wherein:

said first frequency band is a high frequency band; and said second frequency band is a low frequency band.

30. An apparatus for multi-carrier transmission in accordance with claim 23, wherein:

said first frequency band is a low frequency band; and said second frequency band is a high frequency band.

31. A method for multi-carrier transmission at a system for multi-carrier transmission which implements data transmission using the multi-carrier between a first communication equipment and a second communication equipment interactively under the noise environment that the changing timing of noise level is known, wherein:

said first communication equipment, comprising:

a switching process which switches the bit allocation allocating to each carrier of a first frequency band which transmits the data corresponding to the changing timing of noise level;

an allocating process which allocates the data to each carrier of said first frequency band corresponding to the switched bits allocation; and a first data transmitting process including a transmitting process which transmits each carrier allocated data of said first frequency band to said second communication equipment, said second communication equipment, comprising:

a switching process which switches the bit allocation allocating to each carrier of a second frequency band which transmits the data corresponding to the changing timing of noise level;

an allocating process which allocates the data to each carrier of said second frequency band corresponding to the switched bits allocation; and a second data transmitting process including a transmitting process which transmits each carrier allocated data of said second frequency band to said first communication equipment, said method for multi-carrier transmission, at the period that the noise is large at the data transmission of a first direction from said first communication equipment to said second communication equipment, makes the bit rate of the data transmission of said second direction from said second communication equipment to said first communication equipment using said second frequency band higher than the bit rate of the data transmission of said first direction from said first communication equipment to said second communication equipment using said first frequency band.

32. A method for multi-carrier transmission in accordance with claim 31, wherein:

said method for multi-carrier transmission, at the period that the noise generated at the data transmission to the second direction is large, makes the bit rate of the data transmission to said first direction using said first frequency band higher than the bit rate of the data transmission to said second direction using said second frequency band.

33. A method for multi-carrier transmission in accordance with claim 31, wherein:

said first data transmitting process allocates the data to each carrier of said first frequency band, by making the bit rate during the period that the noise generated at the data transmission to said second direction is large higher than the bit rate during the period that the noise generated at the data transmission to said first direction is large and implements the data transmission.

34. A method for multi-carrier transmission in accordance with claim 31, wherein:
said second data transmitting process allocates the data to each carrier of said second frequency band, by making the bit rate during the period that the noise generated at the data transmission to said first direction is large higher than the bit rate during the period that the noise generated at the data transmission to said second direction is large and implements the data transmission.

35. A method for multi-carrier transmission in accordance with claim 31, wherein:
said first communication equipment, comprising:
a first pseudo-random signal generating process which generates pseudo-random signals allocated in sequence the data being predetermined pseudo-random order to each carrier of said first frequency band using for the data transmission to said first direction; and
a first transmitting process which transmits said pseudo-random signals generated at said first pseudo-random signal generating process to said second communication equipment,
said second communication equipment, comprising:
a first receiving process which receives said pseudo-random signals transmitted from said first communication equipment;
a first SNR (signal to noise ratio) calculating process which calculates the SNR value of each carrier of said first frequency band using for the data transmission to said first direction, used said pseudo-random signals received at said first receiving process, at the period that the noise generated at the data transmission to said first direction is large and at the period that the noise generated at the data transmission to said second direction is large;
a first bit and power allocation calculating process which calculates the bit allocation allocating to each carrier and transmission power allocation using for each carrier of said first frequency band, by using said SNR value of each carrier calculated at said first SNR calculating process, at the period that the noise generated at the data transmission to said first direction is large and at the period that the noise generated at the data transmission to said second direction is large;
a first memorizing process which memorizes the two kinds of bit allocation and transmission power allocation calculated at said first bit and power allocation calculating process; and
a second transmitting process which transmits the two kinds of bit allocation and transmission power allocation calculated at said first bit and power allocation calculating process to said first communication equipment,
said first communication equipment, comprising:
a second receiving process which receives the two kinds of bit allocation and transmission power allocation transmitted form said second communication equipment; and
a second memorizing process which memorizes said two kinds of bit allocation and transmission allocation received by said second receiving process,
said first data transmitting process includes a first modulating process which allocates the bit allocation and transmission power allocation to each carrier of said first frequency band, by making the bit rate at the period that the noise generated at the data transmission to said second direction is large higher than the bit rate at the period that the noise generated at the data transmission to said first direction is large corresponding to the changing timing of noise level, using the two kinds of bit allocation and transmission power allocation memorized by said second memorizing process.

36. A method for multi-carrier transmission in accordance with claim 31, wherein:
said second communication equipment, comprising:
a second pseudo-random signal generating process which generates pseudo-random signals allocated in sequence the data being predetermined pseudo-random order to each carrier of said second frequency band using for the data transmission to said second direction; and
a third transmitting process which transmits said pseudo-random signals generated at said second pseudo-random signal generating process to said first communication equipment,
said first communication equipment, comprising:
a third receiving process which receives said pseudo-random signals transmitted from said second communication equipment;
a second SNR (signal to noise ratio) calculating process which calculates the SNR value of each carrier of said second frequency band using for the data transmission to said second direction, used said pseudo-random signals received at said third receiving process, at the period that the noise generated at the data transmission to said first direction is large and at the period that the noise generated at the data transmission to said second direction is large;
a second bit and power allocation calculating process which calculates the bit allocation allocating to each carrier and transmission power allocation using for each carrier of said second frequency band, by using said SNR value of each carrier calculated at said second SNR calculating process, at the period that the noise generated at the data transmission to said first direction is large and at the period that the noise generated at the data transmission to said second direction is large;
a third memorizing process which memorizes the two kinds of bit allocation and transmission power allocation calculated at said second bit and power allocation calculating process; and
a fourth transmitting process which transmits the two kinds of bit allocation and transmission power allocation calculated at said second bit and power allocation calculating process to said second communication equipment,
said second communication equipment, comprising:
a fourth receiving process which receives the two kinds of bit allocation and transmission power allocation transmitted form said first communication equipment; and
a fourth memorizing process which memorizes said two kinds of bit allocation and transmission power allocation received by said fourth receiving process,
said second data transmitting process includes a second modulating process which allocates the bit allocation and transmission power allocation to each carrier of said second frequency band, by making the bit rate at the period that the noise generated at the data transmission to said first direction is large higher than the bit rate at the period that the noise generated at the data transmission to said second direction is large corresponding to the changing timing of noise level, using the two kinds of bit allocation and transmission power allocation memorized by said fourth memorizing process.

37. A method for multi-carrier transmission in accordance with claim 36, wherein:
said first communication equipment comprises a first data receiving process including a first demodulating process which demodulates the data transmitted from said second communication equipment, by using the same bit allocation and transmission power allocation as the bit allocation and transmission power allocation allocated corresponding to the changing timing of noise level at said second communication equipment, using the two kinds of bit allocation and transmission power allocation memorized by said third memorizing process.

38. A method for multi-carrier transmission in accordance with claim 35, wherein:
said second communication equipment comprises a second data receiving process including a second demodulating process which demodulates the data transmitted from said first communication equipment, by using the same bit allocation and transmission power allocation as the bit allocation and transmission power allocation allocated corresponding to the changing timing of noise level at said first communication equipment, using the two kinds of bit allocation and transmission power allocation memorized by said first memorizing process.

39. A method for multi-carrier transmission in accordance with claim 31, wherein:
said first data transmitting process, comprising:
a first temporarily memorizing process for memorizing the data transmitted from external equipment temporarily;
a first reading out process which reads out the two kinds of bit allocation and transmission power allocation memorized at said first memorizing process;
a first selecting process which selects the bit allocation allocating to each carrier and transmission power allocation using for said each carrier of said first frequency band from the two kinds of bit allocation and transmission power allocation read out by said first reading out process, corresponding to the changing timing of noise level;
a first modulating process which modulates the amplitude of each carrier of said first frequency band to the amplitude corresponding to the selected bit allocation and transmission power allocation and the order of bits of the data allocating to said each carrier;
a first IFFT (inverse fast Fourier transform) process which adds up each carrier of said first frequency band modulated the amplitude at said first modulating process and outputs the voltage value expressed in digital form;
a first DAC (digital to analog converter) process which converts the voltage value expressed in digital form outputted from said first IFFT process to analog signals and outputs to a loop; and
a first filter process which removes side lobes generated at said second frequency band by the carrier of said first frequency band outputted to the loop by said first DAC process.

40. A method for multi-carrier transmission in accordance with claim 31, wherein:
said second data transmitting process, comprising:
a second temporarily memorizing process for memorizing the data transmitted from external equipment temporarily;
a second reading out process which reads out the two kinds of bit allocation and transmission power allocation memorized at said second memorizing process;
a second selecting process which selects the bit allocation allocating to each carrier and transmission power allocation using for said each carrier of said second frequency band from the two kinds of bit allocation and transmission power allocation read out by said second reading out process, corresponding to the changing timing of noise level;
a second modulating process which modulates the amplitude of each carrier of said second frequency band to the amplitude corresponding to the selected bit allocation and transmission power allocation and the order of bits of the data allocating to said each carrier;
a second IFFT (inverse fast Fourier transform) process which adds up each carrier of said second frequency band modulated the amplitude at said second modulating process and outputs the voltage value expressed in digital form;
a second DAC (digital to analog converter) process which converts the voltage value expressed in digital form outputted from said second IFFT process to analog signals and outputs to a loop; and
a second filter process which removes side lobes generated at said first frequency band by the carrier of said second frequency band outputted to the loop by said second DAC process.

41. A method for multi-carrier transmission in accordance with claim 37, wherein:
said first data receiving process, comprising:
a third filter process which removes side lobes generated at said first frequency band by each carrier of said second frequency band transmitted from said second communication equipment;
a first ADC (analog to digital converter) process which converts analog signals transmitted from said second communication equipment using the carrier of said second frequency band to the voltage value expressed in digital form;
a first FFT (fast Fourier transform) process which implements the fast Fourier transform to said voltage value expressed in digital form from said first ADC process and takes out each carrier whose amplitude is modulated of said second frequency band;
a third reading out process which reads out the two kinds of bit allocation and transmission power allocation memorized at said third memorizing process;
a third selecting process which selects the same bit allocation and transmission power allocation as the bit allocation and transmission power allocation allocated corresponding to the noise level generated at the data transmission at said second communication equipment from the two kinds of bit allocation and transmission power allocation read out by said third reading out process;
a first demodulating process which takes out the data, allocated to each carrier of said second frequency band, whose amplitude is modulated taken out at said first FFT process, by using the two kinds of bit allocation and transmission power allocation read out by said third reading out process; and a third temporarily memorizing process which memorizes the data taken out from said first demodulating process temporarily, in order to make the output amount of data a constant value.

42. A method for multi-carrier transmission in accordance with claim 38, wherein:

said second data receiving process, comprising:

a fourth filter process which removes side lobes generated at said second frequency band by each carrier of said first frequency band transmitted from said first communication equipment;

a second ADC (analog to digital converter) process which converts analog signals transmitted from said first communication equipment using the carrier of said first frequency band to the voltage value expressed in digital form;

a second FFT (fast Fourier transform) process which implements the fast, Fourier transform to said voltage value expressed in digital form from said second ADC process and takes out each carrier whose amplitude is modulated of said first frequency band;

a fourth reading out process which reads out the two kinds of bit allocation and transmission power allocation memorized at said first memorizing process;

a fourth selecting process which selects the same bit allocation and transmission power allocation as the bit allocation and transmission power allocation allocated corresponding to the noise level generated at the data transmission at said first communication equipment from the two kinds of bit allocation and transmission power allocation read out by said fourth reading out process;

a second demodulating process which takes out the data, allocated to each carrier of said first frequency band, whose amplitude is modulated taken out at said second FFT process, by using the two kinds of bit allocation and transmission power allocation read out by said fourth reading out process; and a fourth temporarily memorizing process which memorizes the data taken out from said second demodulating process temporarily, in order to make the output amount of data a constant value.

43. A method for multi-carrier transmission in accordance with claim 38, wherein:

said first communication equipment, comprising:

a signal synchronized with noise generating process which generates a signal synchronized with noise which makes the amplitude of the designated carrier change, by synchronizing with the changing timing of noise level; and a fifth transmitting process which transmits the signal synchronized with noise generated at said signal synchronized with noise generating process to said second communication equipment, said second communication equipment, comprising:

a fifth receiving process which receives said signal synchronized with noise transmitted from said first communication equipment;

a timing detecting process which detects the changing timing of noise level by the change of the amplitude of said designated carrier received at said fifth receiving process; and a bit and power allocation selecting process which implements the designation of the bit allocation and transmission power allocation using for the data transmission corresponding to the noise level, from the two kinds of bit allocation and transmission power allocation memorized in said fourth memorizing process to said second modulating process, by the changing timing of noise level detected by said timing detecting process, and designates the same bit allocation and transmission power allocation as the bit allocation and transmission power allocation used corresponding to the noise level at said first communication equipment from the two kinds of bit allocation and transmission power allocation memorized in said first memorizing process to said second demodulating process, to said second demodulating process.

44. A method for multi-carrier transmission in accordance with claim 31, wherein:

said first frequency band is a high frequency band; and said second frequency band is a low frequency band.

45. A method for multi-carrier transmission in accordance with claim 31, wherein:

said first frequency band is a low frequency band; and said second frequency band is a high frequency band.

46. A method for multi-carrier transmission under the noise environment that the changing timing of noise level is known, comprising:

a bit allocation switching process which switches the bit allocation allocating to each carrier of a first frequency band corresponding to the changing timing of noise level, at an apparatus for multi-carrier transmission implementing the data transmission using said first frequency band;

an allocating process which allocates data to each carrier of said first frequency band, by using the switched bit allocation; and a transmitting process including a carrier transmitting process which transmits each carrier of said first frequency band allocated data to a counter communication equipment, and makes the bit rate of the data transmission implementing at the period that the noise level becomes large at said counter communication equipment higher than the bit rate of the data transmission implementing at the period that the noise level becomes large at said apparatus for multi-carrier transmission.

47. A method for multi-carrier transmission in accordance with claim 46, wherein:

said transmitting process, comprising:

a first reading out process which reads out the two kinds of bit allocation and transmission power allocation from a first memorizing process which memorized the bit allocation allocating to each carrier and transmission power allocation using for each carrier of said first frequency band transmitting data at the period that said noise is large at said apparatus for multi-carrier transmission and the bit allocation allocating to each carrier and transmission power allocation using for each carrier of said first frequency band transmitting data at the period that said noise is large at said counter communication equipment;

a first selecting process which switches the two kinds of bit allocation and transmission power allocation read out from said first reading out process, corresponding to the changing timing of noise level; and a modulating process which allocates the bit allocation and transmission power allocation to each carrier of said first frequency band, using the bit allocation and transmission power allocation selected by said first selecting process, by making the bit rate of the data transmission implementing at the period that said noise becomes large at said counter communication equipment higher than the bit rate of the data transmission implementing at the period that said noise becomes large at said apparatus for multi-carrier transmission.

48. A method for multi-carrier transmission in accordance with claim 46, comprising:

a second reading out process which reads out the two kinds of bit allocation and transmission power allocation from a second memorizing process which memorized the bit allocation allocating to each carrier and transmission power allocation using for each carrier of said second frequency band transmitting data at the period that said noise is large at said apparatus for multi-carrier transmission and the bit allocation allocating to each carrier and transmission power allocation using for each carrier of said second frequency band transmitting data at the period that said noise is large at said counter communication equipment;

a second selecting process which switches the two kinds of bit allocation and transmission power allocation read out from said second reading out process, corresponding to the changing timing of noise level; and a receiving process including a demodulating process which takes out the data from each carrier of said second frequency band transmitted from said counter communication equipment, using the bit allocation and transmission power allocation selected by said second selecting process.

49. A method for multi-carrier transmission in accordance with claim 46, wherein:

said transmitting process, comprising:

a first temporarily memorizing process for memorizing, the data transmitted from external equipment temporarily;

a first reading out process which reads out the data to be transmitted from said first temporarily memorizing process and the two kinds of bit allocation allocating to each carrier and transmission power allocation using for said each carrier of said first frequency band transmitting the data from said first memorizing process, at the period that the noise is large at said apparatus for multi-carrier transmission and at the period that the noise is large at said counter communication equipment;

a first selecting process which selects the bit allocation allocating to each carrier and transmission power allocation using for said each carrier of said first frequency band from the two kinds of bit allocation and transmission power allocation read out by said first reading out process, corresponding to the changing timing of noise level;

a modulating process which modulates the amplitude of each carrier to the amplitude corresponding to the bit allocation and transmission power allocation selected by said first selecting process and the order of bits of the data allocating to said each carrier read out from said first selecting process;

an IFFT (inverse fast Fourier transform) process which adds up each carrier of said first frequency band modulated the amplitude at said modulating process and outputs the voltage value expressed in digital form;

a DAC (digital to analog converter) process which converts the voltage value expressed in digital form outputted from said IFFT process to analog signals and outputs to a loop; and a first filter process which removes side lobes generated at said second frequency band by the carrier of said first frequency band outputted to the loop by said DAC process, and allocates the bit allocation and transmission power allocation to each carrier of said first frequency band, by making the bit rate at the period that said noise is large at said counter communication equipment higher than the bit rate at the period that said noise is large at said apparatus for multi-carrier transmission, corresponding to the changing timing of noise level.

50. A method for multi-carrier transmission in accordance with claim 48, wherein:

said first receiving process, comprising:

a second filter process which removes side lobes generated at said first frequency band by each carrier of said second frequency band transmitted from said counter communication equipment, provided at the front position of said receiving process;

an ADC (analog to digital converter) process which converts analog signals transmitted from said counter communication equipment using the carrier of said second frequency band to the voltage value expressed in digital form;

a FFT (fast Fourier transform) process which implements the fast Fourier transform to said voltage value expressed in digital form from said ADC process and takes out each carrier whose amplitude is modulated of said second frequency band;

a second reading out process which reads out the two kinds of bit allocation allocating to each carrier of said second frequency band and transmission power allocation using for said each carrier of said second frequency band, at the period that said noise is large at said apparatus for multi-carrier transmission and at the period that said noise is large at counter communication equipment, which are memorized at said second memorizing process;

a demodulating process which takes out the data allocated to each carrier of said second frequency band from said FFT process, by using the same bit allocation and transmission power allocation as the bit allocation and transmission power allocation allocated corresponding to the changing timing of noise level at said counter communication equipment; and a second temporarily memorizing process which memorizes the data taken out from said demodulating process temporarily, in order to make the output amount of data a constant value.

51. A method for multi-carrier transmission in accordance with claim 46, wherein:

said first frequency band is a high frequency band; and
said second frequency band is a low frequency band.

52. A method for multi-carrier transmission in accordance with claim 46, wherein:

said first frequency band is a low frequency band; and
said second frequency band is a high frequency band.

* * * * *